United States Patent
Naruse

(10) Patent No.: US 11,614,462 B2
(45) Date of Patent: Mar. 28, 2023

(54) PHYSICAL QUANTITY SENSOR, COMPOSITE SENSOR, INERTIAL MEASUREMENT UNIT, VEHICLE POSITIONING DEVICE, PORTABLE ELECTRONIC DEVICE, ELECTRONIC DEVICE, VEHICLE, TRAVELING SUPPORTING SYSTEM, DISPLAY DEVICE, AND MANUFACTURING METHOD FOR PHYSICAL QUANTITY SENSOR

(71) Applicant: Seiko Epson Corporation, Tokyo (JP)

(72) Inventor: Atsuki Naruse, Shiojiri (JP)

(73) Assignee: SEIKO EPSON CORPORATION

( * ) Notice: Subject to any disclaimer, the term of this patent is extended or adjusted under 35 U.S.C. 154(b) by 923 days.

(21) Appl. No.: 16/426,328

(22) Filed: May 30, 2019

(65) Prior Publication Data
US 2019/0369137 A1 Dec. 5, 2019

(30) Foreign Application Priority Data
May 31, 2018 (JP) .............................. JP2018-104419

(51) Int. Cl.
*G01P 15/08* (2006.01)
*G01C 19/5783* (2012.01)
(Continued)

(52) U.S. Cl.
CPC ...... *G01P 15/0802* (2013.01); *G01C 19/5783* (2013.01); *G01P 1/02* (2013.01);
(Continued)

(58) Field of Classification Search
CPC ........ G01P 1/02; G01P 1/023; G01P 15/0802; G01P 15/125; G01C 19/5783; G01C 19/5733; G01C 19/5769
See application file for complete search history.

(56) References Cited

U.S. PATENT DOCUMENTS

| 8,089,200 B2 * | 1/2012 | Kawahara ............ H03H 9/1035 310/344 |
| 2013/0074596 A1 * | 3/2013 | Takizawa ........... G01C 19/5712 29/527.1 |

(Continued)

FOREIGN PATENT DOCUMENTS

| JP | S60-083356 A | 5/1985 |
| JP | 2015-052456 A | 3/2015 |

(Continued)

*Primary Examiner* — Helen C Kwok
(74) *Attorney, Agent, or Firm* — Harness, Dickey & Pierce, P.L.C.

(57) ABSTRACT

A physical quantity sensor includes a physical quantity sensor element including a lid joined to a substrate to define a housing space in the inside and a physical quantity sensor element piece housed in the housing space and a circuit element bonded to the outer surface of the lid via an adhesive material. In the lid, an electrode is provided to extend from an inner wall of a through-hole, which pierces through the lid from the housing space to a surface on the opposite side of the side of the physical quantity sensor element piece and is sealed by a sealing member, to a peripheral edge of the through-hole at the surface on the opposite side. In a sectional view, thickness of a region at the peripheral edge of the electrode is smaller at the opposite side of the side of an opening of the through-hole than the opening side.

10 Claims, 29 Drawing Sheets

(51) Int. Cl.
  *G01P 15/125* (2006.01)
  *G05D 1/00* (2006.01)
  *G01P 1/02* (2006.01)
  *G01P 15/18* (2013.01)
(52) U.S. Cl.
  CPC ............ *G01P 15/125* (2013.01); *G01P 15/18* (2013.01); *G05D 1/0088* (2013.01); *G01P 2015/088* (2013.01); *G01P 2015/0865* (2013.01)

(56) References Cited

U.S. PATENT DOCUMENTS

| | | | | |
|---|---|---|---|---|
| 2013/0208438 | A1* | 8/2013 | Takagi | B81B 7/007 29/846 |
| 2013/0265701 | A1* | 10/2013 | Takizawa | G01P 15/097 361/679.01 |
| 2014/0285976 | A1* | 9/2014 | Kobayashi | H05K 3/04 361/736 |
| 2015/0059475 | A1* | 3/2015 | Takagi | G01P 15/125 73/514.32 |
| 2015/0313016 | A1* | 10/2015 | Naruse | H05K 1/115 73/488 |
| 2015/0345947 | A1* | 12/2015 | Takizawa | G01C 25/00 29/460 |
| 2016/0138921 | A1* | 5/2016 | Takizawa | B81C 1/00293 73/488 |
| 2016/0258977 | A1* | 9/2016 | Naruse | G01P 15/125 |

FOREIGN PATENT DOCUMENTS

| | | |
|---|---|---|
| JP | 2015-203584 A | 11/2015 |
| JP | 2019-144108 A | 8/2019 |

* cited by examiner

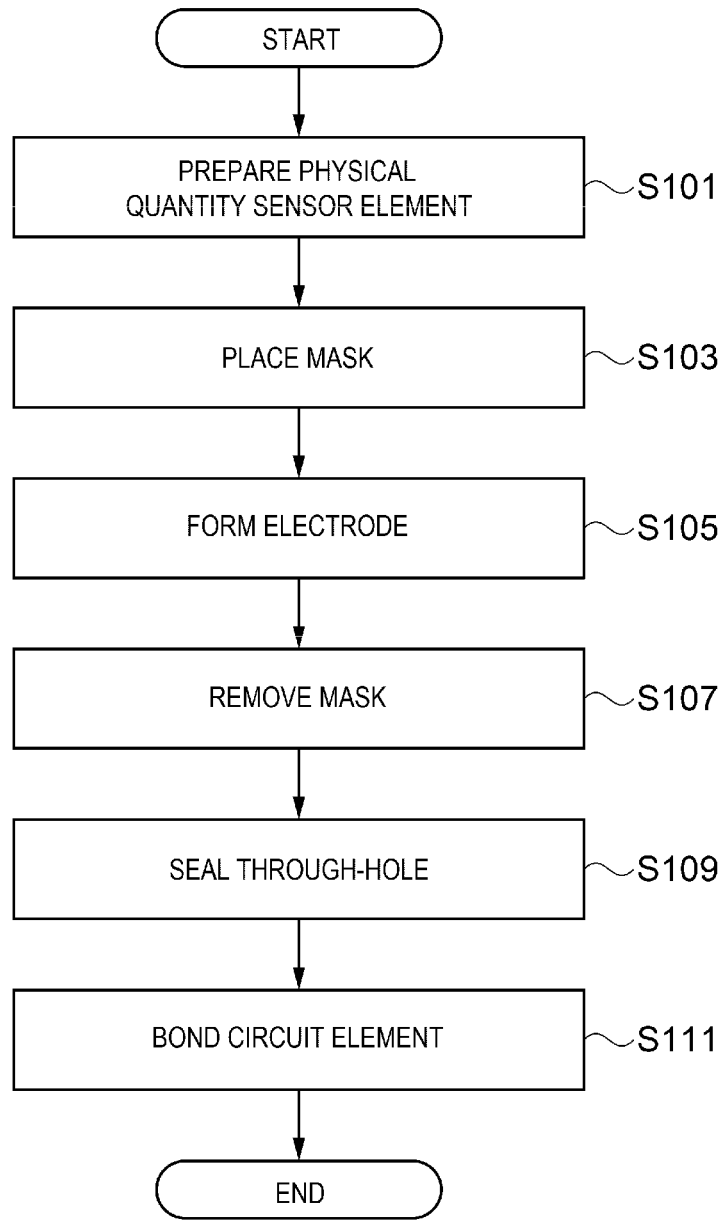

PHYSICAL QUANTITY SENSOR, COMPOSITE SENSOR, INERTIAL MEASUREMENT UNIT, VEHICLE POSITIONING DEVICE, PORTABLE ELECTRONIC DEVICE, ELECTRONIC DEVICE, VEHICLE, TRAVELING SUPPORTING SYSTEM, DISPLAY DEVICE, AND MANUFACTURING METHOD FOR PHYSICAL QUANTITY SENSOR

The present application is based on, and claims priority from, JP Application Serial Number 2018-104419, filed May 31, 2018, the disclosure of which is hereby incorporated by reference herein in its entirety

BACKGROUND

1. Technical Field

The present disclosure relates to a physical quantity sensor, a composite sensor, an inertial measurement unit, a vehicle positioning device, a portable electronic device, an electronic device, a vehicle, a traveling supporting system, a display device, and a manufacturing method for the physical quantity sensor.

2. Related Art

As a physical quantity sensor, there has been disclosed an Si-MEMS (Micro Electro Mechanical Systems) acceleration sensor in which the inside of a container is formed as a sealed space by sealing a through-hole provided in a lid with a sealing material (see, for example, JP-A-2015-052456 (Patent Literature 1)). There has been disclosed a structure in which an IC (integrated circuit), which is a control circuit element, disposed over a lid of an Si-MEMS acceleration sensor is stacked to cover a through-hole and bonded and fixed by an epoxy adhesive material (see, for example, JP-A-2015-203584 (Patent Literature 2)).

However, in the structure described above, it is likely that adhesion between the lid and the IC becomes partial unstable and stress occurs in a bonded part because of a level difference due to the thickness of an electrode provided at the peripheral edge of the through-hole at the surface of the lid.

SUMMARY

A physical quantity sensor according to an aspect of the present disclosure includes: a physical quantity sensor element including a substrate, a lid joined to the substrate to define a housing space in an inside, and a physical quantity sensor element piece housed in the housing space and capable of detecting a physical quantity; and a circuit element bonded to a surface of the lid via an adhesive material, the surface being a surface on an opposite side of a side of the physical quantity sensor element piece. In the lid, an electrode is provided to extend from an inner wall of a through-hole, which pierces through the lid from the housing space to the surface on the opposite side and is sealed by a sealing member, to a peripheral edge of the through-hole at the surface on the opposite side. In a sectional view, thickness of a region at the peripheral edge of the electrode is smaller at an opposite side of a side of an opening of the through-hole than the opening side.

In the physical quantity sensor, the thickness of the region at the peripheral edge of the electrode may gradually decrease further away from the through-hole.

In the physical quantity sensor, an outer edge of the region at the peripheral edge of the electrode may include an inclined surface.

In the physical quantity sensor, a surface of the region at the peripheral edge of the electrode may have a curved surface shape.

In the physical quantity sensor, a surface of the region at the peripheral edge of the electrode may have a step-wise shape.

In the physical quantity sensor, a region of the lid overlapping the circuit element may include a formation region of the electrode and a non-formation region of the electrode.

In the physical quantity sensor, the physical quantity may be acceleration.

A composite sensor according to an aspect of the present disclosure includes: the physical quantity sensor described above; and an angular velocity sensor.

An inertial measurement unit according to an aspect of the present disclosure includes: the physical quantity sensor described above; an angular velocity sensor; and a control section configured to control the physical quantity sensor and the angular velocity sensor.

A vehicle positioning device according to an aspect of the present disclosure includes: the inertial measurement unit described above; a receiving section configured to receive a satellite signal superimposed with position information from a positioning satellite; an acquiring section configured to acquire, based on the received satellite signal, position information of the receiving section; a computing section configured to compute, based on inertia data output from the inertial measurement unit, a posture of a vehicle; and a calculating section configured to calculate a position of the vehicle by correcting the position information based on the calculated posture.

A portable electronic device according to an aspect of the present disclosure includes: the physical quantity sensor described above; a case in which the physical quantity sensor is housed; a processing section housed in the case and configured to process output data from the physical quantity sensor; a display section housed in the case; and a light-transmissive cover closing an opening of the case.

The portable electronic device may include a satellite positioning system and measure a moving distance and a moving track of a user.

An electronic device according to an aspect of the present disclosure includes: the physical quantity sensor described in any one of the paragraphs described above; and a control section configured to perform control based on a detection signal output from the physical quantity sensor.

A vehicle according to an aspect of the present disclosure includes: the physical quantity sensor described in any one of the paragraphs described above; and a control section configured to perform control based on a detection signal output from the physical quantity sensor.

The vehicle described above may include at least one system of an engine system, a brake system, and a keyless entry system, and the control section may control the system based on the detection signal.

A traveling supporting system according to an aspect of the present disclosure includes: the physical quantity sensor described in any one of the paragraphs described above; and a control section configured to control at least one of acceleration, braking, and steering based on a detection signal detected by the physical quantity sensor. Implementation and non-implementation of automatic driving is switched according to a change of the detection signal from the physical quantity sensor.

A display device according to an aspect of the present disclosure includes: a display section worn on a head of a user and configured to irradiate image light on eyes of the user; and the physical quantity sensor described in any one of the paragraphs described above. The physical quantity sensor includes: a first sensor unit located further on one side than a center of the head in a worn state; and a second sensor unit located further on another side than the center of the head.

A manufacturing method for a physical quantity sensor according to an aspect of the present disclosure includes: preparing a physical quantity sensor element including a substrate, a lid joined to the substrate to define a housing space in an inside, a through-hole piercing through the lid from the housing space to a surface on an opposite side of the housing space being provided in the lid, and a physical quantity sensor element piece housed in the housing space; placing, over the lid, a mask for forming an electrode in an inside of the through-hole and at a peripheral edge of the through-hole at the surface on the opposite side; forming the electrode in the inside of the through-hole and at the peripheral edge via the mask; removing the mask; sealing the through-hole; and bonding a circuit element to the surface on the opposite side of the lid via an adhesive material. In the mask, a piercing-through section is formed to be opposed to the through-hole and a cutout section is formed along a peripheral edge of the piercing-through section at a side corresponding to the lid.

In the manufacturing method for the physical quantity sensor described above, in the forming the electrode, the electrode may be formed using a sputtering method or a vacuum evaporation method.

BRIEF DESCRIPTION OF THE DRAWINGS

FIG. 8 is a flowchart showing a main manufacturing process of an acceleration sensor.

DESCRIPTION OF EXEMPLARY EMBODIMENTS

An embodiment embodying the present disclosure is explained below with reference to the drawings. The embodiment explained below does not unduly limit the content of the present disclosure described in the appended claims. Not all of components explained in this embodiment are essential constituent elements of the present disclosure. In the figures, for convenience of explanation, a part of the components is sometimes omitted. In the figures, dimensional ratios of the components are different from actual dimensional ratios to clearly show the components. In the following explanation, for convenience of explanation, in the figures, an X axis, a Y axis, and a Z axis are illustrated as three axes orthogonal to one another. A direction parallel to the X axis is referred to as "X-axis direction", a direction parallel to the Y axis is referred to as "Y-axis direction", and a direction parallel to the Z axis is referred to as "Z-axis direction". A +Z-axis side, which is a direction of an arrow of the Z axis, is referred to as "upper" or "upward". A −Z-axis side is referred to as "lower" or "downward". Concerning the X axis and the Y axis as well, a direction of an arrow is set as a "+" direction.

Acceleration Sensor

Configuration of an Acceleration Sensor

Figure 1:
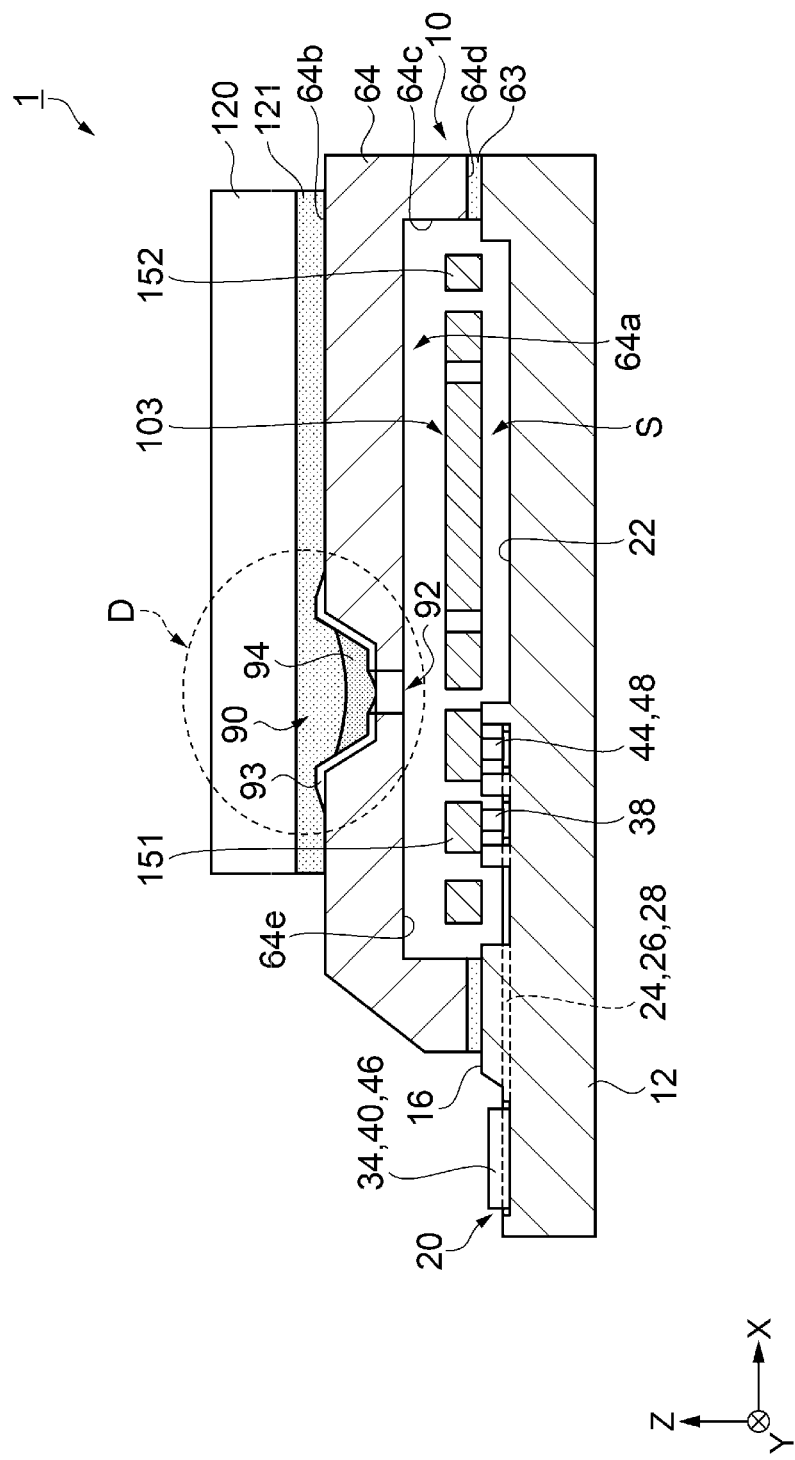
FIG. 1 is a sectional view schematically showing a schematic configuration of an acceleration sensor functioning as an example of a physical quantity sensor.
Figure 2:
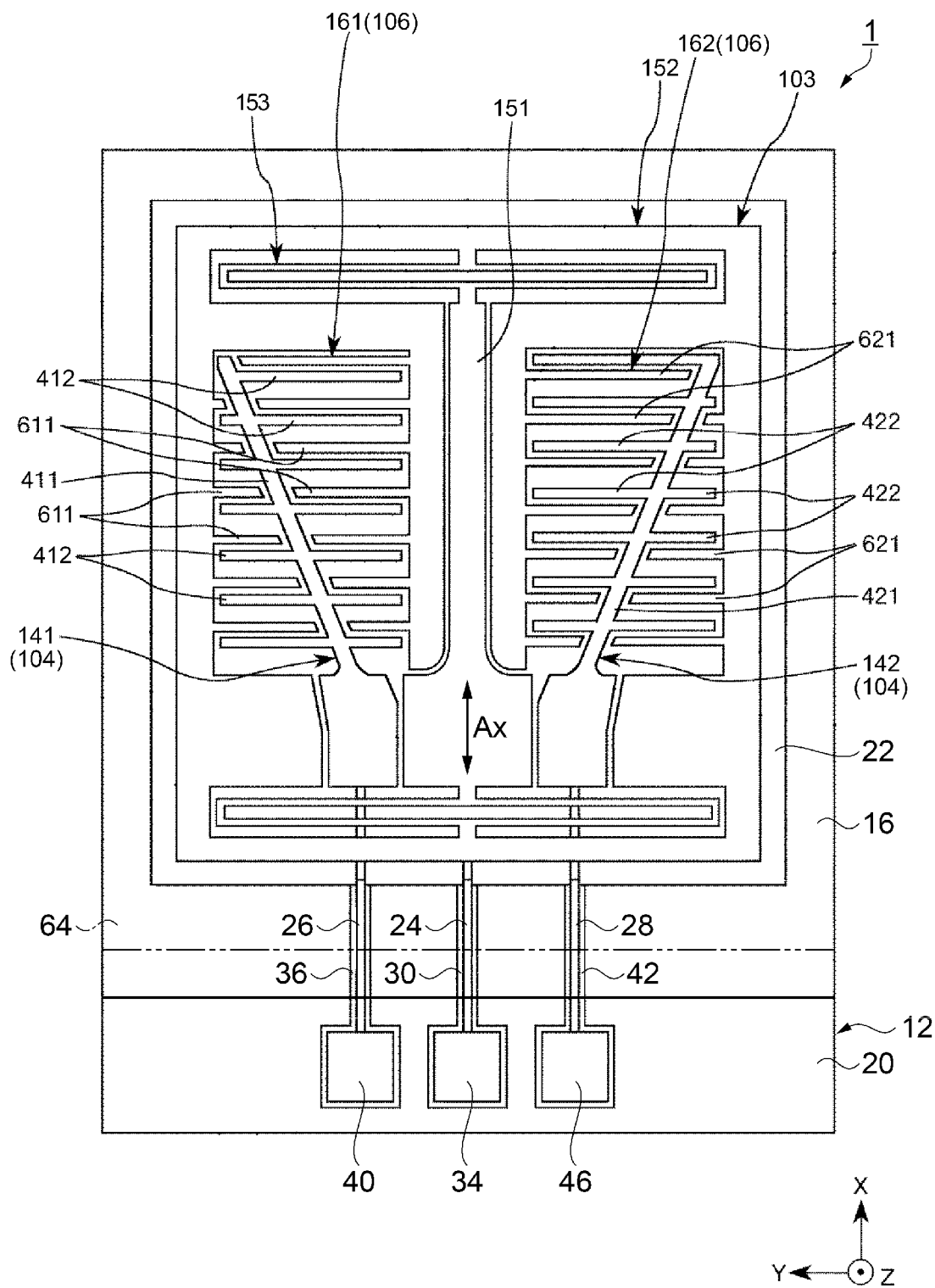
FIG. 2 is a plan view schematically showing a schematic configuration of the acceleration sensor that detects X-axis acceleration.
Figure 3:
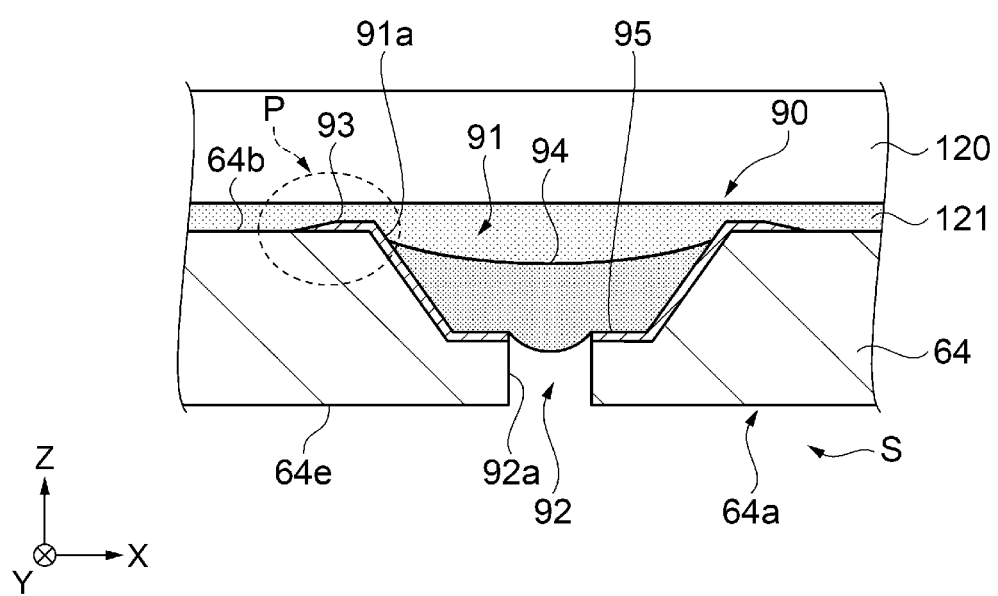
FIG. 3 is an enlarged sectional view of a D part in FIG. 1.
Figure 4:
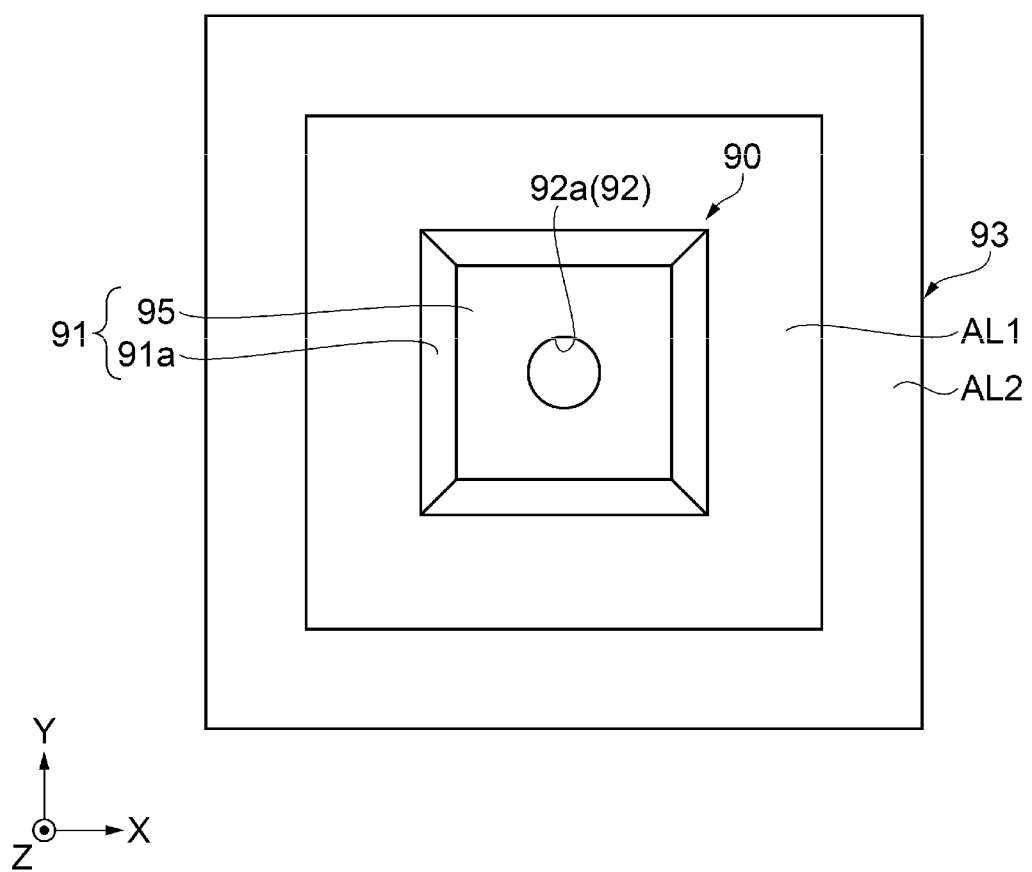
FIG. 4 is a plan view of FIG. 3 viewed from a Z-axis direction and is an enlarged view of the D part in FIG. 1.

First, an acceleration sensor functioning as an example of a physical quantity sensor is explained with reference to FIGS. 1, 2, 3, and 4. FIG. 1 is a sectional view schematically showing a schematic configuration of the acceleration sensor functioning as an example of the physical quantity sensor. FIG. 2 is a plan view schematically showing a schematic configuration of an X-axis acceleration sensor. For convenience of explanation, in FIG. 2, the X-axis acceleration sensor is shown seen through a lid. FIG. 3 is an enlarge sectional view of a D part in FIG. 1. FIG. 4 is a plan view of FIG. 3 viewed from the Z-axis direction and is an enlarged view of the D part in FIG. 1.

As shown in FIG. 1, an acceleration sensor 1 functioning as an example of the physical quantity sensor includes a sensor unit 10 functioning as a physical quantity sensor element including a substrate 12 having a substantially planar shape, a lid 64 provided with a recess 64a at a side facing the substrate 12 and joined to the substrate 12 via a joining member 63, and a functional element 103 functioning as a physical quantity sensor element provided between the substrate 12 and the lid 64 and a circuit element 120 configured as an IC (integrated circuit) bonded to an outer surface 64b, which is a surface of the lid 64 and is a surface on the opposite side of the side of the functional element 103.

The functional element 103 is formed by applying a photolithography method and an etching method to a not-shown semiconductor substrate (a silicon substrate) joined on the substrate 12. The functional element 103 includes, as shown in FIG. 2, a fixed electrode section 104 including first fixed electrode fingers 412 and second fixed electrode fingers 422, a movable electrode section 106 including first movable electrode fingers 611 and second movable electrode fingers 621, a fixed section 151, and a movable section 152. The functional element 103 functions as an acceleration sensor element piece, which is a physical quantity sensor element piece and detects acceleration.

The substrate 12 includes a principal plane 16, which is a plane orthogonal to the Z axis and is joined to a plurality of fixed electrode sections 104 and the like. A terminal section 20 is provided at an end portion in a −X direction of the principal plane 16. A region of the principal plane 16 other than the terminal section 20 is covered by the lid 64 including the recess 64a on the principal plane 16 side. A recess 22, a planar shape of which is a substantially rectangular shape, is provided in substantially the center of the principal plane 16 in order to avoid interference between the movable electrode section 106 and the substrate 12. Consequently, a movable region (a displacement region) of the movable electrode section 106 is fit in the recess 22 in a plan view.

As shown in FIG. 2, a first groove 24 extending along the X axis toward the recess 22 is provided in the center in the Y-axis direction on the terminal section 20 side of the principal panel 16. A second groove 26 is provided along the outer periphery of the first groove 24 on one side in the Y-axis direction of the first groove 24 on the terminal section 20 side of the principal plane 16. Further, a third groove 28 is provided at the opposite side of the second groove 26 across the first groove 24 on the terminal section 20 side of the principal plane 16. The first groove 24, the second groove 26, and the third groove 28 are provided to extend to coupling sections 38, 44, and 48 (see FIG. 1) to the first fixed electrode fingers 412 and the second fixed electrode fingers 422. The coupling sections 38, 44, and 48 have electric conductivity.

As a constituent material of the substrate 12, an insulating material such as glass or high-resistance silicon is desirably used. In particular, when a semiconductor substrate forming the fixed electrode section 104, the movable electrode section 106, the fixed section 151, and the movable section 152 is configured using a semiconductor material such as silicon as a main material, as the constituent material of the substrate 12, glass including alkali metal ion (movable ion) (e.g., borosilicate glass such as Pyrex (registered trademark)) is desirably used. Consequently, in the acceleration sensor 1, the substrate 12 and the semiconductor substrate can be anodically bonded. In the acceleration sensor 1, by using glass including alkali metal ion as the substrate 12, the substrate 12 and the semiconductor substrate can be easily insulated and separated.

The substrate 12 does not always have insulation. For example, a conductive substrate made of low-resistance silicon may be provided. In this case, the substrate 12 and the semiconductor substrate are insulated and separated from each other via an insulating film. A constituent material of the substrate 12 desirably has as small a thermal expansion coefficient difference as possible from a constituent material of the semiconductor substrate. Specifically, the thermal expansion coefficient difference between the constituent material of the substrate 12 and the constituent material of the semiconductor substrate is desirably 3 ppm/° C. or less. Consequently, the acceleration sensor 1 can reduce residual stress between the substrate 12 and the semiconductor substrate. In this embodiment, it is assumed that glass is used as a main material of the substrate 12.

A first wire 30 is provided on the bottom surface of the first groove 24 along the first groove 24. The first wire 30 is a wire electrically coupled to the first fixed electrode fingers 412. A second wire 36 is provided on the bottom surface of the second groove 26 along the first groove 24. The second wire 36 is a wire electrically coupled to the second fixed electrode fingers 422. A third wire 42 is provided on the bottom surface of the third groove 28 along the third groove 28. The third wire 42 is a wire electrically coupled to the fixed section 151 explained below. End portions (end portions disposed in the terminal section 20) of the first wire 30, the second wire 36, and the third wire 42 are respectively a first terminal electrode 34, a second terminal electrode 40, and a third terminal electrode 46.

Constituent materials of the first wire 30, the second wire 36, and the third wire 42 are not particularly limited if the constituent materials respectively have electric conductivity. Various electrode materials can be used. Examples of the constituent materials include oxides (transparent electrode materials) such as ITO (Indium Tin Oxide), IZO (Indium Zinc Oxide), $In_3O_3$, $SnO_2$, Sb-containing $SnO_2$, and Al-containing ZnO, Au, Pt, Ag, Cu, and Al, and alloys containing Au, Pt, Ag, Cu, and Al. One of these materials can be used or two or more of these materials can be used in combination.

Constituent materials of the coupling sections 38, 44, and 48 are not particularly limited if the constituent materials have electric conductivity. Various electrode materials can be used. For example, metal such as a metal simple substance such as Au, Pt, Ag, Cu, and Al and alloys including Au, Pt, Ag, Cu, and Al is suitably used. In the coupling sections 38, 44, and 48, for example, protrusions projecting from the bottom surfaces of the grooves of the substrate 12 may be covered by wires. Regions of the first wire 30, the second wire 36, and the third wire 42 excluding the first terminal electrode 34, the second terminal electrode 40, the third terminal electrode 46, and the coupling sections 38, 44, and 48 are desirably covered by, for example, an insulating film (not shown in FIG. 2) in order to avoid a short circuit with other components.

In the acceleration sensor 1, if the constituent materials of the wires are a transparent electrode material (in particular, ITO) and the substrate 12 is transparent, foreign matters or the like present on the surfaces of the first fixed electrode fingers 412 and the second fixed electrode fingers 422 can be easily visually recognized from a surface on the opposite side of the principal plane 16 side of the substrate 12. An inspection can be efficiently performed.

The configuration of the functional element 103 capable of detecting acceleration of the X axis serving as a physical quantity is explained with reference to FIG. 2. The functional element 103 has a function of an acceleration sensor element for detecting acceleration Ax (a physical quantity) in the X-axis direction.

As shown in FIG. 2, the functional element 103 includes the fixed electrode section 104 attached to the substrate 12, the movable section 152 displaceable in the X-axis direction (a direction of a detection axis of a physical quantity) with respect to the substrate 12 via a spring section 153, and the movable electrode section 106 provided in the movable section 152. The spring section 153 is fixed to the substrate 12 by the fixed section 151.

The fixed electrode section 104 includes a first fixed electrode section 141 and a second fixed electrode section 142 disposed side by side along the Y-axis direction (a direction crossing (in this embodiment, orthogonal to) the detection axis). The first fixed electrode section 141 includes a first trunk section 411 and a plurality of first fixed electrode fingers 412 provided on both sides in the Y-axis direction of the first trunk section 411. A longitudinal direction of the plurality of first fixed electrode fingers 412 extends along a second direction. The second fixed electrode section 142 includes a second trunk section 421 and a plurality of second fixed electrode fingers 422 provided on both sides in the Y-axis direction of the second trunk section 421. A longitudinal direction of the plurality of second fixed electrode fingers 422 extends along the second direction.

The movable electrode section 106 includes a first movable electrode section 161 and a second movable electrode section 162 disposed side by side along the Y-axis direction. At least a part of the first movable electrode section 161 includes a plurality of first movable electrode fingers 611 located on both sides in the Y-axis direction of the first trunk section 411. A longitudinal direction of the plurality of first movable electrode fingers 611 extends along the Y-axis direction. The plurality of first movable electrode fingers 611 are opposed to the first fixed electrode fingers 412 in the X-axis direction. At least a part of the second movable electrode section 162 includes a plurality of second movable electrode fingers 621 located on both sides in the Y-axis direction of the second trunk section 421. A longitudinal direction of the plurality of second movable electrode fingers 621 extends along the second direction. The plurality of second movable electrode fingers 621 are opposed to the second fixed electrode fingers 422 in the X-axis direction.

In the acceleration sensor 1, capacitors are formed between the first fixed electrode fingers 412 and the first movable electrode fingers 611 opposed to the first fixed electrode fingers 412 in the X-axis direction and between the second fixed electrode fingers 422 and the second movable electrode fingers 621 opposed to the second fixed electrode fingers 422 in the X-axis direction. In this state, for example, when acceleration along the X-axis direction is applied to the acceleration sensor 1, the first movable electrode fingers 611 of the first movable electrode section 161 and the second movable electrode fingers 621 of the second movable electrode section 162 are displaced in the X-axis direction by inertia. The acceleration sensor 1 can detect the acceleration Ax in the X-axis direction by detecting a change in the capacitance of the capacitors caused by the displacement.

In the acceleration sensor 1, by adopting such a configuration, it is possible to reduce the lengths of the first fixed electrode fingers 412 and the second fixed electrode fingers 422 and the first movable electrode fingers 611 and the second movable electrode fingers 621 while keeping sufficiently large capacitance between the first movable electrode fingers 611 and the first fixed electrode fingers 412 and sufficiently large capacitance between the second movable electrode fingers 621 and the second fixed electrode fingers 422. Therefore, in the acceleration sensor 1, the first fixed electrode fingers 412, the second fixed electrode fingers 422, the first movable electrode fingers 611, and the second movable electrode fingers 621 are less easily broken and have excellent shock resistance.

Although not shown in FIG. 2, by disposing the substrate 12 and the functional element 103 provided in the substrate 12 in a direction in which the substrate 12 and the functional element 103 are disposed side by side along the Y-axis direction, the acceleration sensor 1 capable of detecting the acceleration AX in the X-axis direction shown in FIG. 2 and explained can be configured as an acceleration sensor capable of detecting acceleration Ay in the Y-axis direction.

The lid 64 includes, as shown in FIGS. 1, 3, and 4, a hole section 90 functioning as a through-hole piercing through the lid 64 from the recess 64a (a ceiling surface 64e, which is an inner surface on a cavity (housing space) S side) to the outer surface 64b, which is a surface on the opposite side of the cavity (housing space) S side. The hole section 90 functioning as the through-hole includes a recessed section 91 provided on the outer surface 64b side and a communication hole section 92 communicating with the recessed section 91 and provided on the recess 64a side.

The recessed section 91 includes a bottom section 95 and four inner walls inclining from the outer surface 64b toward the inner side at a predetermined angle, in other words, such that a plane area on the outer surface 64b side is larger than a plane area on the bottom section 95 side. The four inner walls are configured by an inclined wall surface 91a inclining at a predetermined angle with respect to the outer surface 64b. That is, the recessed section 91 is provided in a substantially square pyramid shape including the inclined wall surface 91a and the bottom section 95 and formed in a substantially trapezoidal shape in a cross sectional.

As shown in FIGS. 3 and 4, a metal layer 93 functioning as an electrode is provided in the inclined wall surface 91a and the bottom section 95 of the recessed section 91. In other words, the inclined wall surface 91a and the bottom section 95 are covered by the metal layer 93.

In this way, in the recessed section 91, the metal layer 93 is provided in the inclined wall surface 91a and the bottom section 95. Therefore, it is possible to increase joining strength of the inclined wall surface 91a and the bottom section 95 and a sealing member 94 explained below. Since the recessed section 91 is formed in the square pyramid shape, an opening area on the outer surface 64b side of which is larger. Therefore, it is possible to easily form the metal layer 93.

Figure 5:
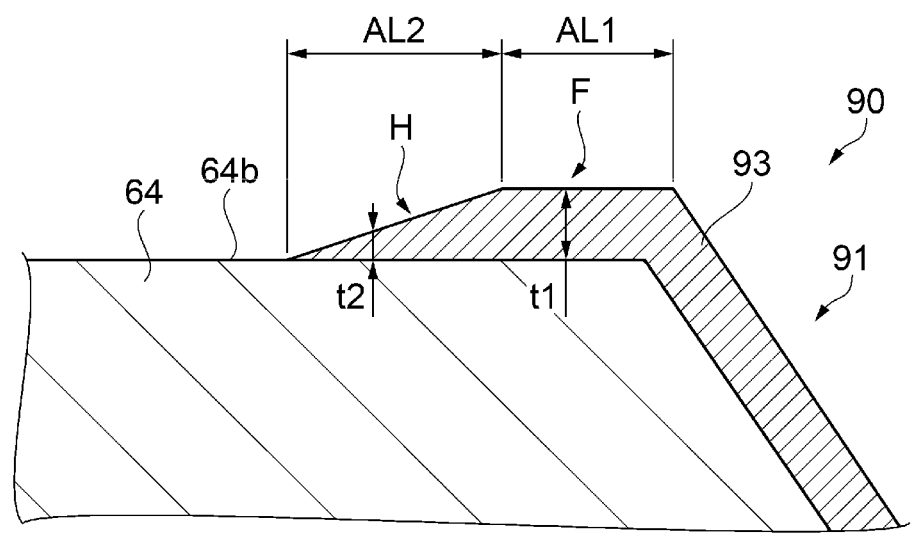
FIG. 5 is a sectional view schematically showing the configuration of a metal layer at the outer edge of an opening of a through-hole and is an enlarged view of a P part in FIG. 3.
Figure 6:
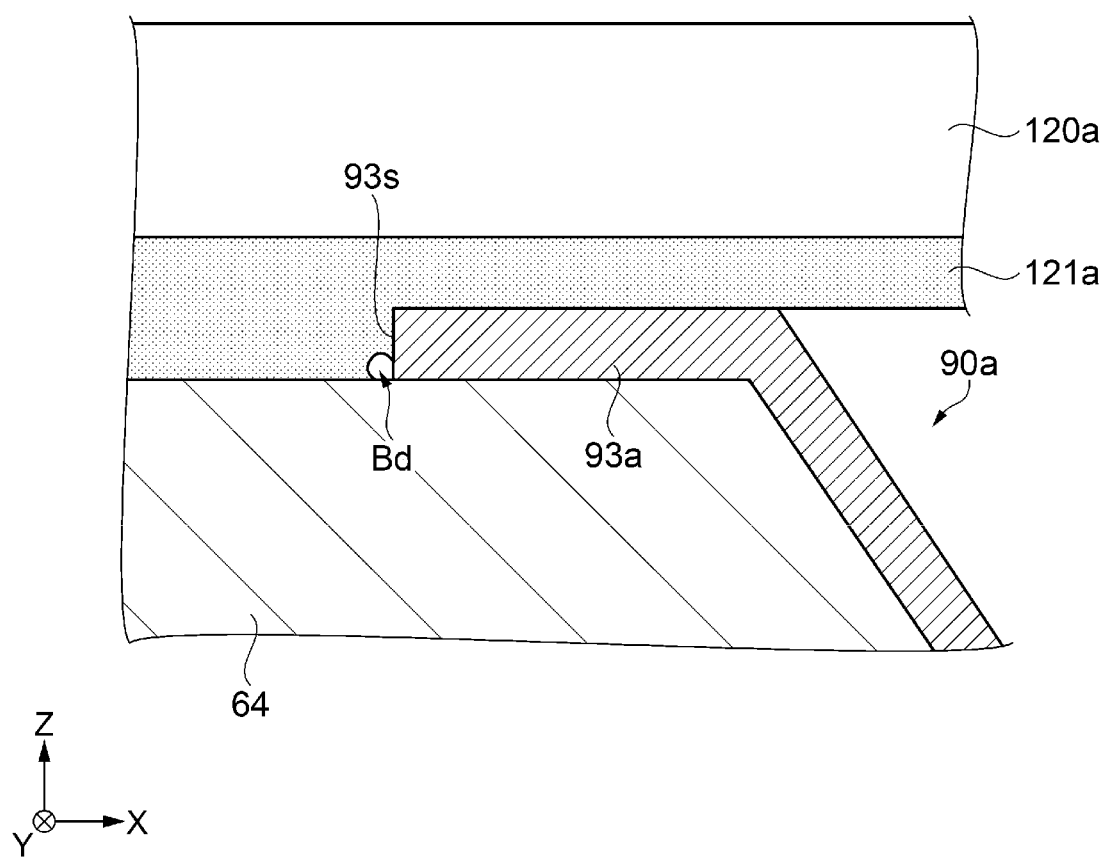
FIG. 6 is a partially enlarged view (a sectional view) showing a configuration example in the past of the metal layer at the outer edge of the opening of the through-hole.
Figure 7:
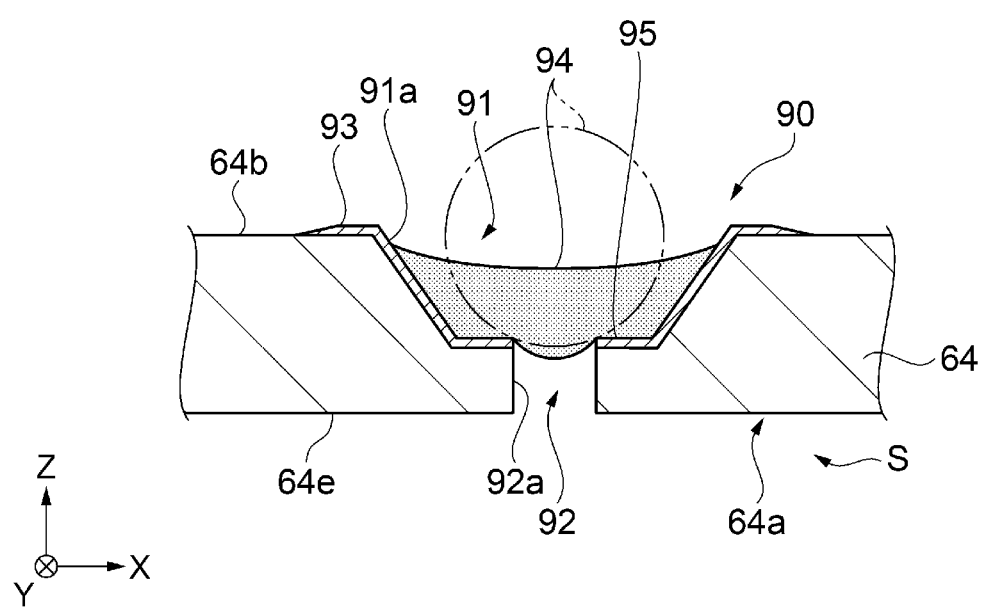
FIG. 7 is a sectional view showing a sealing structure of the through-hole and is an enlarged view of the D part in FIG. 1.

The configuration of the metal layer 93 is explained with reference to FIGS. 5, 6, and 7 as well. FIG. 5 is a sectional view schematically showing the configuration of the metal layer at the outer edge of the opening of the through-hole and is an enlarged view of a P part in FIG. 3. FIG. 6 is a partially enlarged view (a sectional view) showing a configuration example in the past of the metal layer at the outer edge of the opening of the through-hole. FIG. 7 is a sectional view showing a sealing structure of the through-hole and is an enlarged view of a D part in FIG. 1.

The inventor focused on a stacking state of the sensor unit 10 and the circuit element 120 bonded to the surface of the lid 64 of the sensor unit 10 via an adhesive material 121 and specified a factor of occurrence of fluctuation of a bias output signal output from the acceleration sensor 1. As explained in detail below, the inventor found that an air bubble (a void) Bd was easily held up between an adhesive material 121a and an end portion 93s at the peripheral edge of a metal layer 93a because a level difference due to the thickness of the metal layer 93a was present in the portion of the end portion 93s at the peripheral edge in the metal layer 93a at the outer edge of the opening of a hole section 90a, which was the through-hole in the past.

The inventor found that, when the acceleration sensor 1 was operating in a range of an operating temperature (e.g., −40° C. to +85° C.), distortion caused by imbalance of thermal stress that occurred around the air bubble Bd was transmitted to a container configured from the substrate 12 and the lid 64 and the transmitted distortion was transmitted to the functional element (the physical quantity sensor element piece) 103 to affect a bias output signal. The inventor repeated simulations, experiments, and verifications in order to reduce the distortion caused by the imbalance of the thermal stress that occurred around the air bubble Bd and was able to configure the metal layer 93 at the outer edge of the opening of the through-hole to prevent distortion from easily occurring.

As shown in FIGS. 4 and 5, the metal layer 93 in this embodiment is provided to extend from the inclined wall surface 91a configuring the inner sidewall of the recessed section 91 to the peripheral edge of the opening on the outer surface 64b of the recessed section 91. A region at the peripheral edge of the opening of the recessed section 91 of the metal layer 93 provided on the outer surface 64b includes a region AL1 that is a region close to the recessed section 91 and has a plane F having substantially the same thickness t1 in a sectional view from the Y-axis direction and a gradually decreasing region AL2 that is present at the opposite side of the recessed section 91 side of the region AL1 and has an inclined surface H on which the thickness of the metal layer 93 functioning as the electrode gradually decreases further away from the recessed section 91. In other words, the region at the peripheral edge of the opening of the recessed section 91 of the metal layer 93 provided on the outer surface 64b includes a region where thickness t2 of the metal layer 93 at the opposite side (position) of the opening side of the recessed section 91 is smaller than the thickness t1 of the metal layer 93 on the opening side of the recessed section 91. In this way, in the gradually decreasing region AL2, the thickness t2 of the metal layer 93 gradually decreases further away from the recessed section 91. That is, the region at the peripheral edge of the opening of the recessed section 91 of the metal layer 93 provided on the outer surface 64b includes the gradually decreasing region AL2 where the thickness of the metal layer 93 gradually decreases further away from the hole section 90. With such a configuration, the metal layer 93 on the outer surface 64b of the lid 64 has substantially no level difference due to the thickness of the peripheral edge portion at the opposite side of the recessed section 91.

A planar shape of the communication hole section 92 is formed in a circular shape. The communication hole section 92 is formed such that a plane area is smaller than the plane area of the bottom section 95. The communication hole section 92 is formed such that at least a part of an inner wall surface 92a (or the entire inner wall surface 92a) is substantially perpendicular to the bottom section 95 (inclination of approximately ±7 degrees is in an allowable range). That is, in the communication hole section 92, the inner wall surface 92a is formed in a cylindrical shape. The communication hole section 92 is desirably provided substantially in the center of the bottom section 95 from the viewpoint of reliability of sealing explained below.

By forming the communication hole section 92 in a circular shape in the plan view in this way, it is possible to prevent stress concentration. The communication hole section 92 is located between the bottom section 95, which is a portion where the thickness of the lid 64 is relatively small, and the ceiling surface 64e on the recess 64a side. Therefore, the communication hole section 92 is easily affected by, for example, occurrence of a crack due to stress. Stress concentration can be prevented. Therefore, a breakage prevention effect is conspicuous.

The hole section 90 functioning as the through-hole is sealed by the sealing member 94. In detail, as shown in FIG. 7, the lid 64 is hermetically joined (fixed) to the principal plane 16 of the substrate 12 using, for example, a bonding method by an adhesive, an anodic bonding method, or a direct bonding section. Thereafter, a part of the sealing member 94 is placed on the communication hole section 92 to fit in the recessed section 91. Thereafter, a laser beam, an electron beam, or the like is irradiated on the sealing member 94. The melted sealing member 94 spreads into the recessed section 91 and the communication hole section 92 is sealed (closed). The sealing member 94 used here is configured by a spherical body that is larger than the diameter of the communication hole section 92 and can be housed in the recessed section 91.

The lid 64 is joined to the substrate 12 via the joining member 63. A space including the recess 22 of the substrate 12 and the recess 64a of the lid 64 is represented as a cavity (a housing space) S. The cavity (the housing space) S of the acceleration sensor 1 hermetically sealed by the sealing of the hole section 90 is filled with an inert gas such as nitrogen, helium, or argon and is in a state close to the atmospheric pressure or a decompressed state (a state with a high vacuum degree).

An inner wall surface 64c of the recess 64a of the lid 64 is formed substantially perpendicular to a joining surface 64d to the substrate 12 (inclination of approximately ±7 degrees is in an allowable range). A constituent material of the lid 64 is not particularly limited. For example, silicon, glass, and the like can be suitably used. It is assumed that silicon is used as a main material of the lid 64. In surely forming the shape of the lid 64 in this embodiment, a (100) plane of silicon desirably extends along the outer surface 64b. By using such a silicon substrate, it is possible to easily form the recessed section 91 having the rectangular shape (the substantially square pyramid shape) in the plan view explained above.

A constituent material of the sealing member 94 is not particularly limited. An Au—Ge alloy, an Au—Sn alloy, an Sn—Pb alloy, a Pb—Ag alloy, and the like can be suitably used. The configuration of the metal layer 93 is not particularly limited. A configuration in which Au is stacked on a base layer of a Ti—W alloy, a configuration in which Au is stacked on a base layer of Cr, and the like can be suitably used.

In the above explanation, the configuration of the hole section 90 is a one-stage configuration of the recessed section 91. However, the configuration of the hole section 90 is not limited to this. The configuration of the hole section 90 can be a multistage configuration, for example, the recessed section 91 is divided to form a two-stage configuration or a recess of a three-stage configuration is formed.

The circuit element 120 is bonded to the upper surface of the sensor unit 10 via the adhesive material 121. That is, the circuit element 120 is bonded on, via the adhesive material 121, the outer surface 64b of the lid 64 in a region overlapping the hole section 90. The adhesive material 121 is not particularly limited if the circuit element 120 can be fixed on the sensor unit 10. For example, solder, silver paste, a resin-based adhesive material (a die attach material), and the like can be used.

The circuit element 120 includes, for example, a driving circuit configured to drive the acceleration sensor 1, a detection circuit configured to detect the acceleration Ax based on a signal from the acceleration sensor 1, and an output circuit configured to convert a signal from the detection circuit into a predetermined signal and output the predetermined signal. The circuit element 120 includes a plurality of electrode pads (not shown in FIG. 1) on the upper surface. The electrode pads are electrically coupled to the first terminal electrode 34, the second terminal electrode 40, and the third terminal electrode 46 of the substrate 12 via bonding wires (not shown in FIG. 1). Consequently, it is possible to control the acceleration sensor 1 including the sensor unit 10.

With the acceleration sensor 1 explained above, the region at the peripheral edge of the metal layer 93 provided to extend to the peripheral edge of the opening of the hole section 90 functioning as the through-hole provided on the surface of the lid 64, that is, the outer surface 64b at the opposite side of the side of the physical quantity sensor element piece is configured to gradually decrease in thickness further away from the opening of the hole section 90 in the sectional view from the Y-axis direction. That is, the thickness of the region at the peripheral edge of the metal layer 93 is smaller at the opposite side of the opening side of the hole section 90 than the opening side of the hole section 90. Consequently, the level difference due to the thickness of the metal layer 93 decreases at the end portion at the peripheral edge of the metal layer 93. It is possible to improve stability of bonding of the lid 64 and the circuit element 120 by the adhesive material 121. It is possible to reduce distortion (stress) that occurs in the adhesive material 121. As a result, it is possible to reduce fluctuation of a bias output signal due to the distortion stress that occurs in the adhesive material 121.

The thickness of the region at the peripheral edge of the metal layer 93 may be smaller in a position away from the opening than the opening side of the hole section 90. The region at the peripheral edge of the metal layer 93 may be an inclined surface decreasing in thickness further away from the opening of the hole section 90. With such a configuration, the level difference due to the thickness of the region at the peripheral edge of the metal layer 93, that is, the thickness of the end portion at the peripheral edge of the metal layer 93 is smaller than the level difference on the opening side of the hole section 90. Therefore, it is possible to improve stability of bonding of the lid 64 and the circuit element 120 by the adhesive material 121.

Manufacturing Method for the Acceleration Sensor

A manufacturing method for the acceleration sensor 1 explained above as an example of the physical quantity sensor is explained with reference to FIGS. 8, 9A to 9E, 10A, and 10B. FIG. 8 is a flowchart showing a main manufacturing process of the acceleration sensor. FIGS. 9A to 9E are schematic sectional views for explaining the main manufacturing process of the acceleration sensor. Sectional positions of FIGS. 9A to 9E are the same as the sectional position of FIG. 1. The components of the acceleration sensor 1 explained above are denoted by the same reference numerals and signs. FIG. 10A is a sectional view showing a schematic configuration of a mask. FIG. 10B is a plan view showing the schematic configuration of the mask.

As shown in FIG. 8, the manufacturing method for the acceleration sensor 1 according to this embodiment includes a step S101 for preparing the physical quantity sensor element, a step S103 for placing the mask over the lid, a step S105 for forming an electrode, a step S107 for removing the mask, a step S109 for sealing the through-hole, and a step S111 for bonding the circuit element.

Step S101 for Preparing the Physical Quantity Sensor Element

Figure 9A:
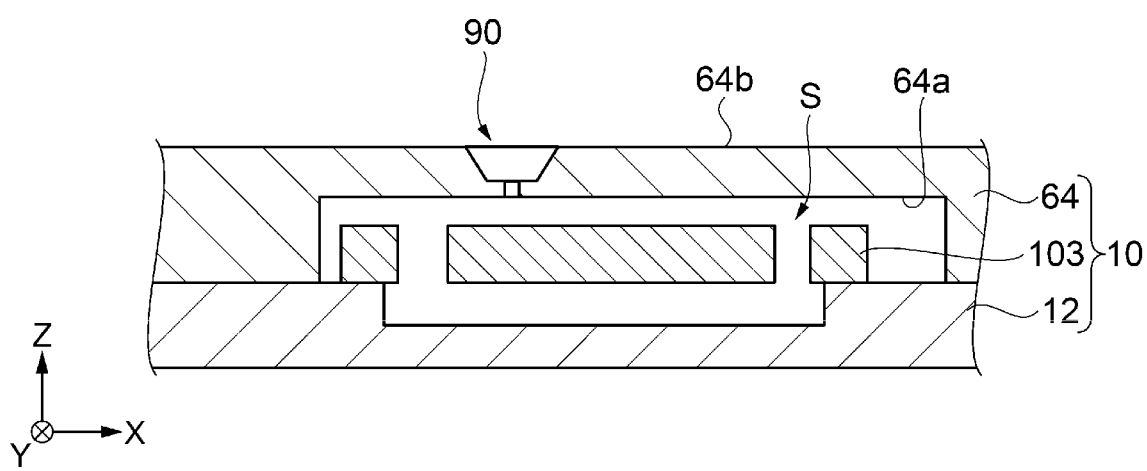
FIG. 9A is a schematic sectional view for explaining a manufacturing process of the acceleration sensor.
Figure 10A:
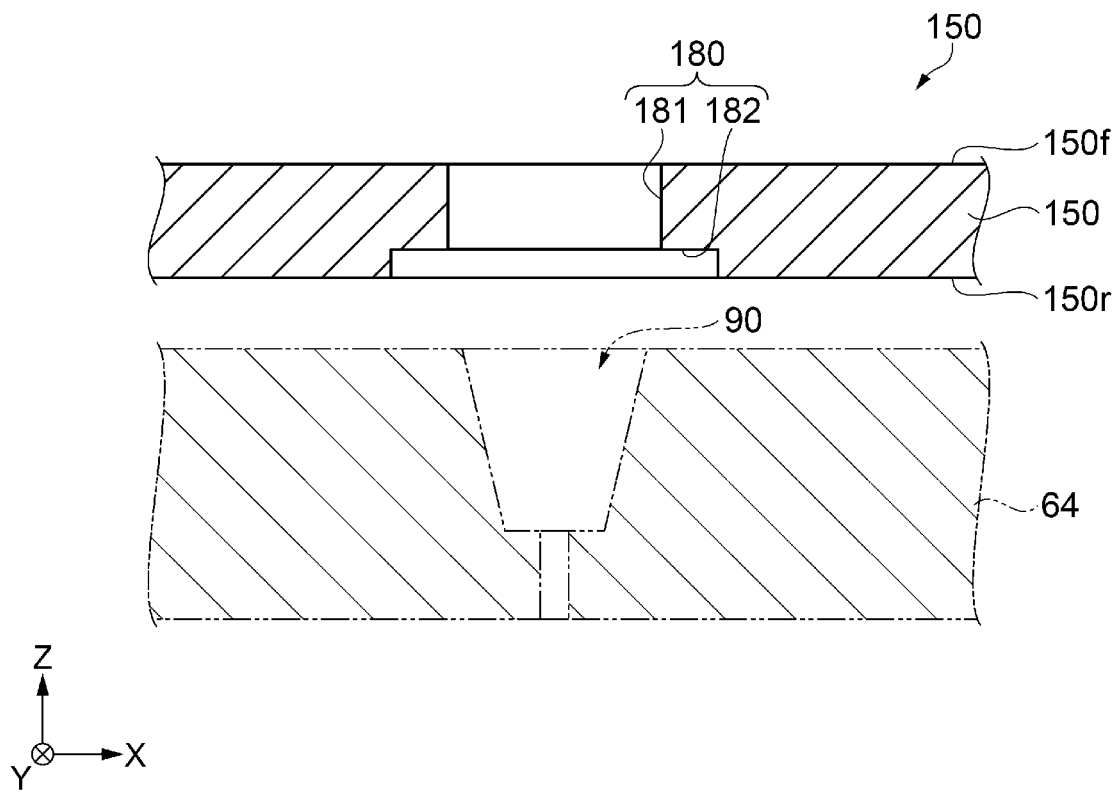
FIG. 10A is a sectional view showing a schematic configuration of a mask.
Figure 10B:
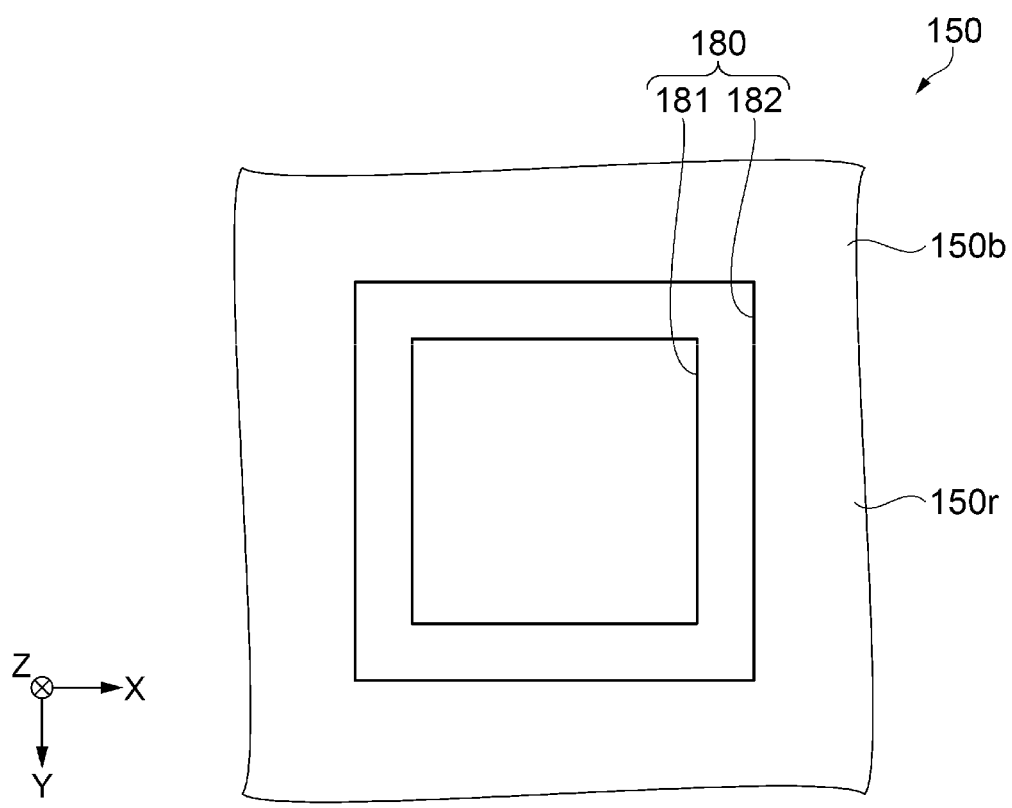
FIG. 10B is a plan view showing the schematic configuration of the mask.

First, in step S101, as shown in FIG. 9A, the sensor unit 10 functioning as the physical quantity sensor element is prepared. The sensor unit 10 includes the substrate 12 having a substantially rectangular flat shape, the lid 64 provided with the recess 64a at the side opposed to the substrate 12 and joined to the substrate 12, and the functional element 103 functioning as the physical quantity sensor element piece provided in the housing space S between the substrate and the lid 64. In the lid 64, the hole section 90 functioning as the through-hole piercing through the lid 64 from the recess 64a to the outer surface 64b, which is the surface on the opposite side of the functional element 103 side, is provided.

Step S103 for Placing the Mask over the Lid

Figure 9B:
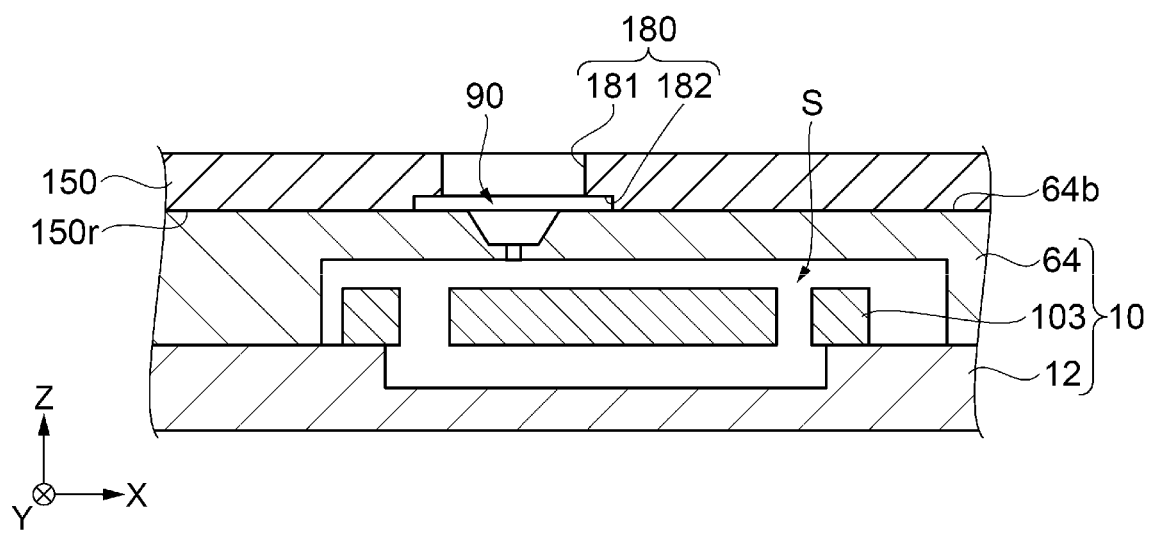
FIG. 9B is a schematic sectional view for explaining the manufacturing process of the acceleration sensor.

Subsequently, in step S103, as shown in FIG. 9B, at the side of the outer surface 64b of the lid 64, a mask 150 for forming the metal layer 93 functioning as the electrode is placed in the inside of the hole section 90 of the lid 64 and in a peripheral edge region of the opening of the hole section 90 on the outer surface 64b.

The mask 150 is a so-called opening mask including a base material 150b and an opening 180 provided in the base material 150b as shown in FIGS. 10A and 10B. The mask 150 is positioned such that the opening 180 is opposed to the inside of the hole section 90 of the lid 64, which is the formation region of the metal layer 93, and in the peripheral edge region of the opening of the hole section 90 on the outer surface 64b. The mask 150 is placed over the lid 64. The mask 150 may be set in contact with the outer surface 64b of the lid 64.

The opening 180 includes a piercing-through section 181 provided to be opposed to the hole section 90 of the lid 64 and the peripheral edge region, which is the region on the opening side at the peripheral edge of the opening of the hole section 90 on the outer surface 64b, and a cutout section 182, which is a concave section extending in a direction away from the outer edge of the piercing-through section 181 on a lower surface 150r functioning as an opposed surface, which is a surface on a contact side of the mask 150 with the lid 64. The opening 180 pierces through, with the piercing-through section 181 and the cutout section 182, the lower surface 150r of the mask 150 and an upper surface 150f, which is a surface on the opposite side of the lower surface 150r. The outer edge of the cutout section 182 is desirably provided to be located further on the outer side than the end portion of the outer edge of the metal layer 93 formed on the outer surface 64b of the lid 64.

By using the mask 150 provided with the cutout section 182 as explained above, in formation of the metal layer 93 explained in detail below in explanation of the step S105, it is possible to easily form the gradually decreasing region AL2, the thickness of which gradually decreases further away from the hole section 90, in the region at the peripheral edge of the opening of the recessed section 91 of the metal layer 93 provided on the outer surface 64b of the lid 64.

As the mask 150, a mask obtained by providing, in the base material 150b such as a metal plate of stainless steel or the like or a silicon substrate, the opening 180 patterned in order to form the metal layer 93 can be applied. In particular, when the silicon substrate is used as the base material 150b of the mask 150, it is possible to improve adhesion of the lid 64 and the mask 150 at the time when the mask 150 is placed over the lid 64. It is possible to improve formation accuracy of the metal layer 93 explained below.

Step S105 for Forming an Electrode

Figure 9C:
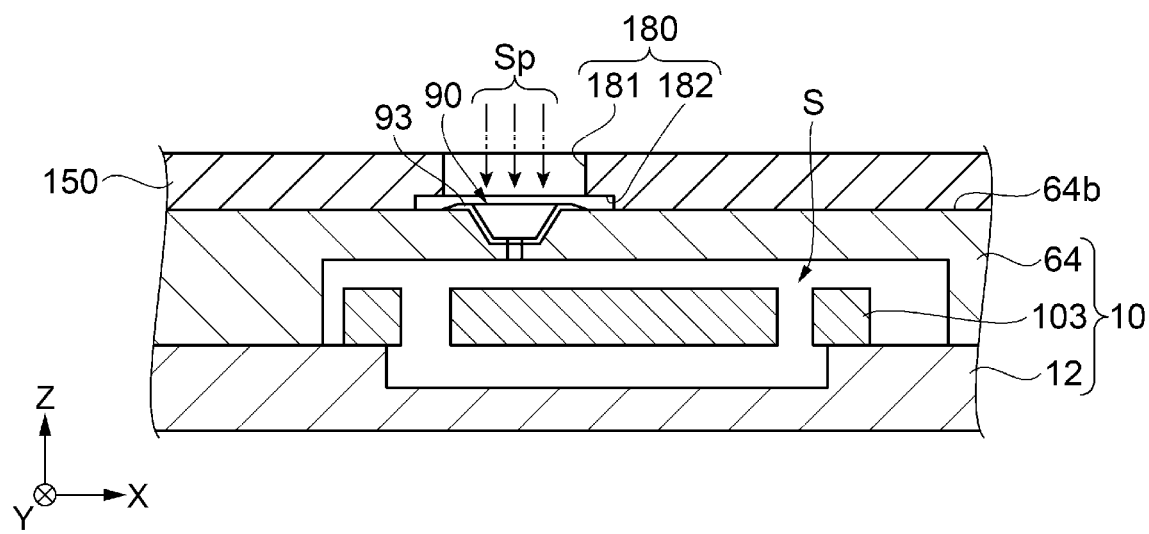
FIG. 9C is a schematic sectional view for explaining the manufacturing process of the acceleration sensor.

Subsequently, in the step S105, as shown in FIG. 9C, the metal layer 93 functioning as the electrode is formed in the inside of the hole section 90 of the lid 64 and the peripheral edge region of the opening of the hole section 90 on the outer surface 64b using, for example, a sputtering method. In the sputtering method, the metal layer 93 is formed by selectively applying or depositing metal particles Sp sprung out from target metal, which is a material of the metal layer 93, in the inside of the hole section 90 of the lid 64 and in the outer edge region of the hole section 90 on the outer surface 64b by the opening 180 of the mask 150. The configuration of the metal layer 93 is not particularly limited. A configuration in which Au is stacked on a base layer of a Ti—W alloy, a configuration in which Au is stacked on a base layer of Cr, and the like can be suitably used. In the formation of the metal layer 93, a vacuum deposition method can also be used instead of the sputtering method.

By using the mask 150 and applying the sputtering method or the vacuum deposition method in this way, it is possible to easily form the metal layer 93 including the gradually decreasing region AL2, the thickness of which gradually decreases further away from the hole section 90, in the inside of the hole section 90 of the lid 64 and in the peripheral region of the opening of the hole section 90 on the outer surface 64b.

In detail, the metal particles SP sprung out from the target metal fly toward the opening 180 of the mask 150. At this time, in the piercing-through section 181 in the opening 180, the metal particles Sp reach the lid 64 without being blocked. The metal particles Sp intruding into the cutout section 182, which is the concave section, provided around the piercing-through section 181 reaches a region around the piercing-through section 181. An intrusion amount of the metal particles Sp intruding into the cutout section 182 in this way decreases further away from the piercing-through section 181. Therefore, metal particles to be deposited gradually decrease. Therefore, it is possible to easily form the metal layer 93 including the gradually decreasing region AL2, the thickness of which gradually decreases further away from the hole section 90, in the inside of the hole section 90 of the lid 64 and in the peripheral region of the opening of the hole section 90 on the outer surface 64b.

Step S107 for Removing the Mask

Figure 9D:
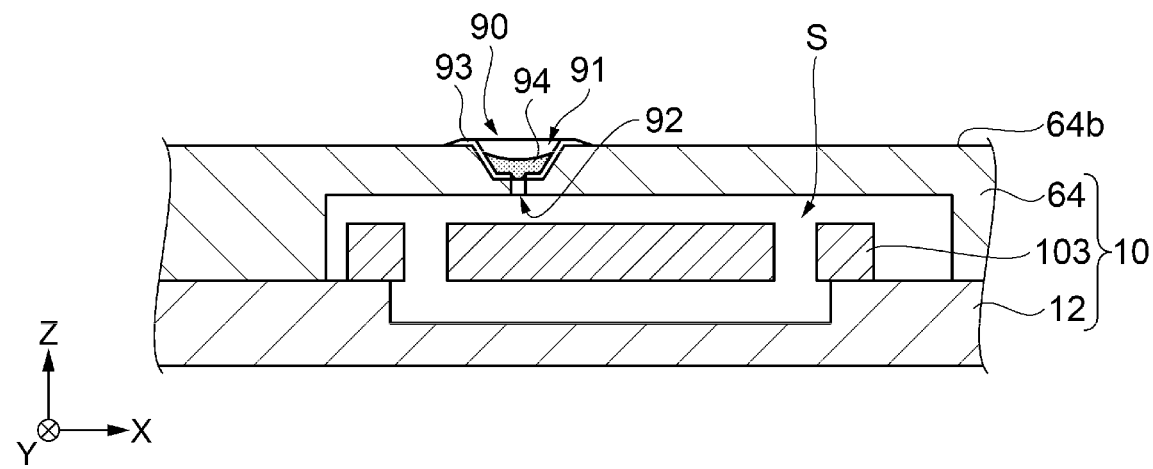
FIG. 9D is a schematic sectional view for explaining the manufacturing process of the acceleration sensor.

Subsequently, in the step S107, as shown in FIG. 9D, the mask 150 over the lid 64 is removed. Consequently, the lid 64 in which the metal layer 93 is formed in the inside of the hole section 90 and the peripheral edge region of the opening of the hole section 90 on the outer surface 64b is exposed.

Step S109 for Sealing the Through-Hole

Subsequently, in the step S109, as shown in FIG. 9D, the hole section 90 is sealed by the sealing member 94. In the step S109, in a state in which the hole section 90 is filled with an inert gas such as nitrogen, helium, or argon and is in a state close to the atmospheric pressure or a decompressed state (a state with a high vacuum degree), the spherical sealing member 94 is placed to cover the communication hole section 92 in the recessed section 91 of the hole section 90. A not-shown laser beam, electron beam, or the like is irradiated on the spherical sealing member 94 to melt the sealing member 94, the melted sealing member 94 is spread into the recessed section 91, and the hole section 90 (the communication hole section 92) is sealed (closed). In this case, since the recessed section 91 is provided in a substantially square pyramid shape, a sectional shape of which is formed in a substantially trapezoidal shape, gaps are formed in the spherical sealing member 94 and at four corner portions of the recessed section 91. In a state in which the spherical sealing member 94 is set, it is possible to easily perform intake and discharge of the air such as exhaust when the atmosphere in the cavity (the housing space) S is adjusted. A constituent material of the sealing member 94 is not particularly limited. An Au—Ge alloy, an Au—Sn alloy, a Sn—Pb alloy, a Pb—Ag alloy, and the like can be suitably used.

Step S111 for Bonding the Circuit Element

Figure 9E:
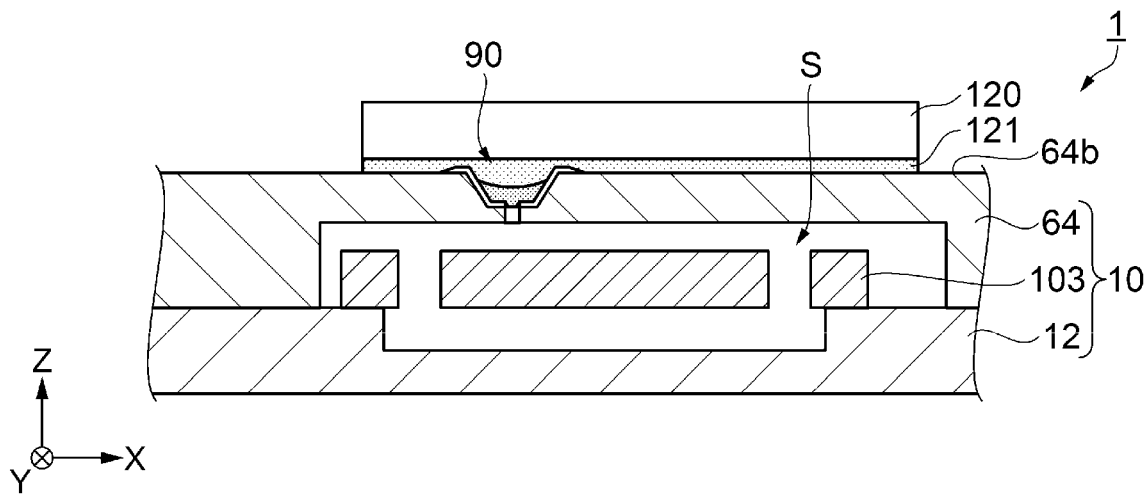
FIG. 9E is a schematic sectional view for explaining the manufacturing process of the acceleration sensor.

Subsequently, in step S111, as shown in FIG. 9E, the circuit element 120 is bonded to the outer surface 64b of the lid 64 via the adhesive material 121. The circuit element 120 is bonded on the outer surface 64b of the lid 64 in the region overlapping the hole section 90 with an active surface, on which a not-shown plurality of electrode pads are provided, set as an upper side and with a lower surface on the opposite side of the active surface set over the lid 64 side. The adhesive material 121 is not particularly limited if the circuit element 120 can be fixed on the sensor unit 10. For example, solder, silver paste, a resin-based adhesive material (a die attach material), and the like can be used. As the resin-based adhesive material (the die attach material), for example, a conductive adhesive material, a base material of which is resin such as epoxy resin, silicone resin, acrylic resin, or urethane resin, or a nonconductive adhesive can be applied.

Through the step S101 to the step S111 explained above, it is possible to obtain the acceleration sensor 1 including the gradually decreasing region AL2, the thickness of which gradually decreases further away from the hole section 90, in the region at the peripheral edge of the opening of the recessed section 91 of the metal layer 93 provided on the outer surface 64b of the lid 64. Therefore, in the obtained acceleration sensor 1, the region at the peripheral edge of the metal layer 93 provided to extend to the peripheral edge of the opening of the hole section 90 functioning as the through-hole provided on the surface of the lid 64, that is, the outer surface 64b at the opposite side of the side of the physical quantity sensor element piece is configured to gradually decrease in thickness further away from the hole section 90 in the sectional view from the Y-axis direction. Consequently, the level difference due to the thickness of the metal layer 93 decreases at the end portion of the peripheral edge of the metal layer 93. It is possible to improve stability of the bonding of the lid 64 and the circuit element 120 by the adhesive material 121. It is possible to reduce fluctuation of a bias output signal due to instability of the bonding.

In detail, as explained above with reference to FIG. 6, in the metal layer 93a at the outer edge of the opening of the hole section 90a, which is the through-hole in the past, the level difference due to the thickness of the metal layer 93a is present in the portion of the end portion 93s of the peripheral edge. Therefore, the air bubble (the void) Bd is easily held up between the adhesive material 121a and the end portion 93s at the peripheral edge of the metal layer 93a.

On the other hand, in the acceleration sensor 1 obtained by the manufacturing method explained above, the region at the peripheral edge of the metal layer 93 provided to extend to the peripheral edge of the opening of the hole section 90 functioning as the through-hole provided on the surface of the lid 64, that is, the outer surface 64b at the opposite side of the side of the physical quantity sensor element piece is configured to gradually decrease in thickness further away from the opening of the hole section 90 in the sectional view from the Y-axis direction and not to cause a level difference. Consequently, it is possible to prevent an air bubble from being easily held up between the adhesive material 121 and the end portion of the peripheral edge of the metal layer 93. It is possible to prevent fluctuation of a bias output signal due to distortion caused because of imbalance of thermal stress that occurs around the air bubble from easily occurring.

Modifications Related to the Configuration of the Metal Layer

Figure 11:
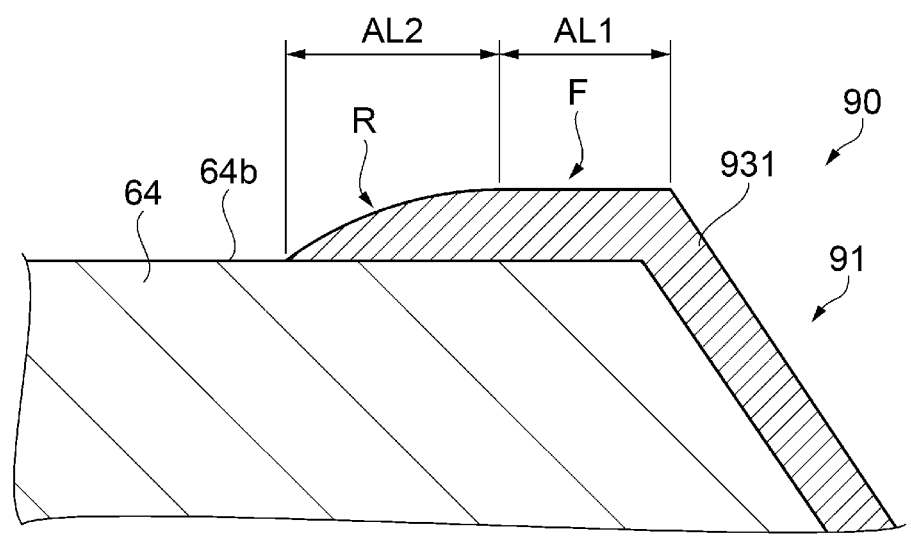
FIG. 11 is a partially enlarged view (a sectional view) showing a modification 1 of the configuration of the metal layer at the outer edge of the opening of the through-hole.
Figure 12:
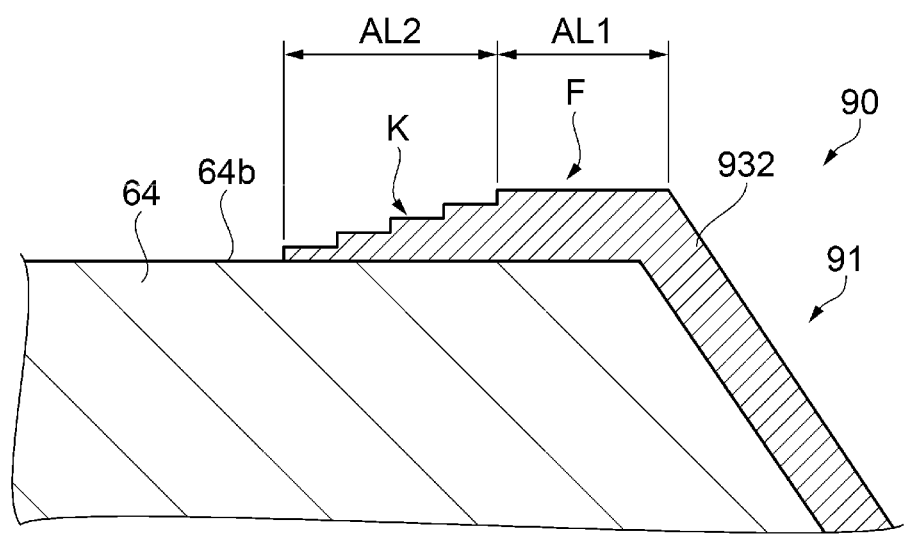
FIG. 12 is a partially enlarged view (a sectional view) showing a modification 2 of the configuration of the metal layer at the outer edge of the opening of the through-hole.

The configuration of the metal layer 93 provided in the lid 64 is not limited to the configuration explained above. Various modifications can be performed. Modifications related to the configuration of the metal layer 93 are explained with reference to FIGS. 11 and 12. FIGS. 11 and 12 are partially enlarged views (sectional views) showing modifications of the configuration of the metal layer at the outer edge of the opening of the through-hole. FIG. 11 shows a configuration of a modification 1. FIG. 12 shows a configuration of a modification 2. The same components as the components in the embodiment explained above are denoted by the same reference numerals and signs. Explanation of the components is omitted.

Modification 1 of the Metal Layer

As shown in FIG. 11, a metal layer 931 according to the modification 1 is provided to extend from the inner wall of the recessed section 91 of the hole section 90 functioning as the through-hole to the peripheral edge of the opening of the recessed section 91 of the outer surface 64b of the lid 64. A region at the peripheral edge of the opening of the recessed section 91 in the metal layer 931 provided on the outer surface 64b includes a region close to the recessed section 91, that is, the region AL1 having the plane F having substantially the same thickness in the sectional view from the Y-axis direction and the gradually decreasing region AL2 of the metal layer 931 continuously provided from the plane F of the region AL1 toward the opposite side of the recessed section 91 side. The gradually decreasing region AL2 is configured by a curved surface R, which is a surface having a curved surface shape, where the thickness of the metal layer 931 gradually decreases further away from the recessed section 91 starting from the region AL1 of the plane F. That is, in the metal layer 931 on the outer surface 64b of the lid 64, in the region at the peripheral edge of the opening of the recessed section 91 of the metal layer 931 provided on the outer surface 64b, the curved surface R where the thickness of the metal layer 931 gradually decreases further away from the hole section 90 hardly causes a level difference due to the thickness of the peripheral end portion at the opposite side of the recessed section 91.

With such a metal layer 931 according to the modification 1, since the surface of the region at the peripheral edge of the metal layer 931 is configured by the curved surface R having the curved surface shape, the level difference due to the thickness of the peripheral end portion at the opposite side of the recessed section 91 of the metal layer 931 hardly occurs. Therefore, it is possible to improve stability of the bonding of the lid 64 and the circuit element 120 by the adhesive material 121. It is possible to reduce fluctuation of a bias output signal due to instability of the bonding.

Modification 2 of the Metal Layer

As shown in FIG. 12, a metal layer 932 according to the modification 2 is provided to extend from the inner wall of the recessed section 91 of the hole section 90 functioning as the through-hole to the peripheral edge of the opening of the recessed section 91 of the outer surface 64b of the lid 64. A region at the peripheral edge of the opening of the recessed section 91 in the metal layer 932 provided on the outer surface 64b includes a region close to the recessed section 91, that is, the region AL1 having the plane F having substantially the same thickness of the metal layer 932 in the sectional view from the Y-axis direction and the gradually decreasing region AL2 of the metal layer 932 continuously provided from the plane F of the region AL1 toward the opposite side of the recessed section 91 side. The gradually decreasing region AL2 is configured by a step-wise surface K where the thickness of the metal layer 932 gradually decreases further away from the recessed section 91 starting from the region AL1 of the plane F. That is, in the metal layer 932 on the outer surface 64b of the lid 64, in the region at the peripheral edge of the opening of the recessed section 91 of the metal layer 932 provided on the outer surface 64b, the step-wise surface K where the thickness of the metal layer 932 gradually decreases further away from the hole section 90 hardly causes a level difference due to the thickness of the peripheral end portion at the opposite side of the recessed section 91.

With such a metal layer 932 according to the modification 2, since the surface of the region at the peripheral edge of the metal layer 932 is configured by the step-wise surface K, the level difference due to the thickness of the peripheral end portion at the opposite side of the recessed section 91 of the metal layer 932 hardly occurs. Therefore, it is possible to improve stability of the bonding of the lid 64 and the circuit element 120 by the adhesive material 121. It is possible to reduce fluctuation of a bias output signal due to instability of the bonding.

In the configuration of the metal layers 93, 931, and 932, the region AL1 having the plane F may not be provided. The metal layers 93, 931, and 932 may include the inclined surface H, the curved surface R, the step-wise surface K, and the like, the thicknesses of which gradually decrease toward the ends of the outer edges of the metal layers 93, 931, and 932 starting from the opening of the hole section 90.

Bonding Region of the Metal Layer and the Circuit Element

Figure 13:
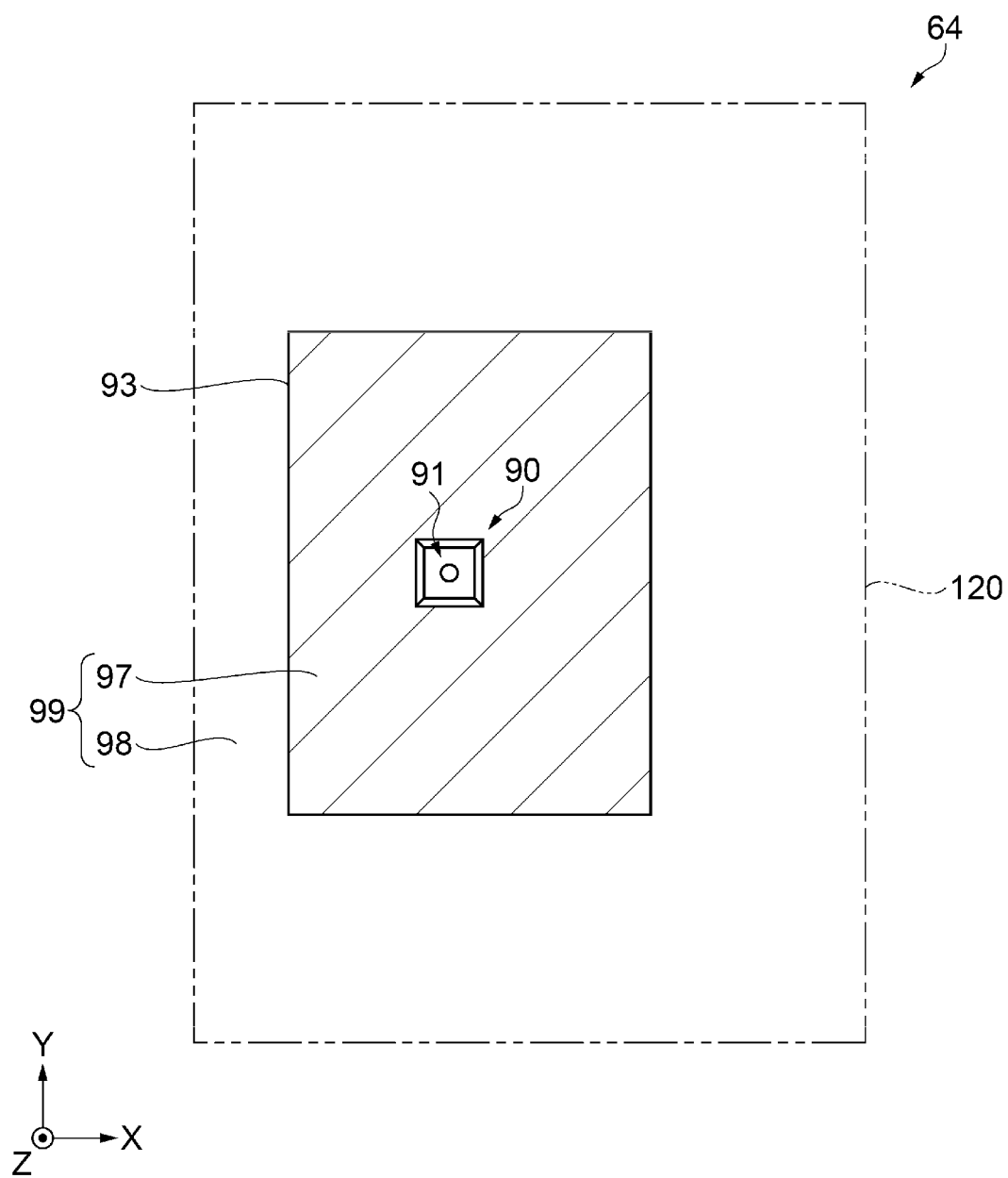
FIG. 13 is a plan view illustrating a bonding region of the metal layer at the outer edge of the opening of the through-hole and a circuit element.

A bonding region of the metal layer 93 and the circuit element 120 provided over the lid 64 is desirably disposed as shown in FIG. 13. The bonding region is explained below with reference to FIG. 13. FIG. 13 is a plan view illustrating a bonding region of the metal layer and the circuit element at the outer edge of the opening of the through-hole. The same components as the components in the embodiment are denoted by the same reference numerals and signs. Explanation of the configuration is omitted.

As shown in FIG. 13, a region 99 overlapping the circuit element 120 of the lid 64 desirably includes a formation region 97 of the metal layer 93 indicated by hatching in FIG. 13 where the metal layer 93 provided to extend from the inner wall of the recessed section 91 of the hole section 90 of the lid 64 to the peripheral edge of the opening of the recessed section 91 overlaps the circuit element 120 bonded to the lid 64 and a non-formation region 98 of the metal layer 93. In detail, the circuit element 120 is bonded to the lid 64 by the adhesive material 121 (see FIG. 1) provided over the formation region 97 where the metal layer 93 is provided and the non-formation region 98 where the metal layer 93 is not provided, the non-formation region 98 being disposed on the outer side at the opposite side of the recessed section 91 of the formation region 97.

By providing the non-formation region 98 of the metal layer 93 in the bonding region, which is the region 99 overlapping the circuit element 120 of the lid 64, it is possible to improve bonding strength of the adhesive material 121 (see FIG. 1) between the circuit element 120 and the lid 64.

Z-Axis Acceleration Sensor

By changing the configuration of the functional element 103 provided on the substrate 12, the acceleration sensor 1 explained above can be configured as an acceleration sensor capable of detecting the acceleration Az in the Z-axis direction. A configuration in which the acceleration sensor 1 is configured as a Z-axis acceleration sensor 2 is explained with reference to FIG. 14.

Figure 14:
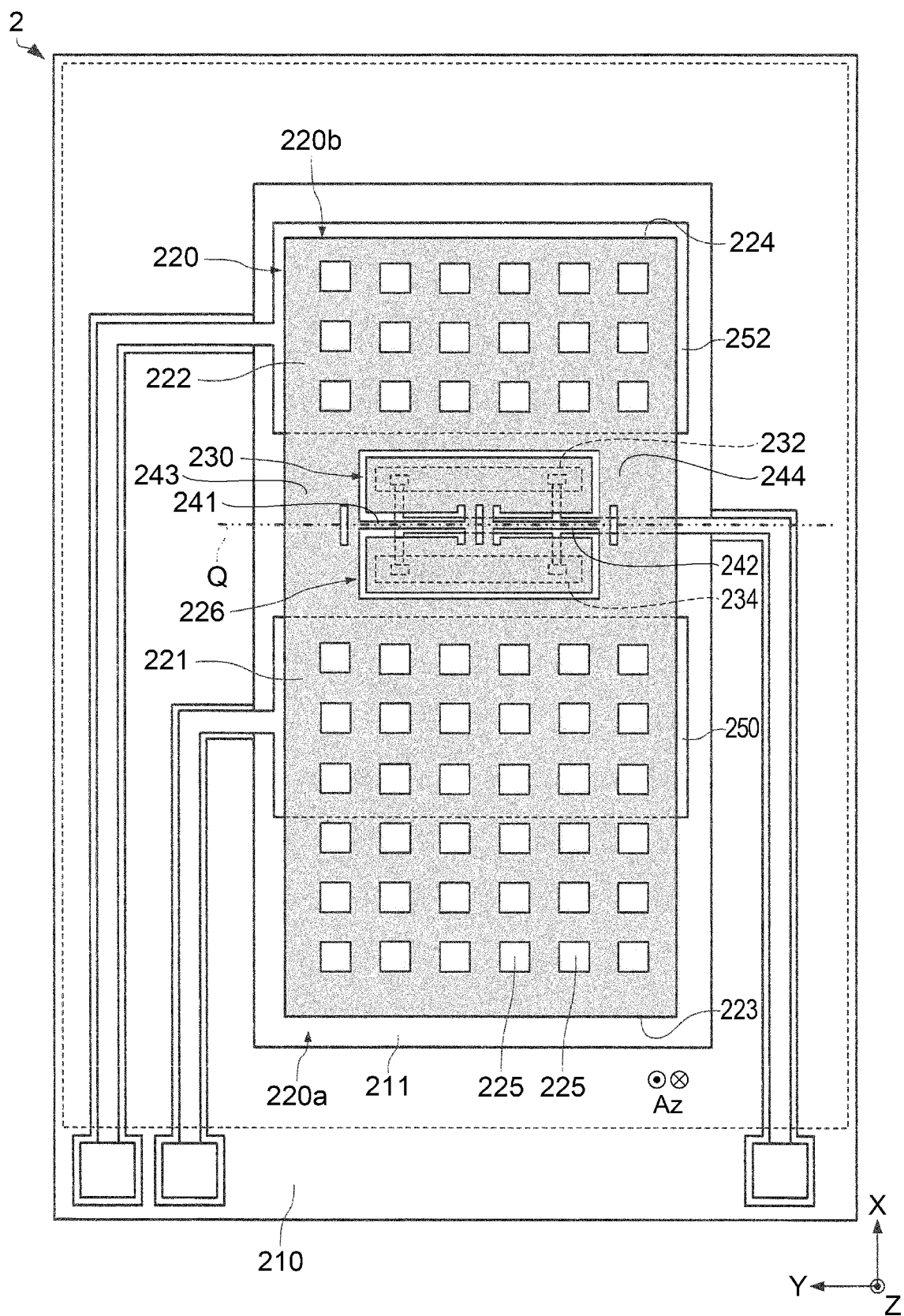
FIG. 14 is a plan view schematically showing a schematic configuration of an acceleration sensor that detects Z-axis acceleration.

As shown in FIG. 14, the Z-axis acceleration sensor 2 includes a movable body 220. Further, the movable body 220 includes a first movable section 220a and a second movable section 220b. The movable body 220 includes, in the plan view, across a support axis Q, the first movable section 220a on one side in a direction orthogonal to the support axis Q and the second movable section 220b on the other side in the orthogonal direction. The movable body 220 further includes a third beam section 243 and a fourth beam section 244 that couple the first movable section 220a and the second movable section 220b, a first beam section 241 that couples a first fixed section 232 and a second fixed section 234 and the third beam section 243, a second beam section 242 that couples the first fixed section 232 and the second fixed section 234 and the fourth beam section 244, and an opening 226 disposed between the third beam section 243 and the fourth beam section 244 in the plan view. The first movable section 220a is located on one side (in an example shown in FIG. 14, an −X-axis direction side) of the support axis Q in the plan view (when viewed from the Z-axis direction). The second movable section 220b is located on the other side (in the example shown in FIG. 14, a +X-axis direction side) of the support axis Q in the plan view.

When acceleration in the vertical direction (e.g., gravitational acceleration) is applied to the movable body 220, rotational moments (moments of force) are respectively generated in the first movable section 220a and the second movable section 220b. When the rotational moment (e.g., a counterclockwise rotational moment) of the first movable section 220a and the rotational moment (e.g., a clockwise rotational moment) of the second movable section 220b are balanced, a change does not occur in a tilt of the movable body 220. Acceleration cannot be detected. Therefore, the movable body 220 is designed such that, when the acceleration in the vertical direction is applied, the rotational moment of the first movable section 220a and the rotational moment of the second movable section 220b are not balanced and a predetermined tile occurs in the movable body 220.

In the Z-axis acceleration sensor 2, the support axis Q is disposed in a position deviating from the center (the center of gravity) of the movable body 220 (distances from the support axis Q to the distal ends of the first movable section 220a and the second movable section 220b are differentiated), whereby the mass of the first movable section 220a and the mass of the second movable section 220b are different from each other. That is, in the movable body 220, the mass on one side (the mass of the first movable section 220a) and the mass on the other side (the mass of the second movable section 220b) are different across the support axis Q. In an example shown in FIG. 14, the distance from the support axis Q to an end face 223 of the first movable section 220a is larger than the distance from the support axis Q to an end face 224 of the second movable section 220b. The thickness of the first movable section 220a and the thickness of the second movable section 220b are equal. Therefore, the mass of the first movable section 220a is larger than the mass of the second movable section 220b.

The mass of the first movable section 220a and the mass of the second movable section 220b are different from each other in this way. Consequently, when the acceleration in the vertical direction is applied, it is possible to prevent the rotational moment of the first movable section 220a and the rotational moment of the second movable section 220b from being balanced. Therefore, when the acceleration in the vertical direction is applied, it is possible to cause a predetermined tilt in the movable body 220.

Although not shown in FIG. 14, by disposing the support axis Q in the center of the movable body 220 and differentiating the thicknesses of the first movable section 220a and the second movable section 220b from each other, the mass of the first movable section 220a and the mass of the second movable section 220b may be differentiated from each other. Even in such a case, when the acceleration in the vertical direction is applied, it is possible to cause the predetermined tilt in the movable body 220.

The movable body 220 is provided separately from a substrate 210. The movable body 220 is provided above a recess 211. A gap is provided between the movable body 220 and the substrate 210. Consequently, the movable body 220 can swing.

The movable body 220 includes a first movable electrode 221 and a second movable electrode 222 provided across the support axis Q. The first movable electrode 221 is provided in the first movable section 220a. The second movable electrode 222 is provided in the second movable section 220b.

The first movable electrode 221 is a portion of the movable body 220 overlapping a first fixed electrode 250 in the plan view. The first movable electrode 221 forms capacitance C1 between the first movable electrode 221 and the first fixed electrode 250. That is, the capacitance C1 is formed by the first movable electrode 221 and the first fixed electrode 250.

The second movable electrode 222 is a portion of the movable body 220 overlapping a second fixed electrode 252 in the plan view. The second movable electrode 222 forms capacitance C2 between the second movable electrode 222 and the second fixed electrode 252. That is, the capacitance C2 is formed by the second movable electrode 222 and the second fixed electrode 252. In the Z-axis acceleration sensor 2, the movable body 220 is formed of a conductive material (silicon doped with impurities). Therefore, the first movable electrode 221 and the second movable electrode 222 are provided. That is, the first movable section 220a functions as the first movable electrode 221. The second movable section 220b functions as the second movable electrode 222.

The capacitance C1 and the capacitance C2 are set to be equal to each other, for example, in a state in which the movable section 220 is horizontal. The positions of the first movable electrode 221 and the second movable electrode 222 change according to a movement of the movable body 220. The capacitances C1 and C2 change according to the positions of the first movable electrode 221 and the second movable electrode 222. Predetermined potential is applied to the movable body 220 via a supporting section 230.

In the movable body 220, a through-hole 224 piercing through the movable body 220 is formed. Consequently, it is possible to reduce the influence of the air (the resistance of the air) when the movable body 220 swings. A plurality of through-holes 225 are formed. In the example shown in FIG. 14, a planar shape of the through-holes 225 is a square.

The opening 226 piercing though the movable body 220 is provided in the movable body 220. The opening 226 is provided on the support axis Q in the plan view. In the example shown in FIG. 14, a planar shape of the opening 226 is a rectangle.

The supporting section 230 is provided on the substrate 210. The supporting section 230 is located in the opening 226. The supporting section 230 supports the movable body 220. The supporting section 230 includes the first fixed section 232, the second fixed section 234, the first beam section 241, the second beam section 242, the third beam section 243, and the fourth beam section 244.

The first fixed section 232 and the second fixed section 234 are fixed to the substrate 210. The first fixed section 232 and the second fixed section 234 are provided across the support axis Q in the plan view. In the example shown in FIG. 14, the first fixed section 232 is provided in the +X-axis direction side of the support axis Q. The second fixed section 234 is provided on the −X-axis direction side of the support axis Q.

As explained above, the Z-axis acceleration sensor 2 including the movable body 220 is capable of detecting the acceleration Az in the Z-axis direction.

In the above explanation, the acceleration sensor 1 and the Z-axis acceleration sensor 2 capable of detecting acceleration of one axis are explained as the example of the physical quantity sensor. However, the physical quantity sensor is applicable to other sensors such as a three-axis acceleration sensor capable of detecting accelerations of three axes and a gyro sensor capable of detecting angular velocity.

Physical Quantity Sensor Device

Figure 15:
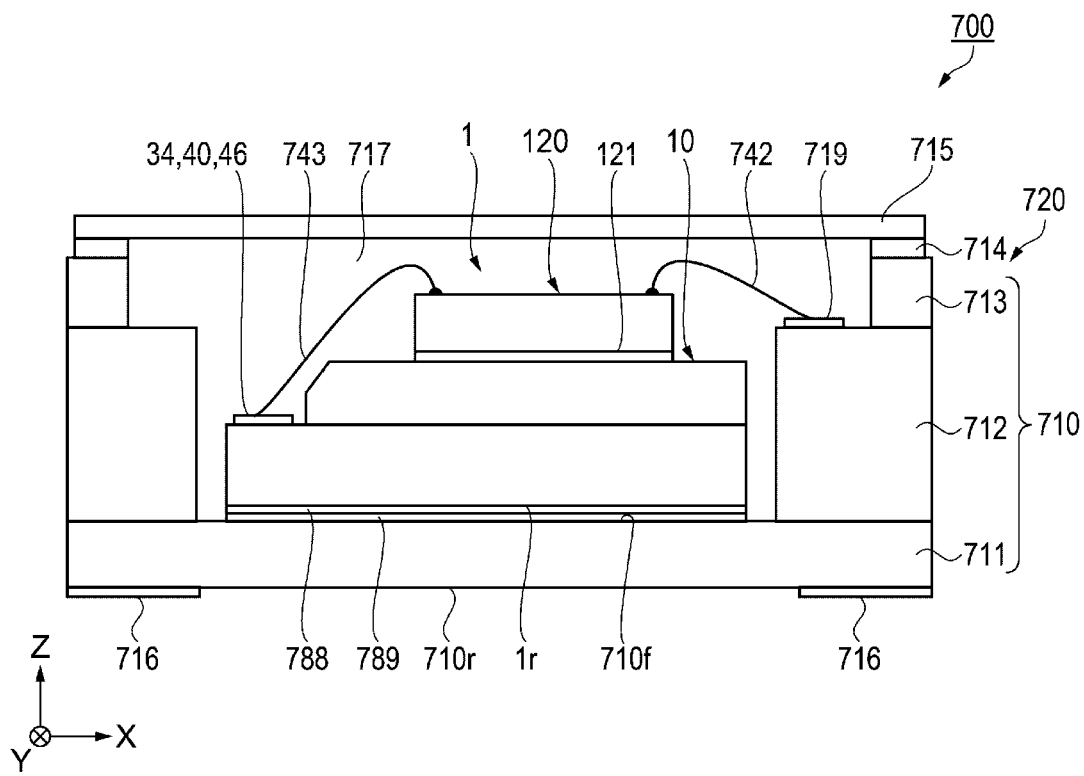
FIG. 15 is a sectional view showing a schematic configuration of a physical quantity sensor device (an acceleration sensor device).

A physical quantity sensor device (an acceleration sensor device) including the acceleration sensor 1 functioning as an example of the physical quantity sensor is explained with reference to FIG. 15. FIG. 15 is a sectional view showing a schematic configuration of the physical quantity sensor device (the acceleration sensor device). In FIG. 15, for convenience of explanation, an X axis, a Y axis, and a Z axis are illustrated as three axes orthogonal to one another. A direction parallel to the X axis is referred to as "X-axis direction", a direction parallel to the Y axis is referred to as "Y-axis direction", and a direction parallel to the Z axis is referred to as "Z-axis direction". A + (plus) Z-axis side, which is the lid side, is referred to as "upper" or "upward". A − (minus) Z-axis side at the opposite side of the lid side is referred to as "lower" or "downward".

As shown in FIG. 15, a physical quantity sensor device 700 including the acceleration sensor 1 functioning as an example of the physical quantity sensor explained above is usable as a one-axis acceleration sensor that can independently detect acceleration in one direction. Such a physical quantity sensor device 700 includes a package 720 and the acceleration sensor 1 configured by the sensor unit 10 housed in the package 720 and the circuit element 120 bonded on the sensor unit 10. A lower surface 1r of the acceleration sensor 1 is joined to the inner side (a housing space 717) of the package 720 by a resin adhesive material 788.

The package 720 includes a base section 710 configured by a first base material 711, a second base material 712, and a third base material 713 and a lid 715 coupled to the third base material 713 via a sealing member 714. The first base material 711, the second base material 712, and the third base material 713 are stacked in this order to configure the base section 710. The first base material 711 has a flat shape. The second base material 712 and the third base material 713 are annular bodies, the centers of which are removed. The sealing member 714 such as a seal ring or low-melting point glass is formed at the peripheral edge of the upper surface of the third base material 713.

In the package 720, a recess (a cavity) that houses the acceleration sensor 1 is formed by the second base material 712 and the third base material 713, which are the annular bodies, the centers of which are removed. In the package 720, an opening of the recess (the cavity) is closed by the lid 715, whereby the housing space (an inner space) 717, which is a sealed space, is provided. The acceleration sensor 1 can be housed in the housing space 717. In this way, the acceleration sensor 1 is housed in the housing space 717 provided between the package 720 and the lid 715. Consequently, the physical quantity sensor device 700 can be made compact. Illustration of a part of wiring patterns and electrode pads (terminal electrodes) formed in the base section 710 including the first base material 711 and the second base material 712 is omitted.

Ceramic or the like is suitably used as a constituent material of the first base material 711, the second base material 712, and the third base material 713. As the constituent material of the first base material 711, the second base material 712, and the third base material 713, glass, resin, metal, and the like may be used other than ceramics. As a constituent material of the lid 715, for example, a metal material such as Kovar, a glass material, a silicon material, a ceramic material, and a resin material can be used.

A plurality of internal terminals 719 are disposed on the upper surface of the second base material 712. A plurality of external terminals 716 are disposed on an outer bottom surface 710r of the package 720, which is the lower surface of the first base material 711. The internal terminals 719 are electrically coupled to the external terminals 716 corresponding to the internal terminals 719 via not-shown inner wires or the like. The internal terminals 719 and the external terminals 716 can be formed by, for example, a method of screen-printing a metal wiring material such as tungsten (W) or molybdenum (Mo) in a predetermined position and baking the metal wiring material and applying plating of nickel (Ni), gold (Au), or the like on the metal wiring material.

The lower surface 1r of the acceleration sensor 1 is coupled to a coupling pad 789 on an upper surface 710f of the first base material 711 configuring the base section 710 by the resin adhesive material 788. The acceleration sensor 1 is housed in the housing space 717 of the package 720. The housing space 717 of the package 720 is hermetically sealed in a decompressed atmosphere having pressure lower than the atmospheric pressure or an inert gas atmosphere such as nitrogen, argon, or helium.

The circuit element 120 is bonded to the upper surface of the sensor unit 10 via the adhesive material 121. The circuit element 120 includes, for example, a driving circuit that drives the sensor unit 10, a detection circuit that detects acceleration based on a signal from the sensor unit 10, and an output circuit that converts a signal from the detection circuit into a predetermined signal and outputs the predetermined signal. The circuit element 120 includes a plurality of electrode pads (not shown in FIG. 15) on the upper surface of the circuit element 120. The electrode pads are electrically coupled to the internal terminals 719 of the second base material 712 via a bonding wire 742. The other electrode pads are electrically coupled to coupling electrodes such as the first terminal electrode 34, the second terminal electrode 40, and the third terminal electrode 46 of the sensor unit 10 via a bonding wire 743. Consequently, the sensor unit 10 can be controlled.

In the physical quantity sensor device 700 explained above, the acceleration sensor 1 is housed in the package 720 having airtightness. Therefore, it is possible to obtain the physical quantity sensor device 700 that has the effects of the acceleration sensor 1 and is compact.

The configuration of the physical quantity sensor device 700 is not limited to the configuration explained above. For example, the sensor unit 10 and the circuit element 120 can be packaged by, for example, epoxy mold resin.

Composite Sensor

Figure 16:
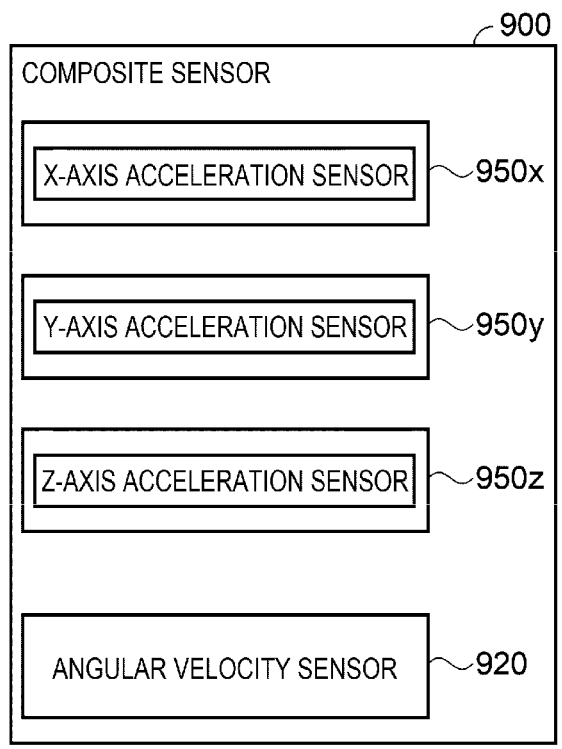
FIG. 16 is a functional block diagram showing a schematic configuration of a composite sensor.

A configuration example of a composite sensor including the acceleration sensor 1 and the Z-axis acceleration sensor 2, which are examples of the physical quantity sensor, is explained with reference to FIG. 16. FIG. 16 is a functional block diagram showing a schematic configuration of the composite sensor.

As shown in FIG. 16, a composite sensor 900 includes an X-axis acceleration sensor 950x and a Y-axis acceleration sensor 950y including the acceleration sensor 1 capable of detecting acceleration as explained above, a Z-axis acceleration sensor 950z including the Z-axis acceleration sensor 2, and an angular velocity sensor 920 including an angular velocity sensor element. The X-axis acceleration sensor 950x, the Y-axis acceleration sensor 950y, and the Z-axis acceleration sensor 950z can respectively highly accurately measure acceleration in one axial direction. The angular velocity sensor 920 includes three angular velocity sensor elements in order to respectively measure angular velocities in three axial directions. The composite sensor 900 can include a control circuit section (an IC: Integrate Circuit) including, for example, a driving circuit that drives the X-axis acceleration sensor 950x, the Y-axis acceleration sensor 950y, and the Z-axis acceleration sensor 950z, a detection circuit that detects accelerations in the X-axis, Y-axis, and Z-axis directions based on signals from the X-axis acceleration sensor 950x, the Y-axis acceleration sensor 950y, and the Z-axis acceleration sensor 950z, and an output circuit that converts a signal from the detection circuit into a predetermined signal and outputs the predetermined signal.

Such a composite sensor 900 can be easily configured by the X-axis acceleration sensor 950x and the Y-axis acceleration sensor 950y configured by the acceleration sensor 1 capable of detecting acceleration as explained above, the Z-axis acceleration sensor 950z configured by the Z-axis acceleration sensor 2, and the angular velocity sensor 920. For example, the composite sensor 900 can acquire acceleration data and angular velocity data.

Inertial Measurement Unit

Figure 17:
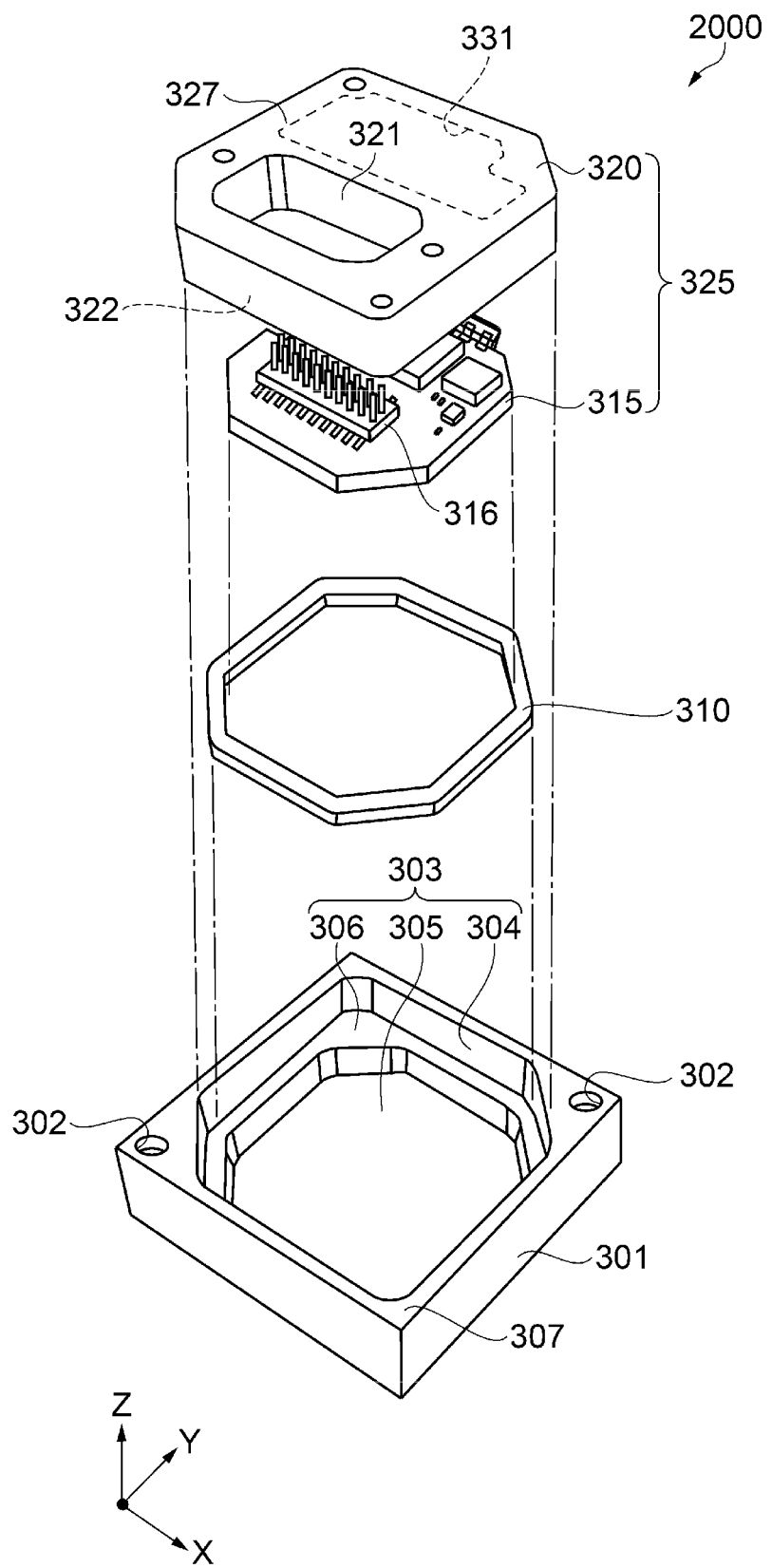
FIG. 17 is an exploded perspective view showing a schematic configuration of an inertial measurement unit.
Figure 18:
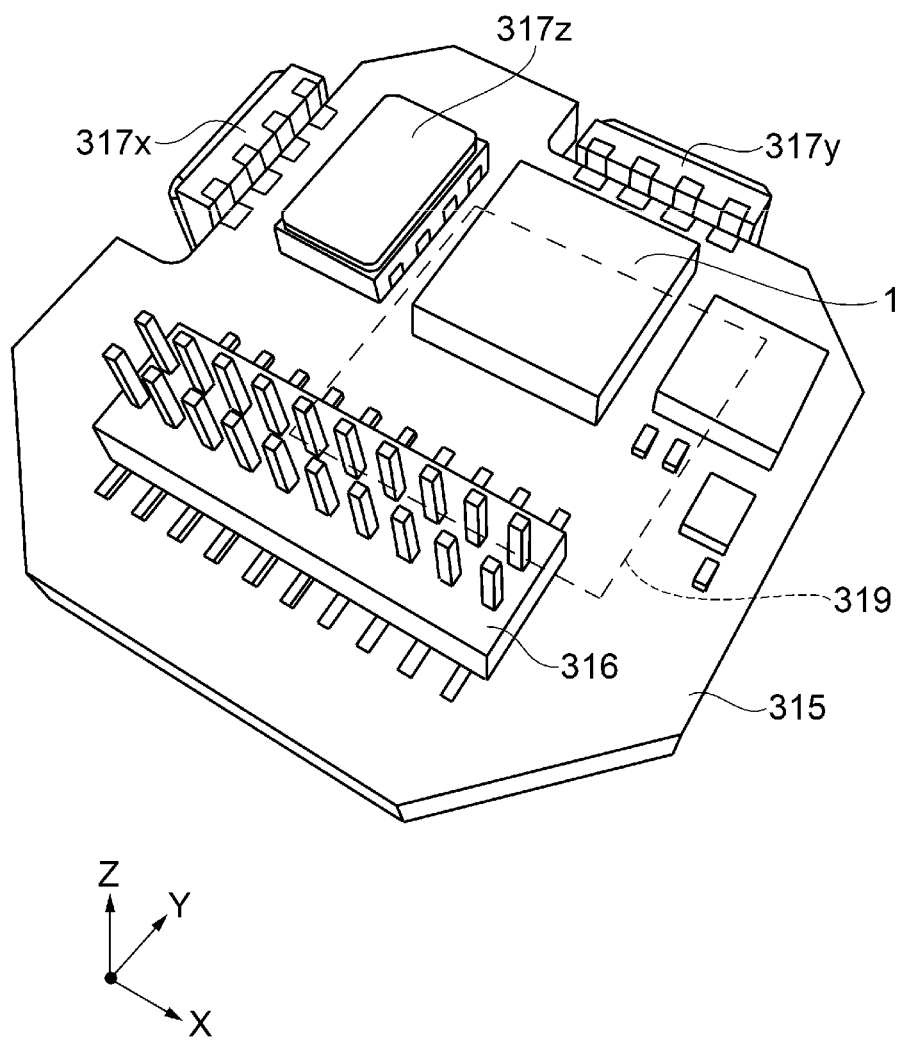
FIG. 18 is a perspective view showing a disposition example of an inertial sensor element of the inertial measurement unit.

An inertial measurement unit (IMU) is explained with reference to FIGS. 17 and 18. FIG. 17 is an exploded perspective view showing a schematic configuration of the inertial measurement unit. FIG. 18 is a perspective view showing a disposition example of an inertial sensor element of the inertial measurement unit. In the following explanation, an example is explained in which the acceleration sensor 1 capable of detecting the acceleration Ax is used.

As shown in FIG. 17, an inertial measurement unit 2000 is configured from an outer case 301, a joining member 310, a sensor module 325 including an inertial sensor element, and the like. In other words, the sensor module 325 is fit (inserted) into an inside 303 of the outer case 301 with intervention of the joining member 310. The sensor module 325 is configured from an inner case 320 and a substrate 315. To facilitate explanation, the components are referred to as outer case and inner case. However, the components may be referred to as first case and second case as well.

The outer case 301 is a pedestal obtained by cutting aluminum into a box shape. The material of the outer case 301 is not limited to aluminum. Another kind of metal such as zinc and stainless steel, resin, a composite material of metal and resin, or the like may be used. Like the overall shape of the inertial measurement unit 2000 explained above, the external shape of the outer case 301 is a rectangular parallelepiped, a planar shape of which is a substantial square. Through-holes (blind holes) 302 are respectively formed near vertexes in two places located in a diagonal direction of the square. Means for fixing the outer case 301 is not limited to the through-holes (blind holes) 302. For example, cutouts for enabling the outer case 301 to be screwed by screws (a structure in which cutouts are formed at corner portions of the outer case 301 where the through-holes (blind holes) 302 are located) may be formed to screw the outer case 301. Alternatively, a flange (an ear) may be formed at a side surface of the outer case 301 and screwed.

The outer case 301 has a box shape, the external shape of which is a rectangular parallelepiped, without a lid. The inside 303 (the inner side) of the outer case 301 is an internal space (a container) surrounded by a bottom wall 305 and a sidewall 304. In other words, the outer case 301 is formed in a box shape, one surface of which opposed to the bottom wall 305 is an opening surface. The sensor module 325 is housed to cover most of an opening of the opening surface (close the opening). The sensor module 325 is exposed from the opening (not shown in FIG. 17). The opening surface opposed to the bottom wall 305 is the same surface as an upper surface 307 of the outer case 301. A planar shape of the inside 303 of the outer case 301 is a hexagonal obtained by chamfering corners of two vertex portions of the square. The chamfered two vertex portions correspond to the positions of the through-holes (the blind holes) 302. In a sectional shape (a thickness direction) of the inside 303, in the bottom wall 305, a first joining surface 306 functioning as a bottom wall higher than the center is formed at the peripheral edge portion in the inside 303, that is, in the internal space. That is, the first joining surface 306 is a part of the bottom wall 305, is a step-wise part of one stage formed in a ring shape to planarly surround the center of the bottom wall 305, and is a surface, the distance to which from the opening surface (the same surface as the upper surface 307) is smaller than the distance from the bottom wall 305.

The example is explained above in which the external shape of the outer case 301 is the box shape, the planar shape of which is the rectangular parallelepiped of the substantial square, without the lid. However, the external shape of the outer case 301 is not limited to this. The planar shape of the external shape of the outer case 301 may be a polygon such as a hexagon or an octagon. Corners of vertex portions of the polygon may be chamfered. The planar shape may be a planar shape, sides of which are curved lines. The planar shape of the inside 303 (the inner side) of the outer case 301 is not limited to the hexagon and may be a quadrate (a quadrangle) such as a square or another polygonal shape such as an octagon. The external shape of the outer case 301 and the planar shape of the inside 303 may be similar shapes or may not be the similar shapes.

The inner case 320 is a member that supports the substrate 315. The inner case 320 is formed in a shape fit in the inside 303 of the outer case 301. In detail, planarly, the inner case 320 is a hexagon obtained by chamfering corners of two vertex portions of a square. An opening 321, which is a rectangular through-hole, and a recess 331 provided on a surface at a side for supporting the substrate 315 are formed in the hexagon. The chamfered two vertex portions correspond to the positions of the through-holes (the blind holes) 302 of the outer case 301. The height of the inner case 320 in the thickness direction (the Z-axis direction) is smaller than the height from the upper surface 307 to the first boding surface 306 of the outer case 301. In a preferred example, the inner case 320 is also formed by cutting aluminum. However, as in the outer case 301, other materials may be used.

On the rear surface (the surface on the outer case 301 side) of the inner case 320, guide pins for positioning the substrate 315 and a supporting surface (both of which are not shown in FIG. 17) are formed. The substrate 315 is set (positioned and mounted) on the guide pin and the supporting surface and bonded to the rear surface of the inner case 320. Details of the substrate 315 are explained below. The peripheral edge portion of the rear surface of the inner case 320 is a second joining surface 322 formed by a ring-like plane. The second joining surface 322 planarly has substantially the same shape as the first joining surface 306 of the outer case 301. When the inner case 320 is set in the outer case 301, the two surfaces are opposed to each other across the joining member 310. The structures of the outer case 301 and the inner case 320 are examples and are not limited to the structures.

The configuration of the substrate 315 mounted with the inertial sensor is explained with reference to FIG. 18. As shown in FIG. 18, the substrate 315 is a multilayer substrate on which a plurality of through-holes are formed. A glass epoxy substrate is used as the substrate 315. The substrate 315 is not limited to the glass epoxy substrate and only has to be a rigid substrate on which pluralities of inertial sensors, electronic components, connectors, and the like can be mounted. For example, a composite substrate and a ceramic substrate may be used.

On the front surface (the surface on the inner case 320 side) of the substrate 315, a connector 316, an angular velocity sensor 317z, the acceleration sensor 1 explained above as the physical quantity sensor, and the like are mounted. The connector 316 is a plug-type (male) connector. The connector 316 includes coupling terminals in two rows disposed at an equal pitch in the X-axis direction. The coupling terminals are suitably coupling terminals including pins in two rows each including ten pins, that is, twenty pins in total. The number of terminals may be changed as appropriate according to design specifications.

The angular velocity sensor 317z is a gyro sensor that detects angular velocity of one axis in the Z-axis direction. As a preferred example, a vibration gyro sensor that detects angular velocity from a Coriolis force applied to a vibrating object using quartz as a transducer is used. The angular velocity sensor 317z is not limited to the vibration gyro sensor and only has to be a sensor capable of detecting angular velocity. For example, a sensor in which ceramic or silicon is used as a transducer may be used.

On the side surface in the X-axis direction of the substrate 315, an angular velocity sensor 317x that detects angular velocity of one axis in the X-axis direction is mounted such that a mounting surface (a loading surface) is orthogonal to the X axis. Similarly, at the side surface in the Y-axis direction of the substrate 315, an angular velocity sensor 317y that detects angular velocity of one axis in the Y-axis direction is mounted such that a mounting surface (a loading surface) is orthogonal to the Y axis.

The angular velocity sensors 317x, 317y, and 317z are not limited to a configuration in which three angular velocity sensors for each axis are used. The angular velocity sensors 317x, 317y, and 317z only have to be a sensor capable of detecting angular velocities of three axes. A sensor device capable of detecting (sensing) angular velocities of three axes with one device (package) may be used.

In the acceleration sensor 1, the functional element 103 (see FIG. 2) of the capacitance type capable of detecting acceleration in one axial direction and obtained by machining, for example, a silicon substrate with a MEMS technique is used. According to necessity, the acceleration sensor 1 can be an acceleration sensor applied with an acceleration sensor element capable of detecting accelerations in two axial directions of the X axis and the Y axis or an acceleration sensor element capable of detecting accelerations in three axial directions.

A control IC 319 functioning as a control section is mounted on the rear surface (the surface on the outer case 301 side) of the substrate 315. The control IC 319 is an MCU (Micro Controller Unit). The control IC 319 incorporates a storing section including a nonvolatile memory, an A/D converter, and the like and controls the sections of the inertial measurement unit 2000. In the storing section, a program defining order and content for detecting acceleration and angular velocity, a program for digitizing detection data and incorporating the detection data in packet data, incidental data, and the like are stored. Besides, a plurality of electronic components are mounted on the substrate 315.

In such an inertial measurement unit 2000, the acceleration sensor 1 is used. Therefore, it is possible to provide the inertial measurement unit 2000 that enjoys the effects of the acceleration sensor 1.

Vehicle Positioning Device

Figure 19:
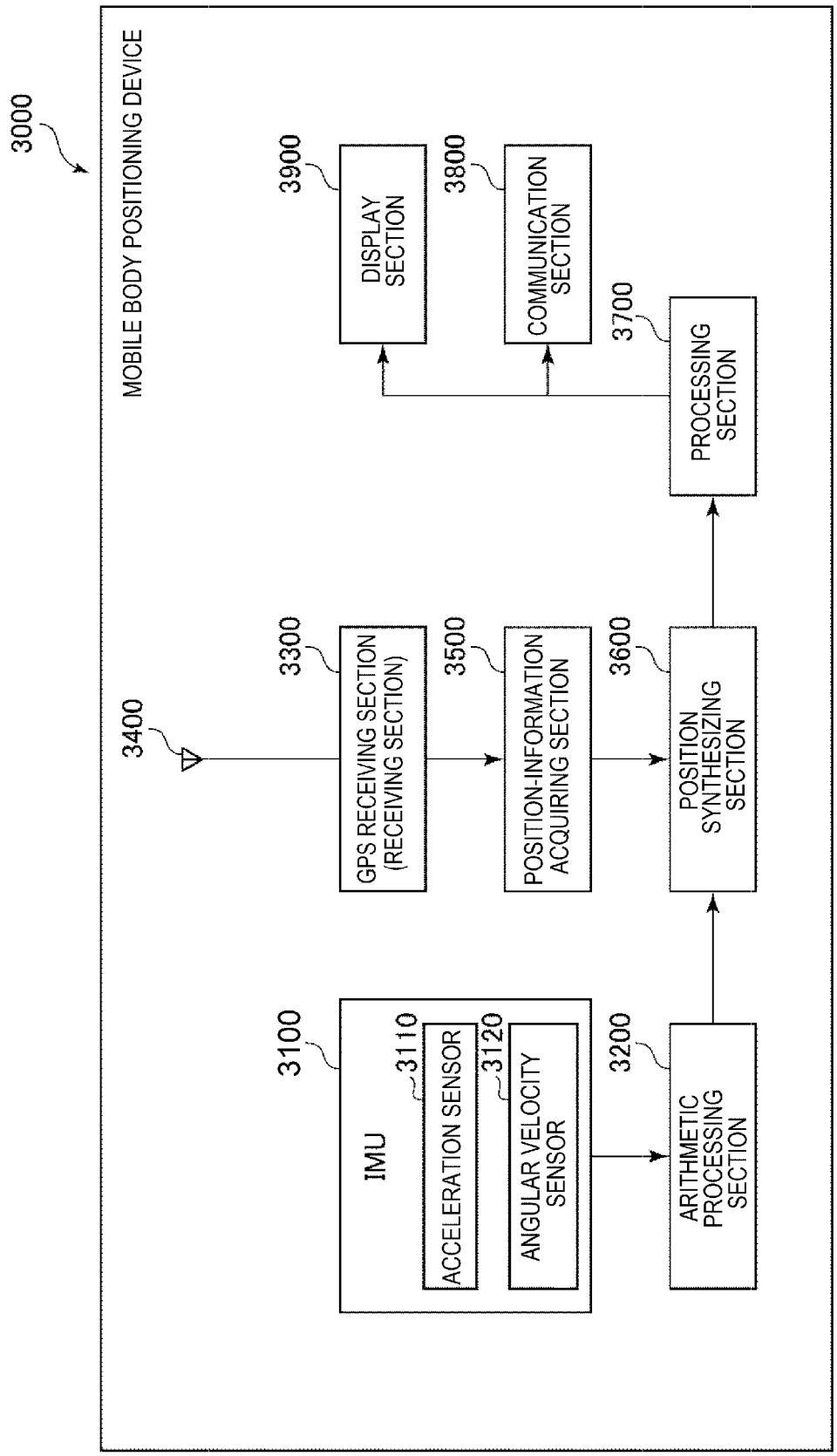
FIG. 19 is a block diagram showing an overall system of a vehicle positioning device.
Figure 20:
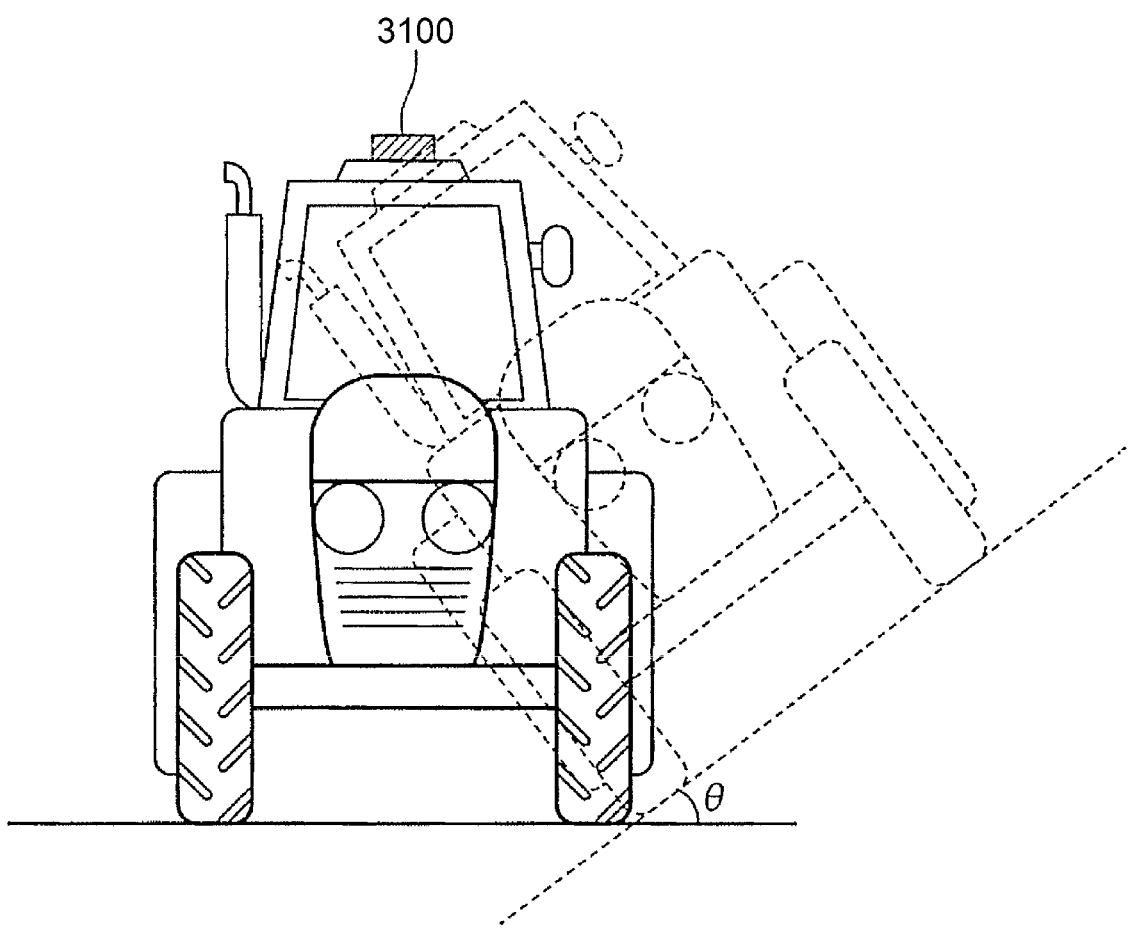
FIG. 20 is a diagram schematically showing action of the vehicle positioning device.

A vehicle positioning device is explained with reference to FIGS. 19 and 20. FIG. 19 is a block diagram showing an overall system of the vehicle positioning device. FIG. 20 is a diagram schematically showing the action of the vehicle positioning device.

A vehicle positioning device 3000 shown in FIG. 19 is a device mounted on a vehicle and used to perform positioning of the vehicle. The vehicle is not particularly limited and may be any vehicle such as a bicycle, an automobile (including a four-wheel automobile and a motorcycle), a train, an airplane, and a ship. In the following explanation in this embodiment, the vehicle is the four-wheel automobile. The vehicle positioning device 3000 includes an inertial measurement device 3100 (IMU), an arithmetic processing section 3200, a GPS receiving section 3300, a reception antenna 3400, a position-information acquiring section 3500, a position synthesizing section 3600, a processing section 3700, a communication section 3800, and a display section 3900.

The inertial measurement device 3100 includes a three-axis acceleration sensor 3110 applied with the acceleration sensor 1 and a three-axis angular velocity sensor 3120. As the inertial measurement device 3100, the inertial measurement unit 2000 including the acceleration sensor 1 can be used. The arithmetic processing section 3200 receives acceleration data from the acceleration sensor 3110 and angular velocity data from the angular velocity sensor 3120, performs inertial navigation arithmetic processing on these data, and outputs inertial navigation positioning data (data including acceleration and a posture of the vehicle).

The GPS receiving section 3300 receives signals (GPS carrier waves; satellite signals superimposed with position information) from GPS satellites via the reception antenna 3400. The position-information acquiring section 3500 outputs, based on the signals received by the GPS receiving section 3300, GPS positioning data representing the position (the latitude, the longitude, and the altitude), the speed, and the orientation of the vehicle positioning device 3000 (the vehicle). The GPS positioning data also includes status data indicating a reception state and reception time.

The position synthesizing section 3600 calculates, based on the inertial navigation positioning data output from the arithmetic processing section 3200 and the GPS positioning data output from the position-information acquiring section 3500, the position of the vehicle, specifically, in which position on the ground the vehicle is traveling. For example, even if the position of the vehicle included in the GPS positioning data is the same, as shown in FIG. 20, if the posture of the vehicle is different because of the influence of inclination or the like of the ground, the vehicle is traveling in a different position on the ground. For this reason, an accurate position of the vehicle cannot be calculated with only the GPS positioning data. Therefore, the position synthesizing section 3600 calculates, using the inertial navigation positioning data (in particular, the data concerning the posture of the vehicle), in which position on the ground the vehicle is traveling. The calculation can be relatively easily performed by an arithmetic operation using a trigonometric function (a tilt 6 with respect to the vertical direction).

The position data output from the position synthesizing section 3600 is subjected to predetermined processing by the processing section 3700. The positioning data is displayed on the display section 3900 as a positioning result. The position data may be transmitted to an external device by the communication section 3800.

The vehicle positioning device 3000 is explained above. As explained above, the vehicle positioning device 3000 includes the inertial measurement device 3100 applied with the acceleration sensor 1, the GPS receiving section 3300 (a receiving section) configured to receive a satellite signal superimposed with position information from a positioning satellite, the position-information acquiring section 3500 (an acquiring section) configured to acquire the position information of the GPS receiving section 3300 based on the received satellite signal, the arithmetic processing section 3200 (a computing section) configured to compute a posture of the vehicle based on inertial navigation positioning data (inertial data) output from the inertial measurement device 3100, and the position synthesizing section 3600 (a calculating section) configured to calculate a position of the vehicle by correcting the position information based on the computed posture. Consequently, it is possible to obtain the vehicle positioning device 3000 that can enjoy the effects of the inertial measurement unit 2000 including the acceleration sensor 1 and has high reliability.

Portable Electronic Device

Figure 21:
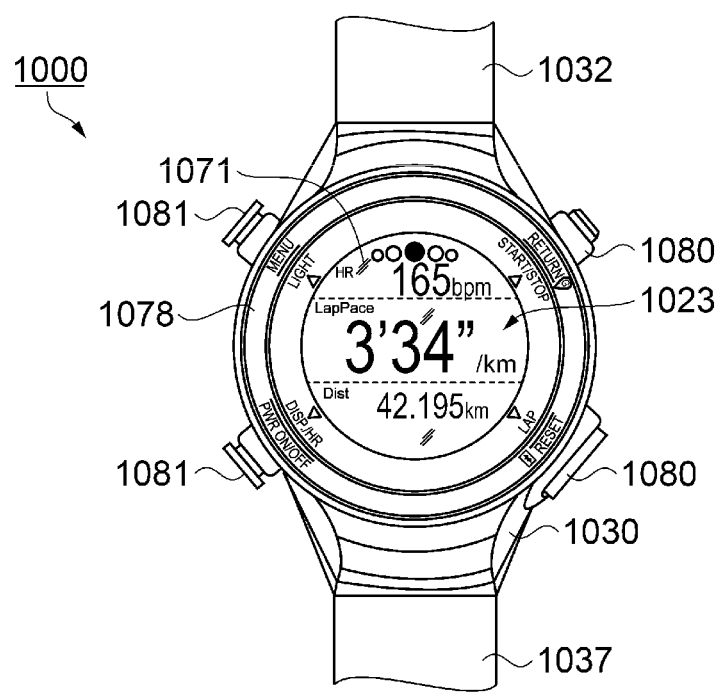
FIG. 21 is a plan view schematically showing the configuration of a portable electronic device.
Figure 22:
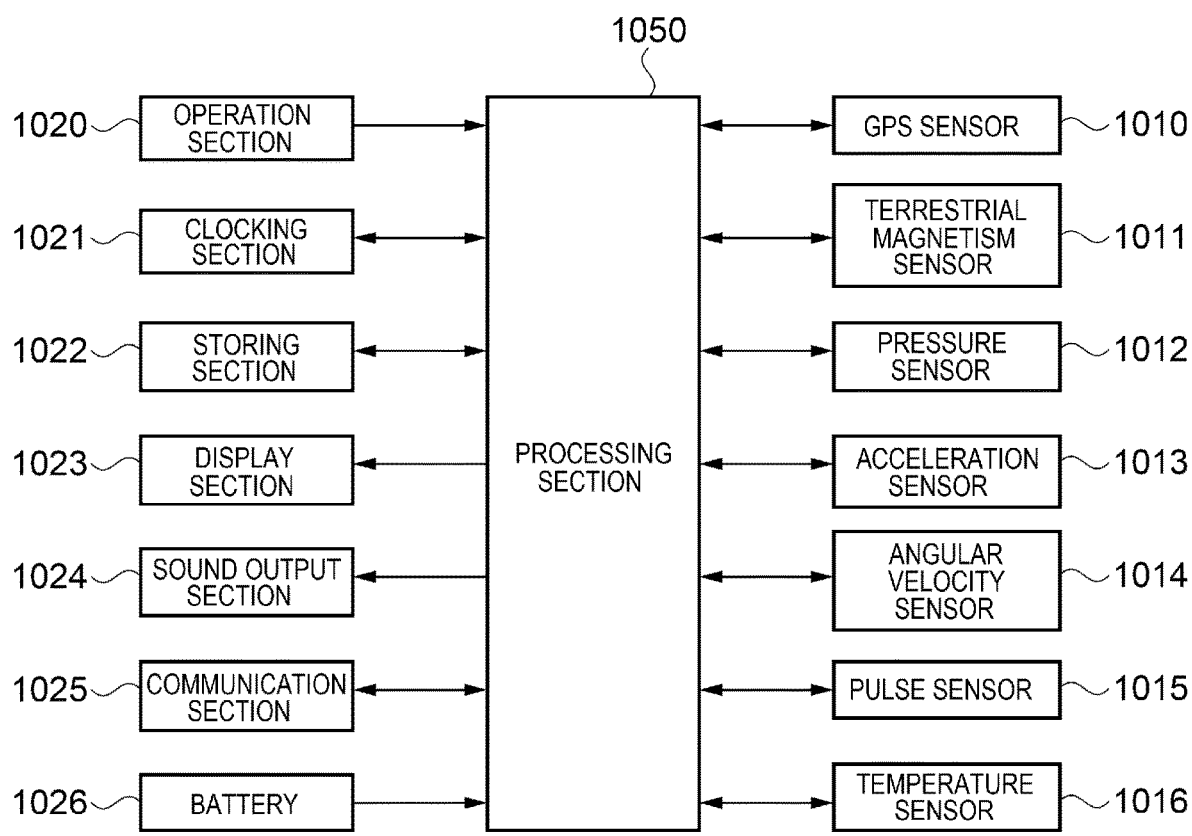
FIG. 22 is a functional block diagram showing a schematic configuration of the portable electronic device.

A portable electronic device including the acceleration sensor 1 functioning as an example of the physical quantity sensor is explained in detail with reference to FIGS. 21 and 22. FIG. 21 is a plan view schematically showing the configuration of the portable electronic device. FIG. 22 is a functional block diagram showing a schematic configuration of the portable electronic device. An activity meter (an active tracker) of a wristwatch type is explained as an example of the portable electronic device.

As shown in FIG. 21, a wrist device 1000, which is the activity meter (the active tracker) of the wristwatch type, is worn on a part (a subject) such as a wrist of a user by bands 1032 and 1037 or the like. The wrist device 1000 includes a digital display section 1023 and is capable of performing wireless communication. The acceleration sensor 1 functioning as the physical quantity sensor according to the present disclosure is incorporated in the wrist device 1000 as an acceleration sensor 1013 (see FIG. 22) that measures acceleration together with, for example, an angular velocity sensor 1014 (see FIG. 22) that measures angular velocity.

The wrist device 1000 includes a case 1030 in which at least the acceleration sensor 1013 and the angular velocity sensor 1014 (see FIG. 22) are housed, a processing section 1050 housed in the case 1030 and configured to process output data from the acceleration sensor 1013 and the angular velocity sensor 1014, the display section 1023 housed in the case 1030, and a light-transmissive cover 1071 closing an opening of the case 1030. A bezel 1078 is provided on the outer side of the case 1030 of the light-transmissive cover 1071 of the case 1030. A plurality of operation buttons 1080 and 1081 are provided in the side surface of the case 1030. The wrist device 1000 is explained more in detail below with reference to FIG. 22 as well.

The acceleration sensor 1013 detects accelerations in respective three axial directions crossing (ideally, orthogonal to) one another and outputs a signal (an acceleration signal) corresponding to the magnitudes and the directions of the detected three-axis accelerations. The angular velocity sensor 1014 detects angular velocities in the respective three axial directions crossing (ideally, orthogonal to) one another and outputs a signal (an angular velocity signal) corresponding to the magnitudes and the directions of the detected three-axis angular velocities.

The wrist device 1000 includes a GPS (Global Positioning System) sensor 1010. The GPS is called global positioning system as well and is a satellite positioning system for measuring a present position on the earth based on a plurality of satellite signals. The GPS has a function of performing positioning calculation using GPS time information and track information and acquiring position information of a user, a function of measuring a moving distance and a moving track of the user, and a time correcting function in a clock function. The GPS sensor 1010 can measure a present position on the earth based on satellite signals from GPS satellites.

A liquid crystal display (LCD) configuring the display section 1023 displays, according to various detection modes, for example, position information and a movement amount obtained using the GPS sensor 1010 or a terrestrial magnetism sensor 1011, exercise information such as a movement amount and an exercise amount obtained using the acceleration sensor 1013, the angular velocity sensor 1014, or the like, biological information such as a pulse rate obtained using a pulse sensor 1015 or the like, or time information such as present time. The liquid crystal display (LCD) can also display an environmental temperature obtained using a temperature sensor 1016.

A communication section 1025 performs various kinds of control for establishing communication between a user terminal and a not-shown information terminal. The communication section 1025 includes a transceiver corresponding to a short range wireless communication standard such as Bluetooth (registered trademark) (including BTLE: Bluetooth Low Energy), Wi-Fi (registered trademark) (Wireless Fidelity), Zigbee (registered trademark), NFC (Near field communication), or ANT+ (registered trademark) and a connector corresponding to a communication bus standard such as USB (Universal Serial Bus).

The processing section 1050 (a processor) is configured by, for example, an MPU (Micro Processing Unit), a DSP (Digital Signal Processor), or an ASIC (Application Specific Integrated Circuit). The processing section 1050 executes various kinds of processing based on programs stored in a storing section 1022 and signals input from an operation section 1020 (e.g., the operation buttons 1080 and 1081). The processing by the processing section 1050 includes data processing on output signals of the GPS sensor 1010, the terrestrial magnetism sensor 1011, a pressure sensor 1012, the acceleration sensor 1013, the angular velocity sensor 1014, the pulse sensor 1015, the temperature sensor 1016, and a clocking section 1021, display processing for causing the display section 1023 to display an image, sound output processing for causing a sound output section 1024 to output sound, communication processing for performing communication with the information terminal via the communication section 1025, and power control processing for supplying electric power from a battery 1026 to the sections.

The list device 1000 can have at least the following functions.

1. Distance: measuring a total distance from a measurement start with a highly accurate GPS function.
2. Pace: displaying a present running pace from a pace distance measurement value.
3. Average speed: calculating and displaying average speed from a running start to the present.
4. Altitude: measuring and displaying altitude with the GPS function.
5. Stride: measuring and displaying a step size even in a tunnel where a GPS radio wave does not reach.
6. Pitch: measuring and displaying the number of steps per one minute.
7. Heart rate: measuring and displaying a heart rate with a pulse sensor.
8. Gradient: measuring and displaying a gradient of the ground in training or trail run in a mountainous area.
9. Auto lap: automatically performing lap measurement at the time when a user runs a fixed distance or a fixed time set beforehand.
10. Exercise consumed calorie: displaying a consumed calorie.
11. Number of steps: displaying a total of the number of steps from an exercise start.

The wrist device 1000 can be widely applied to a running watch, a runner's watch, a runner's watch adapted to multiple sports such as duathlon and triathlon, an outdoor watch, and a GPS watch implemented with a satellite positioning system, for example, a GPS.

In the above explanation, the GPS (Global Positioning System) is used as the satellite positioning system. However, another global navigation satellite system (GNSS) may be used. For example, one or two or more of satellite positioning systems such as an EGNOS (European Geostationary-Satellite Navigation Overlay Service), a QZSS (Quasi Zenith Satellite System), a GLONASS (GLObal NAvigation Satellite System), a GALILEO, and BeiDou (BeiDou Navigation Satellite System) may be used. A satellite-based augmentation system (SBAS) such as a WARS (Wide Area Augmentation System) or an EGNOS (European Geostationary-Satellite Navigation Overlay System) may be used in at least one of the satellite positioning systems.

Such a portable electronic device includes the acceleration sensor 1 functioning as the physical quantity sensor and the processing section 1050. Therefore, the portable electronic device is compact and has excellent reliability.

Electronic Device

An electronic device including the acceleration sensor 1 functioning as the physical quantity sensor is explained in detail with reference to FIGS. 23 to 25.

First, a mobile personal computer of a mobile type, which is an example of the electronic device, is explained with reference to FIG. 23. FIG. 23 is a perspective view schematically showing the configuration of the mobile personal computer, which is an example of the electronic device.

In this figure, a personal computer 1100 is configured by a main body section 1104 including a keyboard 1102 and a display unit 1106 including a display section 1108. The display unit 1106 is turnably supported with respect to the main body section 1104 via a hinge structure section. In such a personal computer 1100, the acceleration sensor 1 functioning as the acceleration sensor is incorporated as an example of the physical quantity sensor. A control section 1110 can perform control such as posture control based on detection data of the acceleration sensor 1.

A smartphone (a cellular phone), which is an example of the electronic device, is explained with reference to FIG. 24. FIG. 24 is a perspective view schematically showing the configuration of the smartphone (the cellular phone), which is an example of the electronic device.

Figure 24:
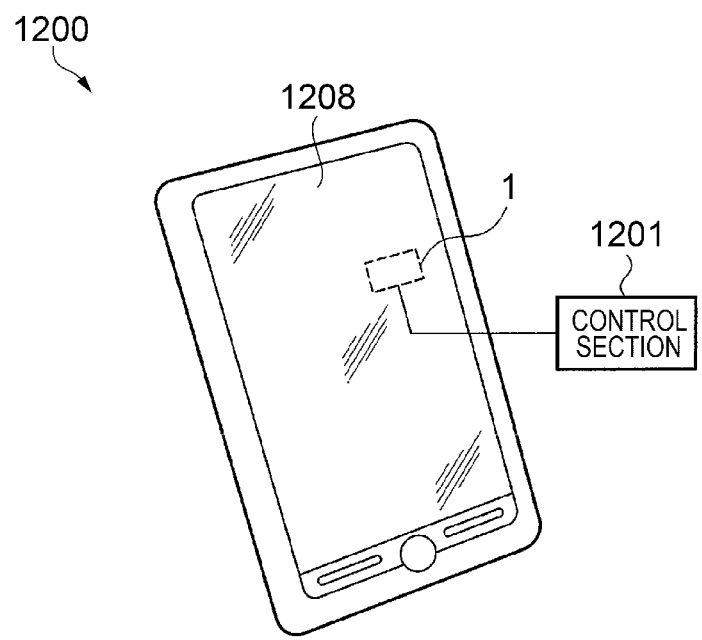
FIG. 24 is a perspective view schematically showing the configuration of a smartphone (a cellular phone), which is an example of the electronic device.

In FIG. 24, the acceleration sensor 1 functioning as an example of the physical quantity sensor is incorporated in a smartphone 1200. Detection data (acceleration data) detected by the acceleration sensor 1 is transmitted to a control section 1201 of the smartphone 1200. The control section 1201 includes a CPU (Central Processing Unit). The control section 1201 can recognize a posture and a behavior of the smartphone 1200 from the received detection data, change a display image displayed on a display section 1208, emit alarm sound or sound effects, and drive a vibration motor to vibrate a main body. In other words, the control section 1201 can perform motion sensing of the smartphone 1200 and change display content and generate sound, vibration, and the like according to a measured posture and a measured behavior. In particular, when a game application is executed, it is possible to enjoy presence similar to the reality.

A digital still camera, which is an example of the electronic device, is explained with reference to FIG. 25. FIG. 25 is a perspective view showing the configuration of the digital still camera, which is an example of the electronic device. In FIG. 25, coupling to external devices is briefly shown.

Figure 25:
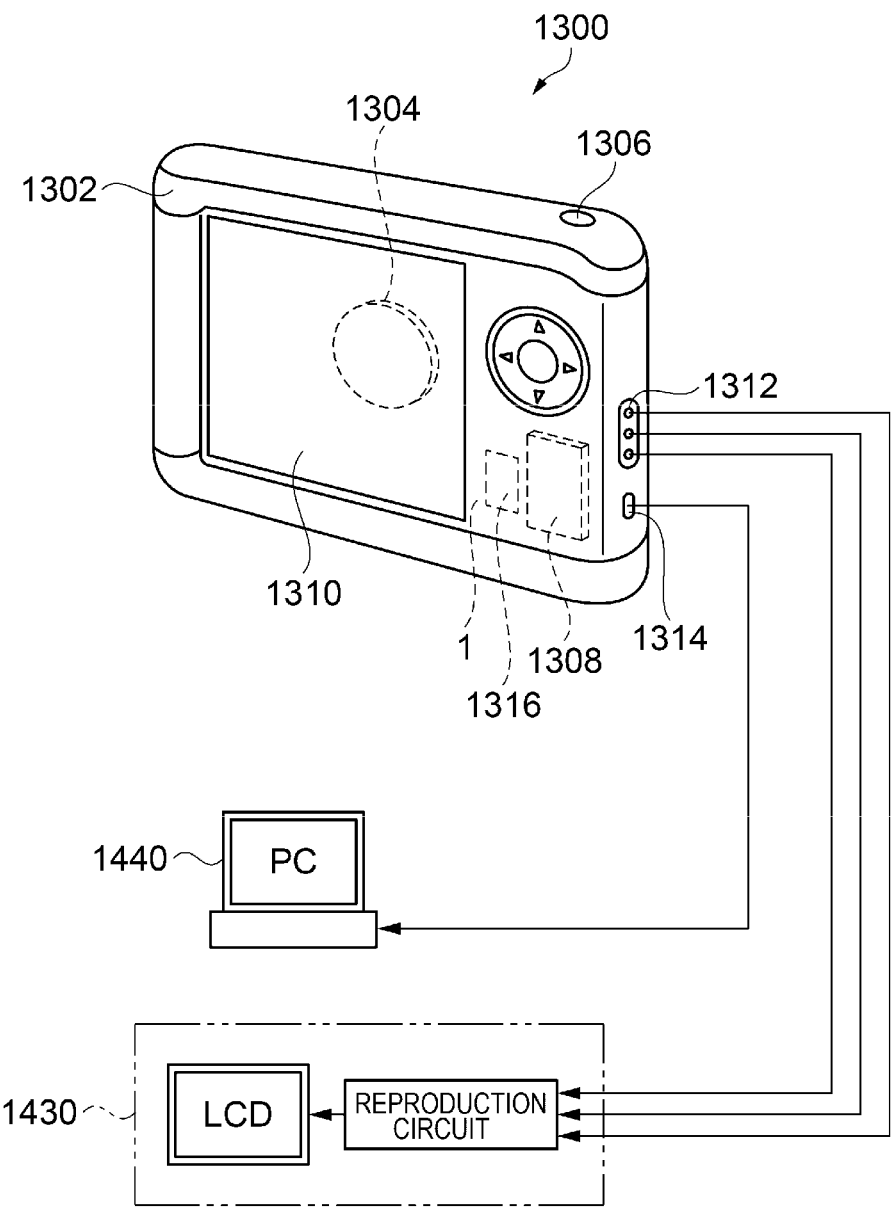
FIG. 25 is a perspective view showing the configuration of a digital still camera, which is an example of the electronic device.

In FIG. 25, a display section 1310 is provided on the back of a case (a body) 1302 of a digital still camera 1300. The display section 1310 performs display based on an imaging signal by a CCD. The display section 1310 also functions as a finder that displays an object as an electronic image. A light receiving unit 1304 including an optical lens (an imaging optical system) and a CCD is provided on the front side (the rear side in FIG. 25) of the case 1302.

When a photographer confirms an object image displayed on the display section 1310 and presses a shutter button 1306, an imaging signal of the CCD at that point in time is transferred to and stored in a memory 1308. In the digital still camera 1300, a video signal output terminal 1312 and an input and output terminal 1314 for data communication are provided at a side surface of the case 1302. As shown in FIG. 25, a television monitor 1430 is coupled to the video signal output terminal 1312 and a personal computer 1440 is coupled to the input and output terminal 1314 for data communication according to necessity. Further, the imaging signal stored in the memory 1308 is output to the television monitor 1430 and the personal computer 1440 according to predetermined operation. In the digital still camera 1300, the acceleration sensor 1 functioning as the acceleration sensor is incorporated as an example of the physical quantity sensor. The control section 1316 can perform control such as camera shake correction based on detection data of the acceleration sensor 1.

Such an electronic device includes the acceleration sensor 1 functioning as the physical quantity sensor and the control sections 1110, 1201, and 1316. Therefore, the electronic device is compact and has excellent reliability.

Figure 23:
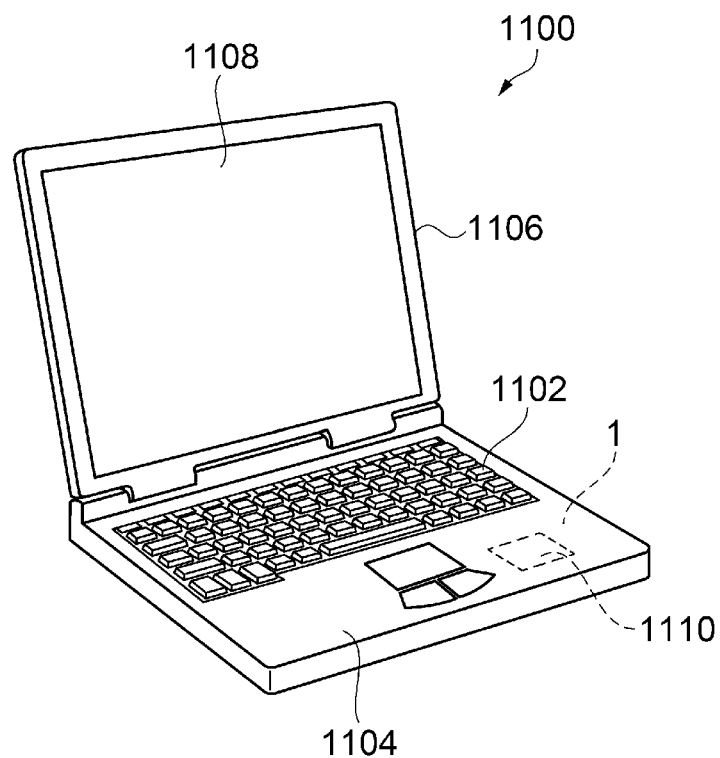
FIG. 23 is a perspective view schematically showing the configuration of a mobile personal computer, which is an example of an electronic device.

The electronic device including the acceleration sensor 1 functioning as the physical quantity sensor can be applied to, besides the personal computer shown in FIG. 23, the smartphone (the cellular phone) shown in FIG. 24, and the digital still camera shown in FIG. 25, for example, a tablet terminal, a clock, an inkjet discharge device (e.g., an inkjet printer), a laptop personal computer, a television, a video camera, a video taper recorder, a car navigation device, a pager, an electronic notebook (including an electronic notebook with a communication function), an electronic dictionary, an electronic calculator, an electronic game machine, a word processor, a work station, a video phone, a television monitor for crime prevention, an electronic binocular, a POS terminal, medical devices (e.g., an electronic thermometer, a manometer, a blood glucose meter, an electrocardiographic device, an ultrasonic diagnosis device, and an electronic endoscope), a fish finder, various measurement devices, meters (e.g., meters of a vehicle, an airplane, and a ship), a flight simulator, a seismometer, a pedometer, an inclinometer, a vibration meter that measures vibration of a hard disk, a posture control device of a robot or a flying object such as a drone, and a control device used for inertial navigation for automatic driving of an automobile.

Vehicle

Figure 26:
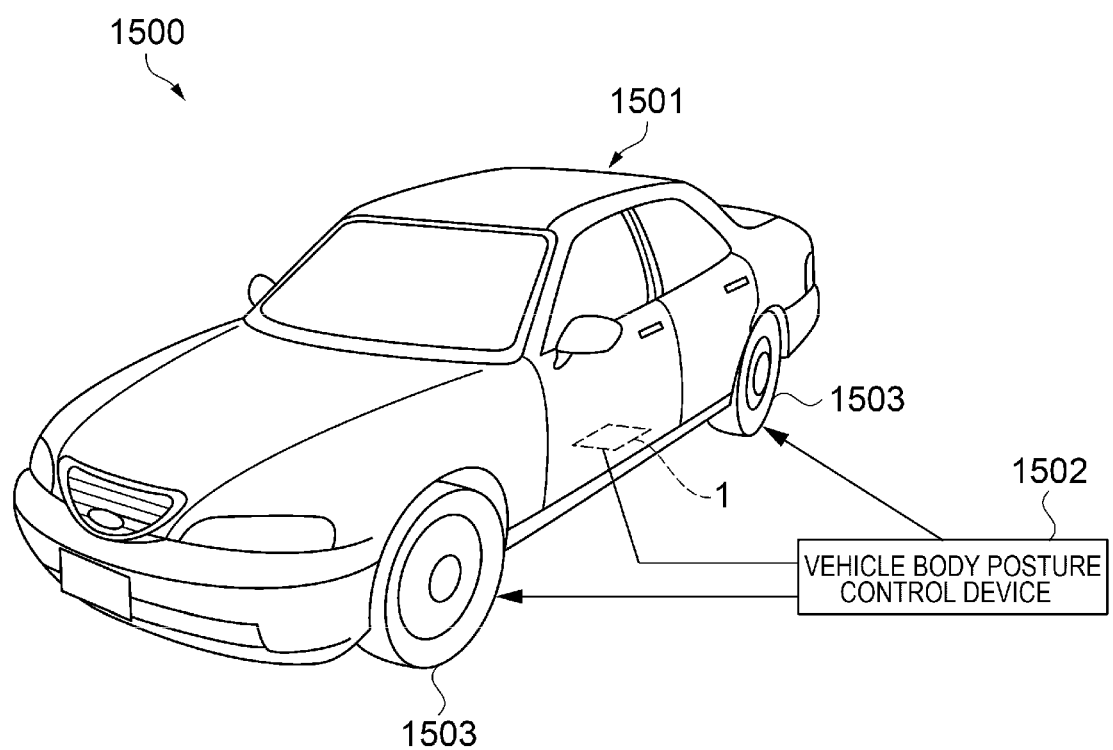
FIG. 26 is a perspective view showing the configuration of an automobile, which is an example of a vehicle.

A vehicle including the acceleration sensor 1 functioning as an example of the physical quantity sensor is explained in detail with reference to FIG. 26. FIG. 26 is a perspective view showing the configuration of an automobile, which is an example of the vehicle.

As shown in FIG. 26, the acceleration sensor 1 functioning as an example of the physical quantity sensor is incorporated in an automobile 1500. For example, movement (a position) and a posture of a vehicle body 1501 can be detected by the acceleration sensor 1. A detection signal of the acceleration sensor 1 is supplied to a vehicle body posture control device 1502 that controls the movement and the posture of the vehicle body 1501. The vehicle body posture control device 1502 can detect a posture of the vehicle body 1501 based on the signal, control hardness and softness of a suspension according to a result of the detection, and control brakes of respective wheels 1503.

Besides, the acceleration sensor 1 can be widely applied to a keyless entry system, an immobilizer, a car navigation system, a car air conditioner, an antilock brake system (ABS), an airbag, a tire pressure monitoring system (TPMS), an engine control system (an engine system), a control device for inertial navigation for automatic driving, and an electronic control unit (ECU) such as a battery monitor of a hybrid automobile and an electric automobile.

The acceleration sensor 1 functioning as the physical quantity sensor applied to the vehicle can be used in, besides the above illustration, for example, movement and posture control for a bipedal walking robot, a train, and the like, remote control for a radio-controlled airplane, a radio-controlled helicopter, a drone, and the like and movement and posture control for an autonomous flying object, movement and posture control for an agricultural machine, a construction machine, and the like, and control of a rocket, an artificial satellite, a ship, and an AGV (an unmanned carrier). As explained above, in realizing the movement (position) and posture control for the various vehicles, the acceleration sensor 1, the respective control sections (not shown in FIG. 26), and the posture control sections are incorporated in the vehicles.

Such a vehicle includes the acceleration sensor 1 functioning as an example of the physical quantity sensor and the control section (e.g., the vehicle body posture control device 1502 functioning as the posture control section). Therefore, the vehicle is compact and has excellent reliability.

Traveling Supporting System

Figure 27:
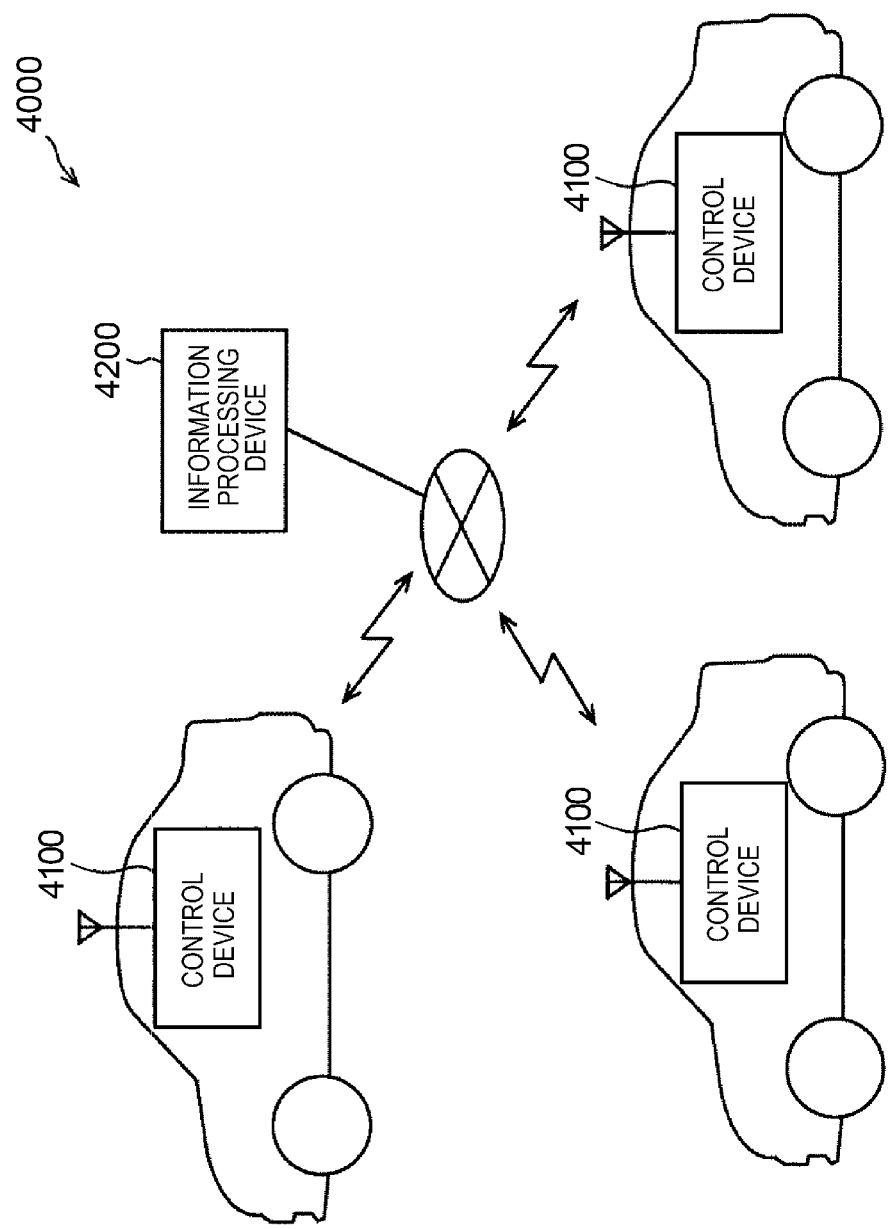
FIG. 27 is a diagram showing a schematic configuration of a traveling supporting system.
Figure 28:
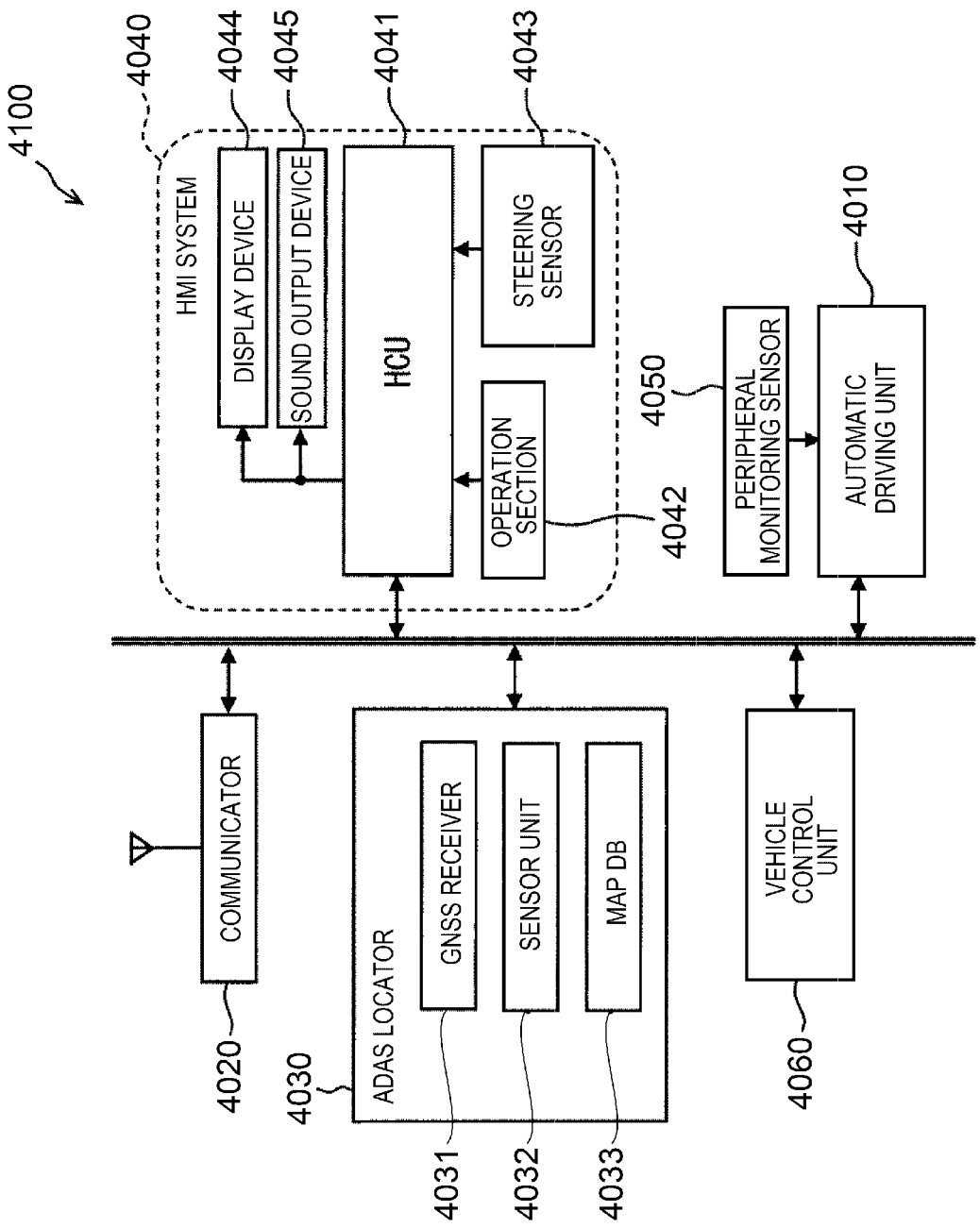
FIG. 28 is a functional block diagram showing a schematic configuration of the traveling supporting system.

A traveling supporting system including the acceleration sensor 1 is explained with reference to FIGS. 27 and 28. FIG. 27 is a diagram showing a schematic configuration of the traveling supporting system. FIG. 28 is a functional block diagram showing a schematic configuration of the traveling supporting system.

Schematic Configuration of the Traveling Supporting System

As shown in FIG. 27, a traveling supporting system 4000 includes control devices 4100 respectively mounted on a plurality of vehicles and an information processing device 4200.

The control device 4100 is mounted on a vehicle that performs automatic driving for automatically controlling at least any one of acceleration, braking, and steering (hereinafter, automatic driving vehicle). The control device 4100 performs communication with the information processing device 4200. The information processing device 4200 is, for example, a server device. The information processing device 4200 collects vehicle information transmitted from the control devices 4100 mounted on a plurality of automatic driving vehicles and transmits information obtained based on the collected vehicle information to the control devices 4100. The information processing device 4200 may be configured from one server device or may be configured from a plurality of server devices.

Schematic Configuration of the Control Device

A schematic configuration of the control device 4100 is explained with reference to FIG. 28. The control device 4100 is mounted on an automatic driving vehicle. As shown in FIG. 28, the control device 4100 includes an automatic driving unit 4010, a communicator 4020, an ADAS (Advanced Driver Assistance Systems) locator 4030, an HMI (Human Machine Interface) system 4040, a periphery monitoring sensor 4050, and a vehicle control unit 4060. The automatic driving unit 4010 functioning as a control section, the communicator 4020, the ADAS locator 4030, the HMI system 4040, and the vehicle control unit 4060 are coupled to, for example, an in-vehicle LAN and can exchange information with one another through communication.

The communicator 4020 performs communication with the outside of the vehicle. The communicator 4020 can perform wireless communication with, for example, at least one of a vehicle-mounted communicator mounted on a peripheral vehicle of the vehicle and a roadside machine set on a roadside. For example, the communicator 4020 can acquire position information, traveling speed information, and the like of the peripheral vehicle of the vehicle through inter-vehicle communication with the vehicle-mounted communicator and road-to-vehicle communication with the roadside machine.

The communicator 4020 performs communication with the information processing device 4200. When performing communication with the information processing device 4200, the communicator 4020 only has to be configured to perform communication with the information processing device 4200 with a vehicle-mounted communication module used for telematics communication such as a DCM (Data Communication Module) via a communication network used in the telematics communication. The communicator 4020 may be configured to perform communication with the information processing device 4200 via the roadside machine and a communication network between the roadside machine and the information processing device 4200. The communicator 4020 outputs information acquired from the information processing device 4200 to the in-vehicle LAN and transmits vehicle information transmitted from the automatic driving unit 4010 via the in-vehicle LAN.

A vehicle-mounted communication module that performs wireless communication with at least one of the vehicle-mounted communicator mounted on the peripheral vehicle and the roadside machine set on the roadside and the vehicle-mounted communication module used for the telematics communication may be separately provided or may be integrally provided.

The ADAS locator 4030 includes a GNSS (Global Navigation Satellite System) receiver 4031, a sensor unit 4032 including the acceleration sensor 1, and a map database (hereinafter, DB) 4033 in which map data is stored. The GNSS receiver 4031 receives positioning signals from a plurality of artificial satellites. The sensor unit 4032 including the acceleration sensor 1 includes, for example, a three-axis gyro sensor and a three-axis acceleration sensor. The map DB 4033 is a nonvolatile memory and has stored therein link data, node data, map data such as road shapes and structures.

The ADAS locator 4030 combines a positioning signal received by the GNSS receiver 4031 and a measurement result of the sensor unit 4032 including the acceleration sensor 1 to thereby sequentially position vehicle positions of the vehicle mounted with the ADAS locator 4030. For the positioning of the vehicle position, a traveling distance calculated from pulse signals sequentially output from a wheel speed sensor (not shown in FIG. 28) mounted on the vehicle may also be used. The ADAS locator 4030 outputs the positioned vehicle position to the in-vehicle LAN. The ADAS locator 4030 reads out the map data from the map DB 4033 and outputs the map data to the in-vehicle LAN. The ADAS locator 4030 may acquire map data from the outside of the vehicle using a vehicle-mounted communication module (not shown in FIG. 28) such as a DCM mounted on the vehicle.

The HMI system 4040 includes, as shown in FIG. 28, an HCU (Human Machine Interface Control Unit) 4041, an operation section 4042, a steering sensor 4043, a display device 4044, and a sound output device 4045. The HMI system 4040 receives input operation from a driver of the vehicle, presents information to the driver of the vehicle, and detects a state of the driver of the vehicle.

The operation section 4042 is a switch group operated by the driver of the vehicle. The operation section 4042 is used for performing various kinds of setting. For example, as the operation section 4042, there are a steering switch provided in a spoke section a steering wheel of the vehicle, a touch switch integrated with the display device 4044, and the like.

The steering sensor 4043 is a sensor for detecting that an occupant is touching the steering wheel of the vehicle. Examples of the steering sensor 4043 include a touch sensor provided in the steering wheel and a steering torque sensor that detects steering torque of the steering wheel of the vehicle. A detection result in the steering sensor 4043 is output to the HCU 4041.

As the display device 4044, there are, for example, a combination meter, a CID (Center Information Display), and an HUD (Head-Up Display). The combination meter is disposed in front of a driver's seat of the vehicle. The CID is disposed above a center cluster in a vehicle interior of the vehicle. The combination meter and the CID display various images for information presentation on a display screen of a display based on image data acquired from the HCU 4041. The HUD projects light of an image based on the image data acquired from the HCU 4041 onto a projection region specified in a windshield of the vehicle. The light of the image reflected to the vehicle interior side by the windshield is sensed by the driver seated on the driver's seat. The driver is capable of visually recognizing a virtual image of the image projected by the HUD while superimposing the virtual image on an external scene in front of the vehicle.

As the sound output device 4045, there is, for example, an audio speaker. The audio speaker is disposed in, for example, a lining of a door of the vehicle. The audio speaker presents information to the occupant such as the driver with reproduced sound.

The HCU 4041 includes a CPU, memories such as a ROM and a RAM, an I/O, and a bus that couples the foregoing. The HCU 4041 executes a control program stored in the memories to execute various kinds of processing. For example, the HCU 4041 causes, according to an instruction from the automatic driving unit 4010, at least one of the display device 4044 and the sound output device 4045 to present information. A part or all of functions executed by the HCU 4041 may be configured in a hardware manner by one or a plurality of ICs or the like.

The periphery monitoring sensor 4050 detects obstacles including moving objects such as pedestrians, animals other than humans, bicycles, motorbikes, and other vehicles and stationary objects such as fallen objects on roads, guardrails, curbstones, and trees. Besides, the periphery monitoring sensor 4050 detects road markings such as traveling section lines and stop lines. The periphery monitoring sensor 4050 is a sensor such as a periphery monitoring camera that images a predetermined range around the vehicle, a millimeter wave radar that transmits a probing wave to a predetermined range around the vehicle, a sonar, or an LIDAR (Light Detection and Ranging/Laser Imaging Detection and Ranging).

As the periphery monitoring camera, a stereo camera may be used or a monocular camera may be used. The periphery monitoring camera sequentially outputs sequentially captured images to the automatic driving unit 4010 as sensing information. The sensor that transmits a probing wave such as the sonar, the millimeter wave radar, or the LIDAR sequentially outputs scanning results based on reception signals obtained when a reflected wave reflected by an obstacle is received to the automatic driving unit 4010 as sensing information. A plurality of kinds of periphery monitoring sensors 4050 may have overlapping sensing ranges. For example, sensing of the front of the vehicle may be performed concurrently using the periphery monitoring camera and the millimeter wave radar.

The vehicle control unit 4060 is an electronic control device that performs at least one of acceleration and deceleration control and steering control of the vehicle. As the vehicle control unit 4060, there are a steering ECU that performs the steering control, a power unit control ECU that performs the acceleration and deceleration control, a brake ECU, and the like. The vehicle control unit 4060 acquires detection signals output from sensors such as an accelerator position sensor, a brake stepping force sensor, a steering angle sensor, and a wheel speed sensor and outputs control signals to traveling control devices such as an electronic control throttle, a brake actuator, an EPS (Electric Power Steering) motor. The vehicle control unit 4060 is capable of outputting the detection signals of the sensors to the in-vehicle LAN.

The automatic driving unit 4010 functioning as the control section includes a CPU, a volatile memory, a nonvolatile memory, an I/O, and a bus that couples the foregoing. The automatic driving unit 4010 executes a control program stored in the nonvolatile memory to execute various kinds of processing. For example, the automatic driving unit 4010 recognizes a traveling environment of the vehicle from a sensing result in the periphery monitoring sensor 4050. Besides, the automatic driving unit 4010 controls the vehicle control unit 4060 to thereby execute driving operation on behalf of the driver. The automatic driving unit 4010 is equivalent to a traveling supporting device. A part or all of functions executed by the automatic driving unit 4010 may be configured in a hardware manner by one or a plurality of ICs or the like.

The automatic driving unit 4010 functioning as the control section can instruct the vehicle control unit 4060 based on a detection signal detected by the sensor unit 4032 to control at least any one of acceleration, braking, and steering. The automatic driving unit 4010 can switch, according to a change of the detection signal detected by the sensor unit 4032, whether automatic driving is carried out or not. With the automatic driving unit 4010 functioning as the control section that controls at least any one of acceleration, braking, and steering, it is possible to accurately switch, according to a change of the detection signal detected by the sensor unit 4032, whether automatic driving is carried out or not.

Such a traveling supporting system 4000 has excellent reliability because the traveling supporting system 4000 includes the sensor unit 4032 including the acceleration sensor 1 and the automatic driving unit 4010 functioning as the traveling supporting device including the sensor unit 4032.

Head-Mounted Display Device

Figure 29:
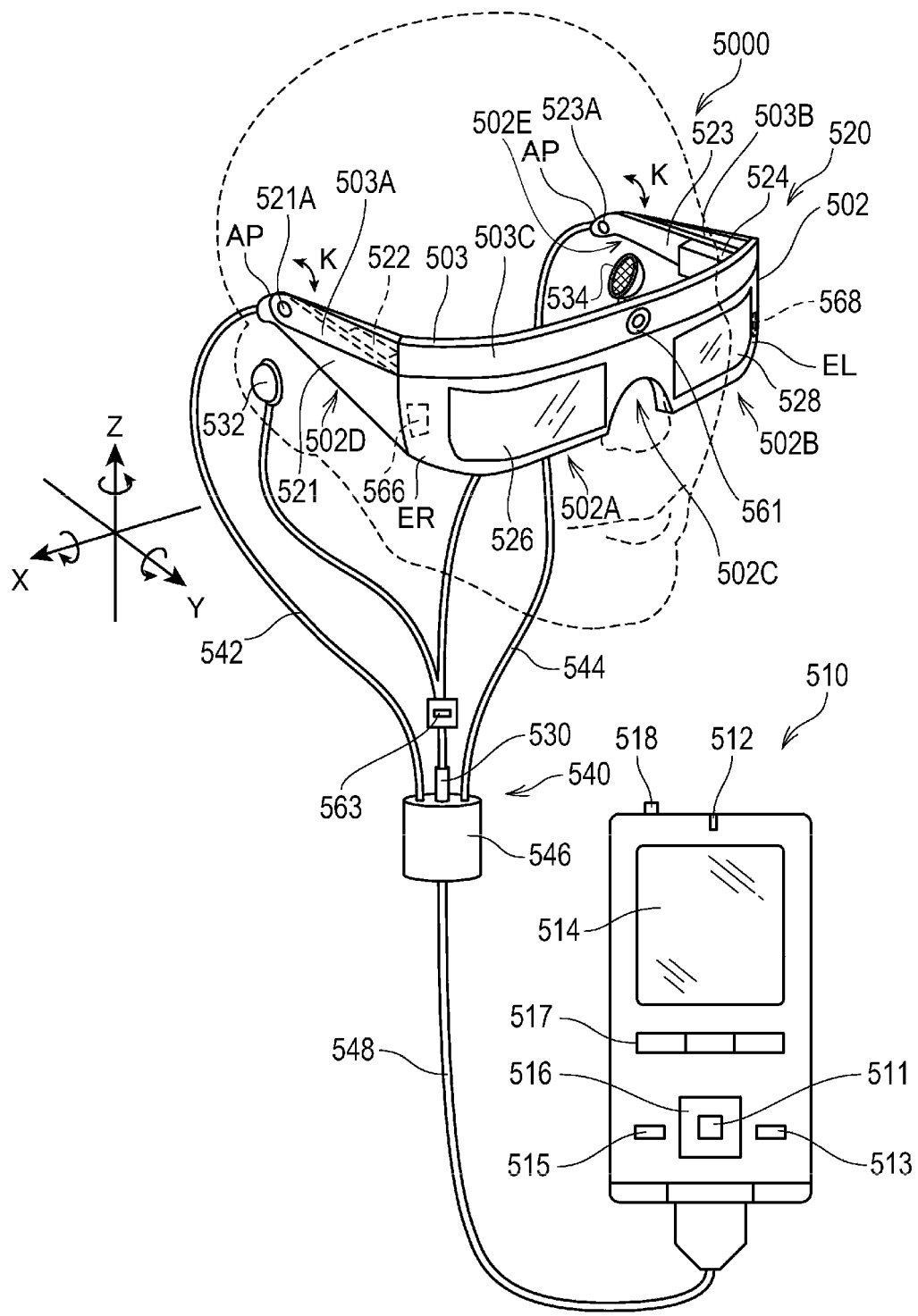
FIG. 29 is an explanatory diagram showing a schematic configuration of a head-mounted display device.

A head-mounted display device functioning as an example of a display device including the acceleration sensor 1 is explained below with reference to FIG. 29. FIG. 29 is an explanatory diagram showing a schematic configuration of the head-mounted display device.

As shown in FIG. 29, a head-mounted display device 5000 functioning as an example of the display device includes an image display section 520 configured to cause a user to visually recognize a virtual image in a state in which the image display section 520 is worn on the head of the user and a control device 510 configured to control the image display section 520. The control device 510 also functions as a controller for the user to operate the head-mounted display device 5000.

The image display section 520 is a wearing body worn on the head of the user. In this embodiment, the image display section 520 includes a frame 502 (a main body) having an eyeglass shape. The frame 502 includes a right holding section 521 and a left holding section 523. The right holding section 521 is a member provided to extend from an end portion ER, which is the other end, of a right optical-image-display section 526 to a position corresponding to the temporal region of the user when the user wears the image display section 520. Similarly, the left holding section 523 is a member provided to extend from an end portion EL, which is the other end, of a left optical-image-display section 528 to a position corresponding to the temporal region of the user when the user wears the image display section 520. The right holding section 521 is in contact with the right ear or the vicinity of the right ear on the head of the user and the left holding section 523 is in contact with the left ear or the vicinity of the left ear on the head of the user to hold the image display section 520 on the head of the user.

A right display driving section 522, a left display driving section 524, the right optical-image display section 526, the left optical-image display section 528, and a microphone 563 are provided in the frame 502. In this embodiment, the frame 502 of an eyeglass type is illustrate as an example of the main body. The shape of the main body is not limited to the eyeglass type and only has to be worn on the head of the user and fixed. The shape of the main body is more desirably a shape worn to extend in front of the left and right eyes of the user. For example, besides the eyeglass type explained here, the shape may be a snow goggles-like shape that covers an upper part of the face of the user or may be a shape disposed in front of the respective left and right eyes of the user like a binocular.

The frame 502 of the eyeglass type includes a right section 502A located in front of the right eye of the user and a left section 502B located in front of the left eye of the user. The frame 502 has a shape formed by coupling the right section 502A and the left section 502B in abridge section 502C (a coupling section). The bridge section 502C couples the right section 502A and the left section 502B in a position corresponding to the middle of the forehead of the user when the user wears the image display section 520.

The right section 502A and the left section 502B are respectively coupled to temple sections 502D and 502E. The temple sections 502D and 502E support the frame 502 on the head of the user like temples of an eyeglass. In this embodiment, the temple section 502D is configured by the right holding section 521 and the temple section 502E is configured by the left holding section 523.

The right optical-image display section 526 is disposed in the right section 502A. The left optical-image display section 528 is disposed in the left section 502B. The right optical-image display section 526 and the left optical-image display section 528 are respectively located in front of the right and left eyes of the user when the user wears the image display section 520.

The right display driving section 522 and the left display driving section 524 are disposed on sides opposed to the head of the user when the user wears the image display section 520. The right display driving section 522 and the left display driving section 524 are collectively simply referred to as "display driving sections" as well. The right optical-image display section 526 and the left optical-image display section 528 are collectively simple referred to as "optical-image display sections" as well. The display driving sections 522 and 524 include liquid crystal displays, projection optical systems, and the like not shown in FIG. 29.

The right optical-image display section 526 and the left optical-image display section 528 include light guide plates and dimming plates not shown in FIG. 29. The light guide plates are formed of light transmissive resin. The light guide plates guide image lights output by the display driving sections 522 and 524 to the eyes of the user. The dimming plates are thin plate-like optical elements and are disposed to cover the front side of the image display section 520, which is the opposite side of the side of the eyes of the user. As the dimming plates, it is possible to use various dimming plates such as a dimming plate having almost no light transmissivity, a dimming plate nearly transparent, a dimming plate that attenuates a light amount and transmits light, and a dimming plate that attenuates or reflects light having a specific wavelength. By selecting optical characteristics (light transmittance, etc.) of the dimming plates as appropriate, it is possible to adjust an amount of external light made incident on the right optical-image display section 526 and the left optical-image display section 528 from the outside and adjust easiness of visual recognition of a virtual image. In the following explanation in this embodiment, dimming plates at least having light transmissivity enough for the user wearing the image display section 520 to visually recognize an outside scene are used. The dimming plates protect a right light guide plate and a left light guide plate, which are optical elements, and prevent damage, adhesion of stain, and the like to the right light guide plate and the left light guide plate. The dimming plates may be detachably attachable to the right optical-image display section 526 and the left optical-image display section 528. A plurality of kinds of dimming plates may be able to be replaced and attached. The dimming plates may be omitted.

A camera unit 503 is provided in the frame 502. The camera unit 503 includes a camera pedestal section 503C on which an upper camera 561 is disposed and arm sections 503A and 503B configured to support the camera pedestal section 503C. The arm section 503A is turnably coupled to the right holding section 521 by a hinge 521A provided at a distal end portion AP of the right holding section 521. The arm section 503B is turnably coupled to the left holding section 523 by a hinge 523A provided at a distal end portion AP of the left holding section 523. Therefore, the camera unit 503 as a whole is turnable in a direction indicated by arrows K in FIG. 29, that is, up and down in amounted state of the head-mounted display. The camera unit 503 is in contact with the frame 502 at a lower end of a turning range. An upper end of the turning range of the camera unit 503 is determined by, for example, specifications of the hinges 521A and 523A.

The camera pedestal section 503C is a plate-like or bar-like member located across upper parts of the right section 502A, the left section 502B, and the bridge section 502C. The upper camera 561 is embedded and set in a position above the bridge section 502C. The upper camera 561 is a digital camera including an imaging element such as a CCD or a CMOS and an imaging lens. The upper camera 561 may be a monocular camera or may be a stereo camera.

The upper camera 561 images at least a part of an outside scene in a front side direction of the head-mounted display device 5000, in other words, a visual field direction of the user in a state in which the user wears the image display section 520. The width of an angle of view of the upper camera 561 can be set as appropriate. However, for example, at the lower end of the turning range of the camera unit 503, an imaging range of the upper camera 561 desirably includes an external world visually recognized by the user through the right optical-image display section 526 and the left optical-image display section 528. Further, the imaging range of the upper camera 561 is more desirably set such that the upper camera 561 can image an entire visual field of the user through the dimming plates.

The image display section 520 is coupled to the control device 510 via a coupling section 540. The coupling section 540 includes a main body cord 548 coupled to the control device 510, a right cord 542, a left cord 544, and a coupling member 546. The right cord 542 and the left cord 544 are two cords branching from the main body cord 548. The right cord 542 is inserted into a housing of the right holding section 521 from the distal end portion AP in the extending direction of the right holding section 521 and coupled to the right display driving section 522. Similarly, the left cord 544 is inserted into a housing of the left holding section 523 from the distal end portion AP in the extending direction of the left holding section 523 and coupled to the left display driving section 524.

The coupling member 546 is provided at a branching point of the main body cord 548 and the right cord 542 and the left cord 544. The coupling member 546 includes a jack for coupling an earphone plug 530. Cords of a right earphone 532 and a left earphone 534 extend from the earphone plug 530. The microphone 563 is provided in the vicinity of the earphone plug 530. The cords are collected as one cord from the earphone plug 530 to the microphone 563. The cords branch from the microphone 563 and are respectively coupled to the right earphone 532 and the left earphone 534.

The microphone 563 is disposed such that a sound collecting section of the microphone 563 faces a visual line direction of the user. The microphone 563 collects sound and outputs a sound signal to a sound processing section (not shown in FIG. 29). The microphone 563 may be, for example, a monaural microphone or may be a stereo microphone, may be a microphone having directivity, or may be a nondirectional microphone.

The right cord 542, the left cord 544, and the main body cord 548 only have to be cords capable of transmitting digital data and can be configured by, for example, a metal cable or an optical fiber. The right cord 542 and the left cord 544 may be collected as one cord.

The image display section 520 and the control device 510 transmit various signals via the coupling section 540. Connectors (not shown in FIG. 29) that fit with each other are provided at the end portion of the main body cord 548 at the opposite side of the coupling member 546 and the control device 510. The control device 510 and the image display section 520 can be coupled and separated by fitting the connector of the main body cord 548 and the connector of the control device 510 and releasing the fitting.

The control device 510 controls the head-mounted display device 5000. The control device 510 includes a determination key 511, a lighting section 512, a display switching key 513, a luminance switching key 515, a direction key 516, a menu key 517, and switches including a power switch 518. The control device 510 includes a track pad 514 that the user operates with a finger.

The determination key 511 detects pressing operation and outputs a signal for determining content of operation by the control device 510. The lighting section 512 includes a light source such as an LED (Light Emitting Diode) and notifies, with a lighting state of the light source, an operation state (e.g., ON/OFF of a power supply) of the head-mounted display device 5000. The display switching key 513 outputs, according to pressing operation, for example, a signal for instructing switching of a display mode of an image.

The track pad 514 includes an operation surface on which touch operation is detected and outputs an operation signal according to operation on the operation surface. A detection type on the operation surface is not limited. An electrostatic type, a pressure detection type, an optical type, and the like can be adopted. The luminance switching key 515 outputs, according to pressing operation, a signal for instructing an increase and a decrease in the luminance of the image display section 520. The direction key 516 outputs operation signals according to pressing operation of the key corresponding to upper, lower, left, and right directions. The power switch 518 is a switch that switches ON/OFF of the power supply of the head-mounted display device 5000.

Two motion sensors are attached to the frame 502. The motion sensors in this embodiment are inertial sensors and are specifically a first sensor 566 functioning as a first sensor unit and a second sensor 568 functioning as a second sensor unit. The acceleration sensor 1 can be applied as the first sensor 566 and the second sensor 568. The first sensor 566 is disposed at the end on the temple section 502D side in the right section 502A. The second sensor 568 is disposed at the end on the temple section 502E side in the left section 502B. That is, the first sensor 566 and the second sensor 568 are located further on one side than the center of the head in a mounted state of the head-mounted display device 5000. The first sensor 566 and the second sensor 568 are inertial sensors such as an acceleration sensor and an angular velocity sensor (a gyro sensor). In this embodiment, the sensor unit explained above including the three-axis gyro sensor and the three-axis acceleration sensor is used. The acceleration sensor 1 is used in the sensor unit. The first sensor 566 and the second sensor 568 respectively detect, at measurement reference points of incorporated detecting mechanisms, for example, rotation (a pitch) around the X axis, rotation (a yaw) around the Y axis, and rotation (a roll) around the Z axis.

One sensor of the first sensor 566 and the second sensor 568 is present on one side of the center of the head of the user. The other sensor is present on the other side of the center of the head of the user. Specifically, the first sensor 566 is present on the right side of the head of the user. The second sensor 568 is present on the left side of the head of the user. In this embodiment, the center of the head indicates the center of the head on a horizontal plane perpendicular to the height of the user. The positions on the horizontal plane of the first sensor 566 and the second sensor 568 are present on the right side and the left side across the center of the head on the horizontal plane.

The head-mounted display device 5000 functioning as an example of the display device having such a configuration includes the image display section 520 configured to irradiate image light on the eyes of the user and the first sensor 566 and the second sensor 568 functioning as a plurality of motion sensors. One of the first sensor 566 and the second sensor 568 is located further on one side than the center of the head in the mounted state. The other motion sensor is located further on the other side than the center of the head in the mounted state. Therefore, when the head of the user moves, it is possible to quickly calculate a movement amount, a direction of the movement, and the like in a motion center.

In the head-mounted display device 5000, one of the first sensor 566 and the second sensor 568 is located further on the left side than the center of the head in the mounted state. The other motion sensor is located further on the right side than the center of the head in the mounted state. Therefore, it is possible to quickly calculate a movement in the motion center of the head based on detection results of the motion sensors.

Such a head-mounted display device 5000 functioning as an example of the display device has excellent reliability because the head-mounted display device 5000 includes the acceleration sensor 1 as the first sensor 566 and the second sensor 568.

The physical quantity sensor, the physical quantity sensor device, the composite sensor, the inertial measurement unit, the vehicle positioning device, the portable electronic device, the electronic device, the vehicle, and the display device are explained above based on the embodiment shown in the figures. However, the present disclosure is not limited to the embodiment. The components of the sections can be replaced with any components having the same functions. Any other components may be added to the present disclosure.

In the embodiment explained above, the X axis, the Y axis, and the Z axis are orthogonal to one another. However, the X axis, the Y axis, and the Z axis are not limited to this if the X axis, the Y axis, and the Z axis cross one another. For example, the X axis may slightly tilt with respect to the normal direction of a YZ plane. The Y axis may slightly tilt with respect to the normal direction of an XZ plane. The Z axis may slight tilt with respect to the normal direction of an XY plane. "Slightly" means a range in which the acceleration sensor 1 can exert the effects of the acceleration sensor 1. A specific tilt angle (a numerical value) is different depending on a configuration and the like.

Contents derived from the embodiment explained above are described below as aspects.

First Aspect

A physical quantity sensor according to an aspect includes: a physical quantity sensor element including a substrate, a lid joined to the substrate to define a housing space in an inside, and a physical quantity sensor element piece housed in the housing space and capable of detecting a physical quantity; and a circuit element bonded to a surface of the lid via an adhesive material, the surface being a surface on an opposite side of a side of the physical quantity sensor element piece. In the lid, an electrode is provided to extend from an inner wall of a through-hole, which pierces through the lid from the housing space to the surface on the opposite side and is sealed by a sealing member, to a peripheral edge of the through-hole at the surface on the opposite side. In a sectional view, thickness of a region at the peripheral edge of the electrode is smaller at an opposite side of a side of an opening of the through-hole than the opening side.

According to this aspect, the region at the peripheral edge of the electrode provided to extend to the peripheral edge of the opening of the through-hole provided on the surface of the lid at the opposite side of the side of the physical quantity sensor element piece is configured such that the thickness of the electrode is smaller at an opposite side of a side of an opening of the through-hole than the opening side. Consequently, a level difference due to the thickness of the end portion of the peripheral edge of the electrode decreases. Therefore, it is possible to prevent adhesion of the lid and the circuit element from becoming partially unstable and reduce distortion (stress) of the adhesive material due to the partial instability of the bonding of the lid and the circuit element by the adhesive material. As a result, it is possible to reduce fluctuation of a bias output signal due to the distortion of the adhesive material. In detail, it is possible to prevent an air bubble from being easily held up between the adhesive material and the end portion of the peripheral edge of the electrode. It is possible to prevent the fluctuation of the bias output signal due to distortion caused by imbalance of thermal stress that occurs around the air bubble from easily occurring.

Second Aspect

In the physical quantity sensor according to the first aspect, the thickness of the region at the peripheral edge of the electrode may gradually decrease further away from the through-hole.

According to this aspect, the thickness of the electrode gradually decreases further away from the through-hole. Therefore, a level difference due to the thickness of the electrode in a position further away from the opening than the opening side of the through-hole, that is, the electrode at the end portion of the peripheral edge of the electrode decreases. It is possible to improve stability of the bonding of the lid and the circuit element by the adhesive material. It is possible to reduce the fluctuation of the bias output signal due to instability of the bonding.

Third Aspect

In the physical quantity sensor according to the first aspect, an outer edge of the region at the peripheral edge of the electrode may include an inclined surface.

According to this aspect, even if the inclined surface is included in the electrode at the outer edge of the region at the peripheral edge of the electrode, it is possible to improve the stability of the bonding of the lid and the circuit element by the adhesive material. It is possible to reduce the fluctuation of the bias signal due to instability of the bonding.

Fourth Aspect

In the physical quantity sensor according to the first aspect, a surface of the region at the peripheral edge of the electrode may have a curved surface shape.

According to this aspect, even if the surface of the electrode in the region at the peripheral edge has the curved surface shape, it is possible to improve the stability of the bonding of the lid and the circuit element by the adhesive material. It is possible to reduce the fluctuation of the bias output signal due to instability of the bonding.

Fifth Aspect

In the physical quantity sensor according to the first aspect, a surface of the region at the peripheral edge of the electrode may have a step-wise shape.

According to this aspect, even if the surface of the electrode in the region at the peripheral edge has the step-wise shape, it is possible to improve the stability of the bonding of the lid and the circuit element by the adhesive material. It is possible to reduce the fluctuation of the bias output signal due to instability of the bonding.

Sixth Aspect

In the physical quantity sensor according to the first aspect, a region of the lid overlapping the circuit element may include a formation region of the electrode and a non-formation region of the electrode.

According to this aspect, by providing the non-formation region of the electrode in the region overlapping the circuit element of the lid, it is possible to improve bonding strength of the adhesive material between the circuit element and the lid.

Seventh Aspect

In the physical quantity sensor according to the sixth aspect, the physical quantity may be acceleration.

According to this aspect, it is possible to detect highly accurate acceleration data with reduced fluctuation of the bias output signal due to instability of the bonding.

Eighth Aspect

A composite sensor according to an eighth aspect includes: the physical quantity sensor according to the seventh aspect; and an angular velocity sensor.

According to this aspect, it is possible to obtain the composite sensor that can enjoy the effects of the physical quantity sensor explained above and has high inertial measurement accuracy.

Ninth Aspect

An inertial measurement unit according to a ninth aspect includes: the physical quantity sensor according to the seventh aspect; an angular velocity sensor; and a control section configured to control the physical quantity sensor and the angular velocity sensor.

According to this aspect, it is possible to obtain the inertial measurement unit that can enjoy the effects of the physical quantity sensor explained above and has high inertial measurement accuracy.

Tenth Aspect

A vehicle positioning device according to a tenth aspect includes: the inertial measurement unit according to the ninth aspect; a receiving section configured to receive a satellite signal superimposed with position information from a positioning satellite; an acquiring section configured to acquire, based on the received satellite signal, position information of the receiving section; a computing section configured to compute, based on inertia data output from the inertial measurement unit, a posture of a vehicle; and a calculating section configured to calculate a position of the vehicle by correcting the position information based on the calculated posture.

According to this aspect, it is possible to obtain the vehicle positioning device that can enjoy the effects of the inertial measurement unit including the physical quantity sensor explained above and has high inertial measurement accuracy.

Eleventh Aspect

A portable electronic device according to an eleventh aspect includes: the physical quantity sensor according to any one of the first to seventh aspects; a case in which the physical quantity sensor is housed; a processing section housed in the case and configured to process output data from the physical quantity sensor; a display section housed in the case; and a light-transmissive cover closing an opening of the case.

According to this aspect, it is possible to obtain the portable electronic device that can enjoy the effects of the physical quantity sensor explained above and has high inertial measurement accuracy.

Twelfth Aspect

The portable electronic device according to the eleventh aspect may include a satellite positioning system and measure a moving distance and a moving track of a user.

According to this aspect, convenience of the portable electronic device is improved.

Thirteenth Aspect

An electronic device according to a thirteenth aspect includes: the physical quantity sensor according to any one of the first to seventh aspects; and a control section configured to perform control based on a detection signal output from the physical quantity sensor.

According to this aspect, it is possible to obtain the electronic device that can enjoy the effects of the physical quantity sensor explained above and has high inertial measurement accuracy.

Fourteenth Aspect

A vehicle according to a fourteenth aspect includes: the physical quantity sensor according to any one of the first to seventh aspects; and a control section configured to perform control based on a detection signal output from the physical quantity sensor.

According to this aspect, it is possible to obtain the vehicle that can enjoy the effects of the physical quantity sensor explained above and has high inertial measurement accuracy.

Fifteenth Aspect

The vehicle according to the fourteenth aspect may include at least one system of an engine system, a brake system, and a keyless entry system, and the control section may control the system based on the detection signal.

According to this aspect, it is possible to accurately control at least anyone system of the engine system, the brake system, and the keyless entry system.

Sixteenth Aspect

A traveling supporting system according to a sixteenth aspect includes: the physical quantity sensor according to any one of the first to seventh aspects; and a control section configured to control at least one of acceleration, braking, and steering based on a detection signal detected by the physical quantity sensor. Implementation and non-implementation of automatic driving is switched according to a change of the detection signal from the physical quantity sensor.

According to this aspect, with the control section configured to control at least any one of acceleration, braking, and steering, it is possible to accurately switch implementation or non-implementation of the automatic driving according to a change of the detection signal detected by the physical quantity sensor.

Seventeenth Aspect

A display device according to a seventeenth aspect includes: a display section worn on a head of a user and configured to irradiate image light on eyes of the user; and the physical quantity sensor according to any one of the first to seventh aspects. The physical quantity sensor includes: a first sensor unit located further on one side than a center of the head in a worn state; and a second sensor unit located further on another side than the center of the head.

According to this aspect, in the display device, the physical quantity sensor is located further on one side than the center of the head in the worn state. Therefore, when the head of the user moves, it is possible to quickly calculate a movement amount in a motion center, a direction of the movement, and the like. It is possible to obtain the display device that can enjoy the effects of the physical quantity sensor explained above and has high inertial measurement accuracy.

Eighteenth Aspect

A manufacturing method for a physical quantity sensor according to an eighteenth aspect includes: preparing a physical quantity sensor element including a substrate, a lid joined to the substrate to define a housing space in an inside, a through-hole piercing through the lid from the housing space to a surface on an opposite side of the housing space being provided in the lid, and a physical quantity sensor element piece housed in the housing space; placing, over the lid, a mask for forming an electrode in an inside of the through-hole and at a peripheral edge of the through-hole at the surface on the opposite side; forming the electrode in the inside of the through-hole and at the peripheral edge via the mask; removing the mask; sealing the through-hole; and bonding a circuit element to the surface on the opposite side of the lid via an adhesive material. In the mask, a piercing-through section is formed to be opposed to the through-hole and a cutout section is formed along a peripheral edge of the piercing-through section at a side corresponding to the lid.

According to this embodiment, by forming the electrode at the peripheral edge of the opening of the through-hole using such a mask, it is possible to easily form the electrode, the thickness of which gradually decreases further away from the opening. Consequently, a level difference due to the thickness of the end portion of the peripheral edge of the electrode decreases. In the bonding the circuit element, it is possible to prevent an air bubble from being easily held up between the adhesive material and the end portion of the peripheral edge of the electrode. It is possible to prevent fluctuation of a bias output signal due to distortion caused because of imbalance of thermal stress that occurs around the air bubble from easily occurring.

Nineteenth Aspect

In the manufacturing method for the physical quantity sensor according to the eighteenth aspect, in the forming the electrode, the electrode may be formed using a sputtering method or a vacuum evaporation method.

According to this aspect, in the forming the electrode, with the sputtering method or the vacuum evaporation method, it is possible to easily form the electrode on the inner surface of the through-hole and the peripheral edge of the opening of the through-hole.

What is claimed is:

1. A physical quantity sensor comprising:
a physical quantity sensor module including:
   a substrate;
   a lid joined to the substrate to define a housing space in an inside, the lid having a recess, a through-hole being provided in a bottom of the recess; and
   a sensor element housed in the housing space and configured to detect a physical quantity;
an electrode disposed at a peripheral area of the through-hole, the electrode continuously radically extending from a periphery of the through-hole to a top surface of the lid via the bottom and inner side wall of the recess;
a sealing member sealing the through-hole and being partially filled in the recess with the electrode; and
a circuit element bonded to the top surface of the lid and closing the recess of the lid via an adhesive material, wherein
a thickness of a periphery of the electrode on the top surface of the lid is smaller than a thickness of the electrode on the bottom of the recess.

2. The physical quantity sensor according to claim 1, wherein the thickness of the periphery of the electrode on the top surface of the lid gradually decreases further away from the through-hole.

3. The physical quantity sensor according to claim 1, wherein the periphery of the electrode on the top surface of the lid includes an inclined surface.

4. The physical quantity sensor according to claim 1, wherein the periphery of the electrode on the top surface of the lid has a curved surface.

5. The physical quantity sensor according to claim 1, wherein the circuit element has a first region and a second region,
- the first region of the surface element directly overlaps with the electrode on the top surface of the lid via the adhesive material in a plan view, and
- the second region of the circuit element directly overlaps with the top surface of the lid via the adhesive material without intervening the electrode in the plan view.

6. The physical quantity sensor according to claim 1, wherein the physical quantity is acceleration.

7. A composite sensor comprising:
- the physical quantity sensor according to claim 6; and
- an angular velocity sensor.

8. An electronic device comprising:
- the physical quantity sensor according to claim 1; and
- a control section configured to perform control the electronic device based on a detection signal output from the physical quantity sensor.

9. A vehicle comprising:
- the physical quantity sensor according to claim 1;
- a control section configured to perform control the vehicle based on a detection signal output from the physical quantity sensor; and
- at least one of an engine system, a brake system, and a keyless entry system, wherein
- the control section controls the at least one of the engine system, the brake system, and the keyless entry system based on the detection signal.

10. A traveling supporting system comprising:
- the physical quantity sensor according to claim 1; and
- a control section configured to control at least one of acceleration, braking, and steering based on a detection signal detected by the physical quantity sensor, wherein
- implementation and non-implementation of automatic driving is switched according to a change of the detection signal from the physical quantity sensor.

* * * * *